United States Patent
Son et al.

(10) Patent No.: US 10,311,613 B2
(45) Date of Patent: Jun. 4, 2019

(54) ELECTRONIC DEVICE FOR PROCESSING IMAGE AND METHOD FOR CONTROLLING THEREOF

(71) Applicant: Samsung Electronics Co., Ltd., Suwon-si, Gyeonggi-do (KR)

(72) Inventors: Dong-Il Son, Hwaseong-si (KR); Chi-Hyun Cho, Suwon-si (KR); Chang-Ryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 15/240,547

(22) Filed: Aug. 18, 2016

(65) Prior Publication Data

US 2017/0084067 A1 Mar. 23, 2017

(30) Foreign Application Priority Data

Sep. 23, 2015 (KR) .......................... 10-2015-0134704

(51) Int. Cl.
| | |
|---|---|
| *G06K 9/00* | (2006.01) |
| *G06T 11/60* | (2006.01) |
| *H04N 21/00* | (2011.01) |
| *H04N 21/2743* | (2011.01) |
| *H04N 21/4223* | (2011.01) |
| *H04N 21/4788* | (2011.01) |

(52) U.S. Cl.
CPC .......... *G06T 11/60* (2013.01); *G06K 9/00369* (2013.01); *G06K 9/00671* (2013.01); *H04N 21/00* (2013.01); *H04N 21/2743* (2013.01); *H04N 21/4223* (2013.01); *H04N 21/4788* (2013.01)

(58) Field of Classification Search
CPC ................ G06T 11/60; G06K 9/00369; G06K 9/00671; H04N 21/00
See application file for complete search history.

(56) References Cited

U.S. PATENT DOCUMENTS

| | | | |
|---|---|---|---|
| 5,606,629 A | 2/1997 | Shirakawa | |
| 7,570,984 B2 | 8/2009 | Katsuda et al. | |
| 8,422,747 B1* | 4/2013 | Leung | H04L 51/32 |
| | | | 382/118 |
| 8,447,863 B1 | 5/2013 | Francis, Jr. et al. | |
| 8,666,198 B2* | 3/2014 | Shochat | G06K 9/00221 |
| | | | 382/305 |
| 9,563,803 B2* | 2/2017 | Shakib | G06K 9/00288 |
| 2005/0208457 A1 | 9/2005 | Fink et al. | |
| 2006/0050177 A1 | 3/2006 | Ikeguchi et al. | |
| 2006/0093333 A1 | 5/2006 | Daurensan et al. | |
| 2009/0027513 A1 | 1/2009 | Sako | |

(Continued)

FOREIGN PATENT DOCUMENTS

| | | |
|---|---|---|
| GB | 2 378 301 A | 2/2003 |
| KR | 10-2010-0101975 A | 9/2010 |
| KR | 10-2011-0082243 A | 7/2011 |

*Primary Examiner* — Shefali D Goradia
(74) *Attorney, Agent, or Firm* — Jefferson IP Law, LLP

(57) ABSTRACT

An electronic device is provided. The electronic device includes a processor and a memory electrically connected with the processor, wherein the memory may store instructions executed to enable the processor to obtain an image and output a message generated based on additional information and an image analysis result obtained by analyzing the obtained image.

18 Claims, 52 Drawing Sheets

(56) References Cited

U.S. PATENT DOCUMENTS

| | | | |
|---|---|---|---|
| 2011/0181617 A1* | 7/2011 | Tsuda | G06F 3/0481 |
| | | | 345/619 |
| 2013/0053002 A1* | 2/2013 | Hymes | H04M 1/26 |
| | | | 455/414.1 |
| 2014/0019135 A1 | 1/2014 | Talwar et al. | |
| 2014/0156769 A1 | 6/2014 | Wan et al. | |
| 2016/0019433 A1* | 1/2016 | Saito | G06F 16/5866 |
| | | | 709/203 |
| 2016/0026867 A1* | 1/2016 | Wexler | H04N 5/2257 |
| | | | 382/103 |

* cited by examiner

ELECTRONIC DEVICE FOR PROCESSING IMAGE AND METHOD FOR CONTROLLING THEREOF

CROSS-REFERENCE TO RELATED APPLICATION(S)

This application claims the benefit under 35 U.S.C. § 119(a) of a Korean patent application filed on Sep. 23, 2015 in the Korean Intellectual Property Office and assigned Serial No. 10-2015-0134704, the entire disclosure of which is hereby incorporated by reference.

TECHNICAL FIELD

The present disclosure relates to electronic devices for processing images and methods for controlling the electronic devices. More particularly, the present disclosure relates to electronic devices for analyzing images and methods for controlling the electronic devices.

BACKGROUND

In recent years, electronic devices, e.g., smartphones, having a function of capturing and transmitting images have been widely spread. As a consequence, a user can easily transmit an image captured by his electronic device to another electronic device, and the user of the other electronic device can see the received image. Electronic devices of the related art download images en bloc and then display the downloaded images. Thus, the user of an electronic device cannot see received images until the electronic device downloads the images and runs a viewer application after picking up an image file. In other words, the electronic device needs to download an image and execute a viewer application to display the image through a display, so that the user sees the image content.

The above information is presented as background information only to assist with an understanding of the present disclosure. No determination has been made, and no assertion is made, as to whether any of the above might be applicable as prior art with regard to the present disclosure.

SUMMARY

As described above, an electronic device of the related art receives an image from a server providing corresponding services through an application, e.g., an email, social networking services (SNS), or an instant message (IM).

However, for the electronic devices of the related art, there has never been provided such a technology in which a content of an image is grasped, processed with information corresponding to the user, and provided.

Aspects of the present disclosure are to address at least the above-mentioned problems and/or disadvantages and to provide at least the advantages described below. Accordingly, an aspect of the present disclosure is to provide electronic devices for processing images and methods for controlling the electronic devices.

In accordance with an aspect of the present disclosure, an electronic device is provided. The electronic device includes a processor and a memory electrically connected with the processor. The memory stores an instruction executed to enable the processor to obtain an image and to output a message generated based on additional information and an image analysis result obtained by analyzing the obtained image.

In accordance with another aspect of the present disclosure, a method for controlling an electronic device is provided. The method includes obtaining an image and outputting a message generated based on additional information and an image analysis result obtained by analyzing the obtained image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
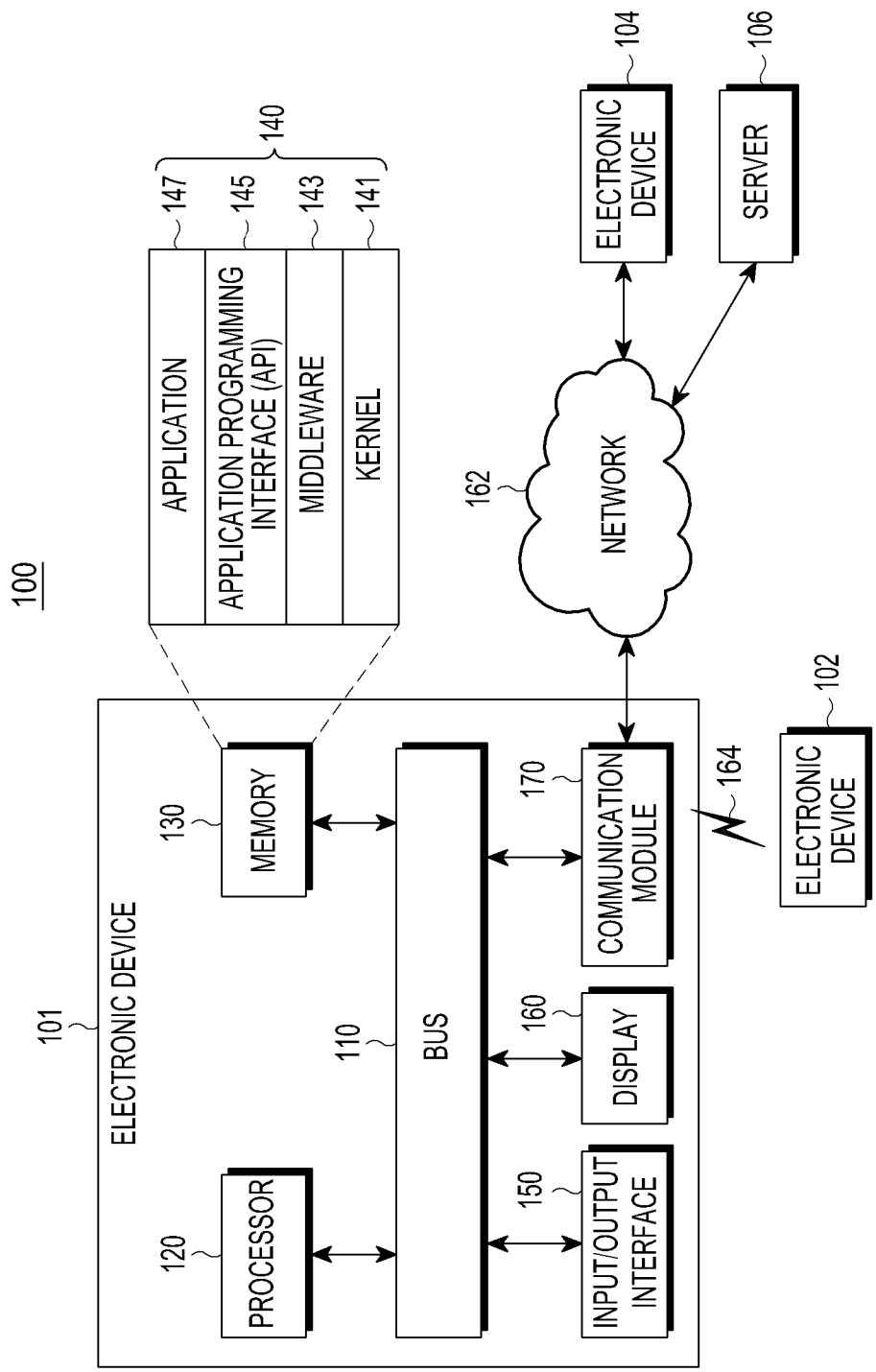
FIG. 1A is a block diagram illustrating an electronic device and a network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware (H/W) to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. Examples of the home appliance may include at least one of a television (TV), a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1A is a block diagram illustrating an electronic device and a network according to an embodiment of the present disclosure.

Referring to FIG. 1A, an electronic device 101 is included in a network environment 100. The electronic device 101 may include a bus 110, a processor 120, a memory 130, an input/output interface 150, a display 160, and a communication module 170. In some embodiments, the electronic device 101 may exclude at least one of the components or may add another component.

The bus 110 may include a circuit for connecting the components 110 to 170 with one another and transferring communications (e.g., control messages and/or data) between the components.

The processing module 120 may include one or more of a CPU, an AP, a communication processor (CP), a graphic processor (GP), a multi-chip package (MCP), or an image processor (IP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 145 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device. The input/output interface 150 may include, e.g., a touch input device, a voice input unit, and various remote control devices. The input/output device 150 may be at least one or more means to provide a particular service to the user. For example, when information to be transferred is a sound, the input/output interface 150 may be a speaker, and when the information is text or image content, the input/output device 150 may be a display device. Further, in order to provide a service under the circumstances where the user does not approach the electronic device 101, data to be output may be transferred to at least one or more other electronic devices through a communication module and may then be output. Here, the other electronic devices may be speakers or other display devices.

The display 160 may include, e.g., a liquid crystal display (LCD), a light emitting diode (LED) display, an organic LED (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication module 170 may set up communication between the electronic device 101 and an external device (e.g., a first electronic device 102, a second electronic device 104, or a server 106). For example, the communication module 170 may be connected with a network 162 through wireless or wired communication to communicate with the external electronic device (e.g., the second external electronic device 104 or server 106). The communication module 170 may be a means to enable communication of at least one or more data items with other electronic device and may communicate with the other electronic device through at least one or more communication standards, such as Wi-Fi, ZigBee, Bluetooth, long term evolution (LTE), 3rd generation (3G), or infrared (IR) protocols.

The wireless communication may be a cellular communication protocol and may use at least one of, e.g., LTE, LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of Wi-Fi, Bluetooth, near-field communication (NFC), or GNSS. The GNSS may include at least one of, e.g., global positioning system (GPS), global navigation satellite system (GLONASS), BeiDou navigation satellite system (hereinafter, "BeiDou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 1B:
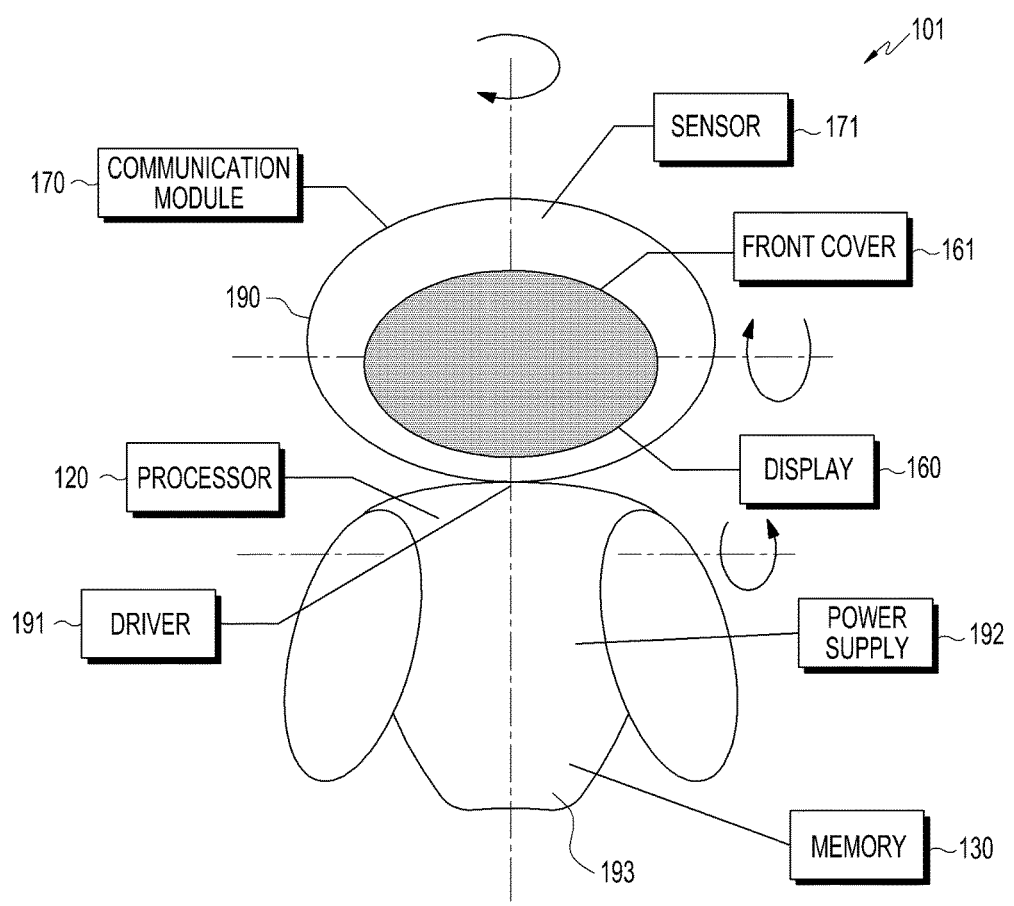
FIG. 1B is a concept view illustrating an implementation example according to an embodiment of the present disclosure.

FIG. 1B is a concept view illustrating an implementation example according to an embodiment of the present disclosure.

Referring to FIG. 1B, the electronic device 101 may be implemented in the form of a robot. The electronic device 101 may include a head portion 190 and a body portion 193. The head portion 190 may be disposed on the body portion 193. The head portion 190 and the body portion 193, in an embodiment, may be implemented in the shape of a human being's head and body, respectively. For example, the head portion 190 may include a front cover 161 corresponding to the shape of a human being's face. The electronic device 101 may include a display 160 disposed at a position corresponding to the front cover 161. For example, the display 160 may be disposed inside the front cover 161, and in this case, the front cover 161 may be formed of a transparent or semi-transparent material. Or, the front cover 161 may be a device that may display any screen, and in such case, the front cover 161 and the display 160 may be implemented as a single H/W device. The front cover 161 may include at least one or more various sensors for image sensing in a direction of interacting with the user, at least one or more microphones for obtaining a voice, and at least one or more H/W or instrumental structures that may be an instrumental eye structure or a display for outputting a screen, that enables display through a temporary instrumental change or light in the form of directions being not differentiated, and that may be directed to the user when interacting with the user.

The head portion 190 may further include the communication module 170 and a sensor 171. The communication module 170 may receive a message from a sender (or a transmitting person) and transmit a converted message to a recipient (or a receiving person). According to an embodiment of the present disclosure, the communication module 170 may be implemented as a microphone, and in this case, the communication module 170 may receive a voice from the user. According to an embodiment of the present disclosure, the communication module 170 may be implemented as a speaker, and in this case, the communication module 170 may output a converted message as a voice.

The sensor 171 may obtain at least one information regarding an external environment. For example, the sensor 171 may be implemented as a camera, and in this case, the sensor 171 may capture the external environment. The electronic device 101 may identify a recipient according to the capturing result. The sensor 171 may sense the approach of the recipient to the electronic device 101. The sensor 171 may sense the approach of the recipient according to proximity information or based on a signal from the electronic device used by the recipient. Further, the sensor 171 may also sense the action or position of the user.

According to an embodiment of the present disclosure, the sensor 171 may be implemented as a camera to take a picture of a user. In this case, the memory 130 may store instructions executed to enable the processor 120 to identify the user based on data from the camera and to output a message generated based on additional information corresponding to a result of identifying the user.

A driver 191 may include at least one motor to actuate the head portion 190, e.g., to change the direction of the head portion 190. The driver 191 may be used to move or instrumentally change other components. Further, the driver 191 may be in the form capable of moving up, down, left, or right with respect to at least one or more axes, and may be implemented to have various forms. A power supply 192 may feed power to the electronic device 101.

The processor 120 may obtain a message from a sender through the communication module 170 or the sensor 171. The processor 120 may include at least one message analyzing module. The at least one message analyzing module may extract major contents to be transferred to the recipient from a message generated by the sender or may classify the contents.

The memory 130 is storage for permanently or temporarily storing information related to providing a service to the user. The memory 130 may be present in the electronic device or may be present in a cloud or other server through a network. The memory 130 may store personal information for user authentication, attribute-related information relating to the manner of providing a service to the user, or information for grasping the relationship between various means that may interact with the electronic device 101. Here, the relationship information may be updated as the electronic device 101 is used or may be studied and changed. The processor 120 may be in charge of control of the electronic device 101 and may functionally control the sensor 171, the input/output interface 150, the communication module 170, and the memory 130 to provide a service to the user. Further, at least a portion of the processor 120 or the memory 130 may include an information determining unit that may determine information obtainable by the electronic device 101. Here, the information determining unit may extract at least one or more data for a service from the information obtained through the sensor 171 or the communication module 170.

Meanwhile, the robot-type implementation of the electronic device 101 is merely an example, and there are no limitations as to the type of implementation.

According to an embodiment of the present disclosure, the memory 130 may store instructions executed to enable the processor 120 to obtain an image and output a message generated based on additional information and an image analysis result obtained by analyzing the obtained image.

According to an embodiment of the present disclosure, the additional information may include information independent from the image analysis result.

According to an embodiment of the present disclosure, the additional information may include at least one of a relationship between a sender of the image and a recipient of the image, a relationship between the sender of the image and the electronic device, or a relationship between the recipient of the image and the electronic device.

According to an embodiment of the present disclosure, the additional information may include metadata of the image.

According to an embodiment of the present disclosure, the additional information may include information from an application different from an application outputting the message.

According to an embodiment of the present disclosure, the memory 130 may store instructions executed to enable the processor 120 to identify metadata of the image and obtain the information from the different application corresponding to the identified metadata.

According to an embodiment of the present disclosure, the additional information may include information related to at least a portion of the image analysis result.

According to an embodiment of the present disclosure, the memory 130 may store instructions to obtain a result of identifying a first object of the image, obtain information related to the first object corresponding to the result of identifying the first object as the additional information, and generate an output message based on the first object-related information and the image analysis result.

According to an embodiment of the present disclosure, the memory 130 may store instructions to identify a shape of the first object, compare a pre-stored object template with the shape of the first object, and obtain object-related information corresponding to the object template having a similarity equal to or greater than a predetermined threshold value, in comparison with the shape of the first object, as the first object-related information.

According to an embodiment of the present disclosure, the memory 130 may store instructions to obtain a different image from the image, identify the object template from the different image and store the identified object template, and store information related to the object template as the object-related information.

According to an embodiment of the present disclosure, the memory 130 may store instructions to obtain an image, analyze the obtained image to generate a message, obtain additional information, and convert the message using the obtained additional information and output the converted message.

According to an embodiment of the present disclosure, the memory 130 may store instructions to perform control to display data explaining an image when a communication module receives the data explaining the image received by the electronic device at a first point, and control the communication module to transmit a request for downloading the image when a command for downloading the image is obtained.

Figure 2A:
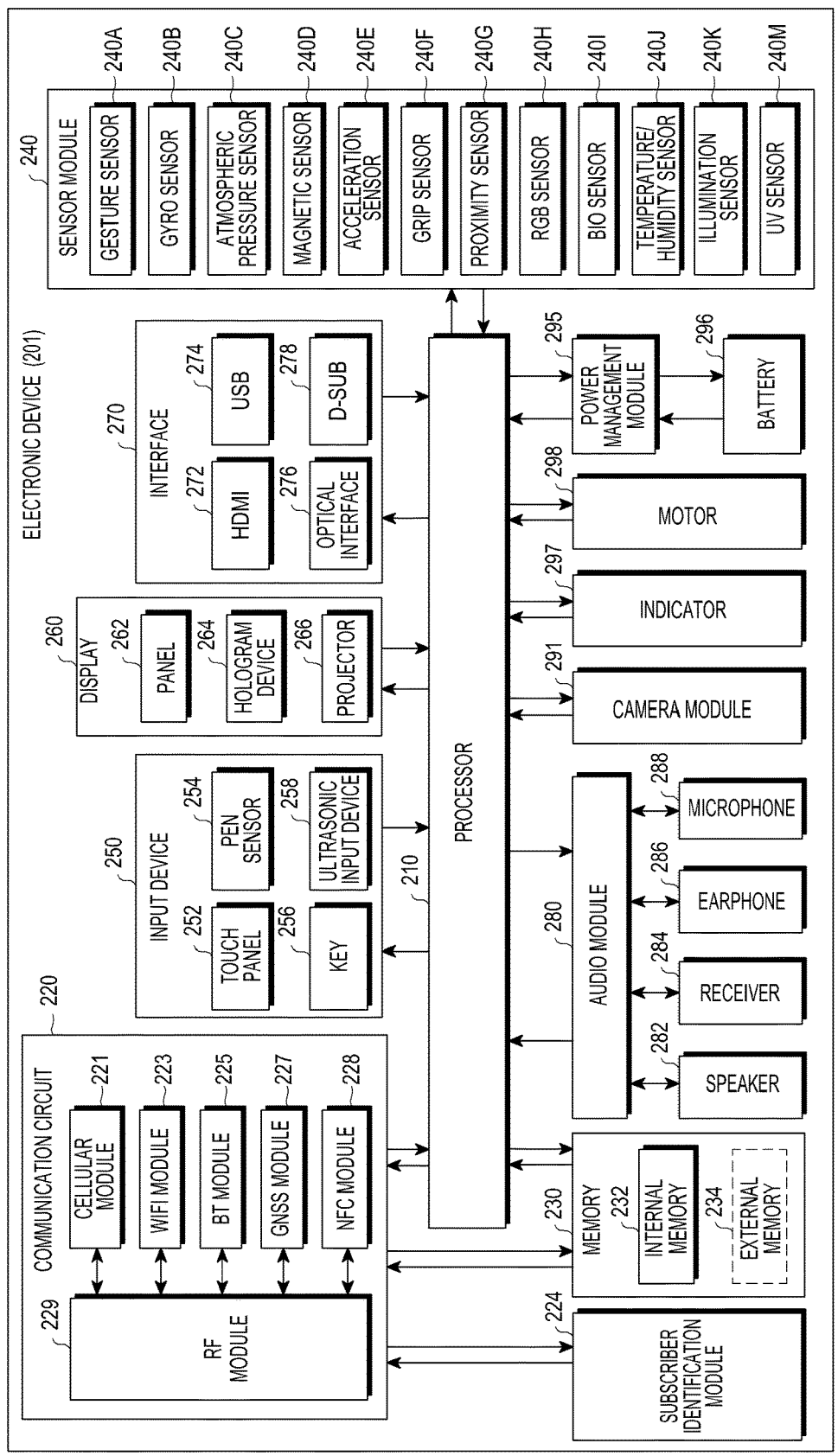
FIG. 2A is a block diagram illustrating an electronic device according to an embodiment of the present disclosure.

FIG. 2A is a block diagram illustrating an electronic device according to an embodiment of the present disclosure.

Referring to FIG. 2A, the electronic device 201 may include the whole or part of the configuration of, e.g., the electronic device 101 shown in FIG. 1A. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple H/W and software components connected to the processor 210 by running, e.g., an OS or application programs, and the processor 210 may process and compute various data. The processor 210 may be implemented in, e.g., a system on chip (SoC). According to an embodiment of the present disclosure, the processor 210 may further include a graphics processing unit (GPU) and/or an image signal processor (ISP). The processor 210 may include at least some (e.g., the cellular module 221) of the components shown in FIG. 2A. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1A. The communication module 220 may include, e.g., a cellular module 221, a Wi-Fi module 223, a Bluetooth module 225, a GNSS module 227 (e.g., a GPS module, a GLONASS module, a BeiDou module, or a Galileo module), an NFC module 228, and a radio frequency (RF) module 229.

The cellular module 221 may provide voice call, video call, text, or internet services through, e.g., a communication network. The cellular module 221 may perform identification or authentication on the electronic device 201 in the communication network using the SIM 224 (e.g., the SIM card). According to an embodiment of the present disclosure, the cellular module 221 may perform at least some of the functions providable by the processor 210. According to an embodiment of the present disclosure, the cellular module 221 may include a CP.

The Wi-Fi module 223, the Bluetooth module 225, the GNSS module 227, or the NFC module 228 may include a process for, e.g., processing data communicated through the module. According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module.

The SIM 224 may include, e.g., a card including a SIM and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a mini-SD memory, an extreme digital (xD) memory, a multi-media card (MMC), or a memory Stick™. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an ultra violet (UV) sensor 240M. Additionally or alternatively, the sensing module 240 may include, e.g., an E-nose sensor, an electromyography (EMG) sensor, an electroencephalogram (EEG) sensor, an electrocardiogram (ECG) sensor, an IR sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, IR, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., a microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1A. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., an HDMI 272, a USB 274, an optical interface 276, or a D-subminiature (D-sub) 278. The interface 270 may be included in e.g., the communication interface 170 shown in FIG. 1A. Additionally or alternatively, the interface 270 may include a mobile high-definition link (MHL) interface, an SD card/MMC interface, or infrared data association (IrDA) standard interface.

The audio module 280 may convert a sound into an electric signal or vice versa, for example. At least a part of the audio module 280 may be included in e.g., the input/output interface 150 as shown in FIG. 1A. The audio module 280 may process sound information input or output through e.g., a speaker 282, a receiver 284, an earphone 286, or the microphone 288.

For example, the camera module 291 may be a device for capturing still images and videos, and may include, according to an embodiment of the present disclosure, one or more image sensors (e.g., front and back sensors), a lens, an ISP, or a flash such as an LED or xenon lamp.

The power manager module 295 may manage power of the electronic device 201, for example. Although not shown, according to an embodiment of the present disclosure, the power manager module 295 may include a power management IC (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 2B:
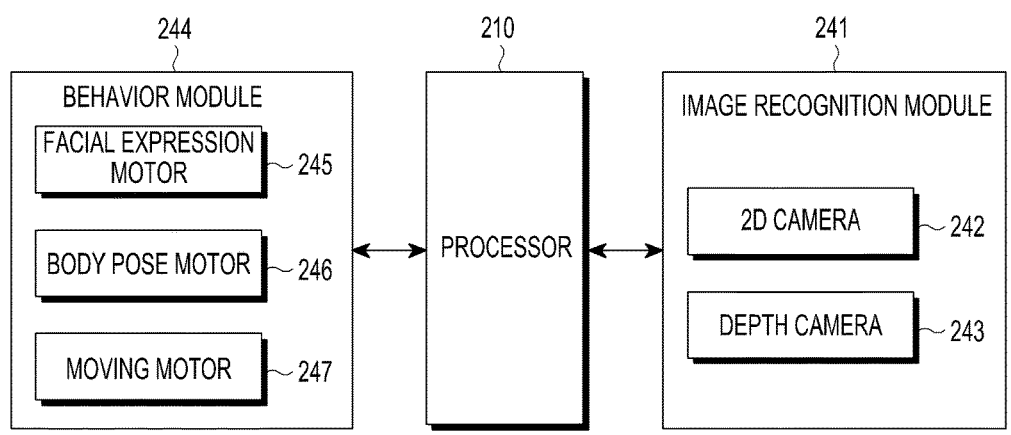
FIG. 2B is a block diagram illustrating an electronic device according to an embodiment of the present disclosure.

FIG. 2B is a block diagram illustrating an electronic device according to an embodiment of the present disclosure.

Referring to FIG. 2B, the processor 210 may be connected with an image recognition module 241. Further, the processor may be connected with a behavior module 244. The image recognition module 241 may include at least one of a 2-dimensional (2D) camera 242 and a depth camera 243. The image recognition module 241 may perform recognition based on a captured result and transfer the recognized result to the processor 210. The behavior module 244 may include at least one of a facial expression motor 245, a body pose motor 246, and a moving motor 247. The processor 210 may control at least one of the facial expression motor 245, the body pose motor 246, and the moving motor 247 to control the movement of the electronic device 101 implemented in the form of a robot. The electronic device 101 may include the elements shown in FIG. 2B in addition to the elements shown in FIG. 2A.

Figure 3:
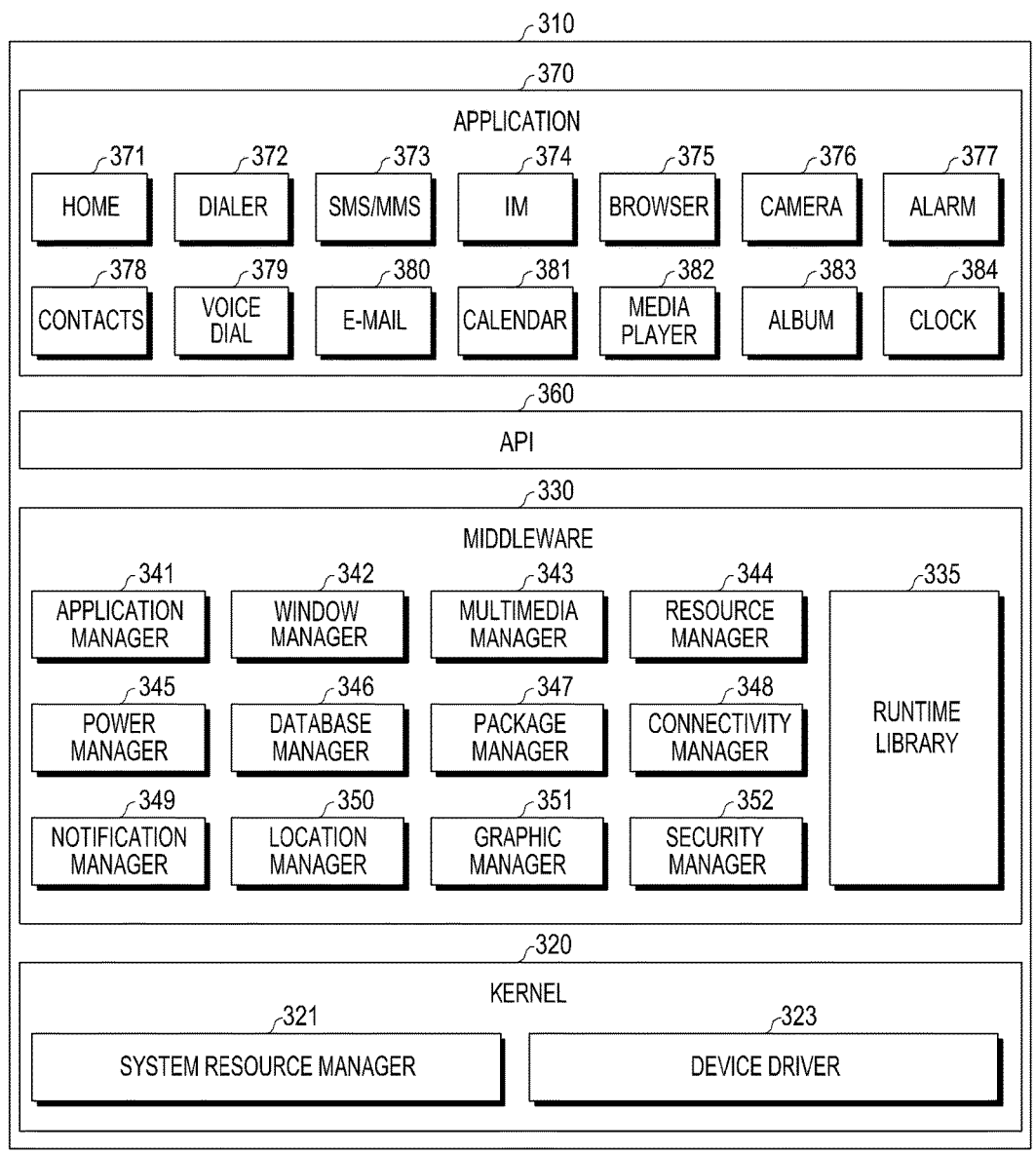
FIG. 3 is a block diagram illustrating a program module according to an embodiment of the present disclosure.

FIG. 3 is a block diagram illustrating a program module according to an embodiment of the present disclosure.

Referring to FIG. 3, the program module 310 (e.g., the program 140) may include an OS controlling resources related to the electronic device (e.g., the electronic device 101) and/or various applications (e.g., the AP 147) driven on the operating system. The OS may include, e.g., Android, iOS, Windows, Symbian, Tizen, or Bada.

The program 310 may include, e.g., a kernel 320, middleware 330, an API 360, and/or an application 370. At least a part of the program module 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the OS in order to provide a differentiated function. Further, the middleware 330 may dynamically omit some existing components or add new components.

The API 360 (e.g., the API 145) may be a set of, e.g., API programming functions and may have different configurations depending on OSs. For example, in the case of Android or iOS, one API set may be provided per platform, and in the case of Tizen, two or more API sets may be offered per platform.

The application 370 (e.g., the AP 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but are not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the electronic devices 102 and 104). According to an embodiment of the present disclosure, the application 370 may include an application received from the external electronic device (e.g., the server 106 or electronic devices 102 and 104). According to an embodiment of the present disclosure, the application 370 may include a preloaded application or a third party application downloadable from a server. The names of the components of the program module 310 according to the shown embodiment may be varied depending on the type of OS.

Figure 4:
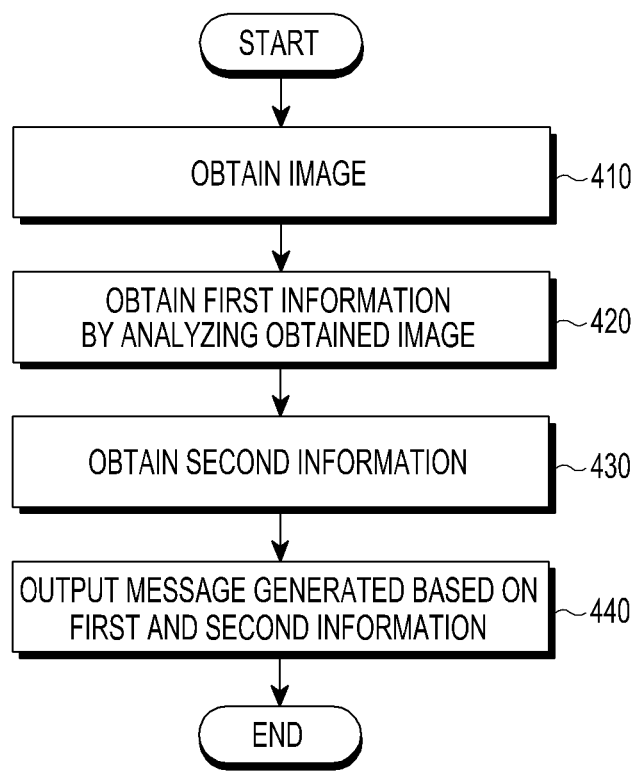
FIG. 4 is a flowchart illustrating a method for controlling an electronic device according to an embodiment of the present disclosure.

FIG. 4 is a flowchart illustrating a method for controlling an electronic device according to an embodiment of the present disclosure.

The embodiment related to FIG. 4 is described in greater detail with reference to FIGS. 5A and 5B.

Figure 5A:
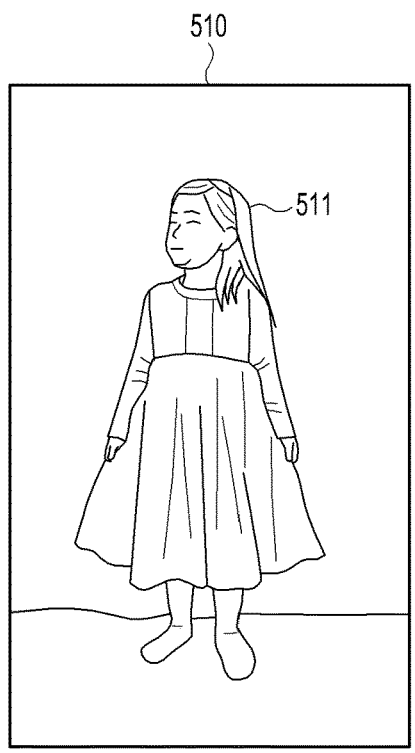
FIG. 5A is a concept view illustrating an image according to an embodiment of the present disclosure.
Figure 5B:
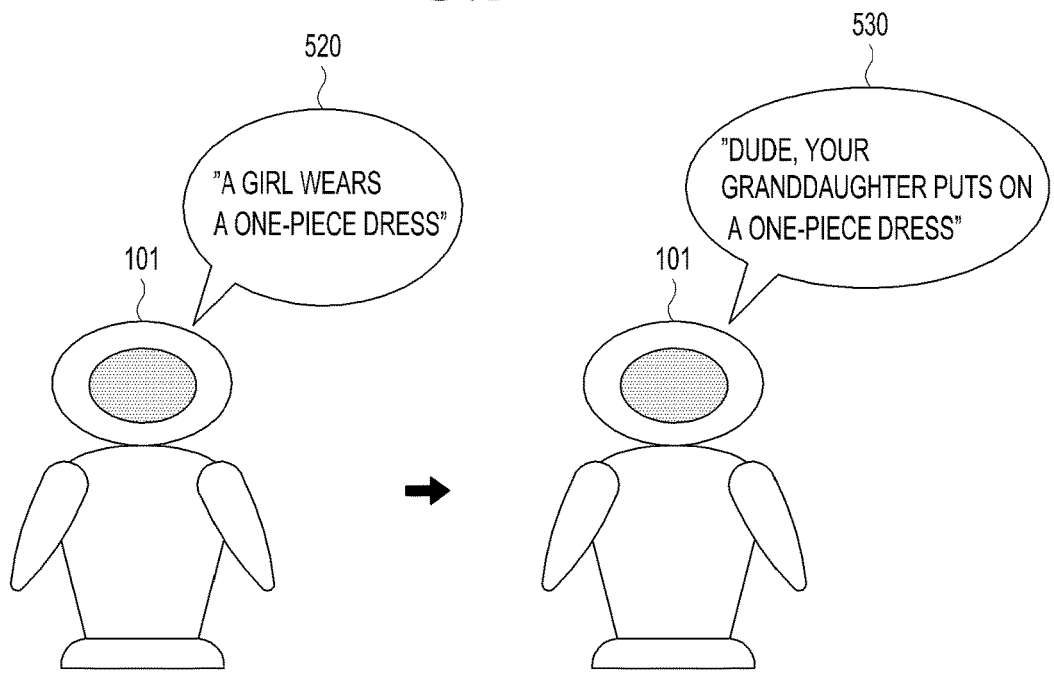
FIG. 5B is a concept view illustrating a process for generating an output message including an image analysis result according to an embodiment of the present disclosure.

FIG. 5A is a concept view illustrating an image according to an embodiment of the present disclosure. FIG. 5B is a concept view illustrating a process for generating an output message including an image analysis result according to an embodiment of the present disclosure.

Referring to FIG. 4, in operation 410, the electronic device 101 may obtain an image. According to an embodiment of the present disclosure, the electronic device 101 may include a camera module and obtain an image through the camera module. According to an embodiment of the present disclosure, the electronic device 101 may obtain an image though a camera module disposed in a front portion to capture the front of the electronic device 101. According to an embodiment of the present disclosure, the electronic device 101 may obtain an image though a camera module disposed in a rear portion to capture the rear of the electronic device 101. The type and number of the camera module are not limited. For example, according to an embodiment of the present disclosure, the electronic device 101 may include two or more camera modules disposed in a front portion or a rear portion, and the electronic device 101 may generate an image using data captured by the two or more camera modules, thereby obtaining the image. When the electronic device 101 is implemented in a form of a robot, the electronic device 101 may obtain an image through a sensor 171.

According to an embodiment of the present disclosure, the electronic device 101 may obtain an image through a communication module from another electronic device. For example, the electronic device 101 may obtain an image through short range communication with another electronic device, or the electronic device 101 may receive an image from another mobile terminal or a server through wireless communication using web browsing. Alternatively, a processor 120 of the electronic device 101 may obtain an image by loading the image stored in a memory 130.

Referring to FIG. 5A, according to an embodiment of the present disclosure, the electronic device 101 may obtain an image 510. The image 510 may include an object of a girl wearing a one-piece dress.

In operation 420, the electronic device 101 may obtain first information by analyzing the obtained image. According to an embodiment of the present disclosure, the electronic device 101 may analyze the image 510 and obtain analysis result describing an object 511. For example, the electronic device 101 may obtain the first information which is an analysis result indicating that "a girl wears a one-piece dress" as a result of analyzing the image 510. According to an embodiment of the present disclosure, the electronic device 101 may obtain an image analysis result using various image analysis techniques. For example, the electronic device 101 may obtain the image analysis result using a recognition algorithm, e.g., an image caption algorithm, based on a deep learning method or a machine learning method. Specifically, the image caption algorithm based on a deep learning method or a machine learning method may recognize an attribute of a specific object within the image by analyzing multiple images and update the recognized attribute through learning, thereby reducing a recognition error. According to an embodiment of the present disclosure, the electronic device 101 may obtain the image analysis result through existing various recognition algorithms. A person of ordinary skill in the art may readily understand that any recognition algorithm recognizing a content of an image by analyzing the image may be used without limitation. According to an embodiment of the present disclosure, the electronic device 101 may store a recognition algorithm and obtain an image analysis result using the recognition algorithm. In an embodiment, the electronic device 101 may transmit a query including the obtained image to another electronic device. The other electronic device may apply the received query to the recognition algorithm to obtain an image analysis result, and may transmit the image analysis result to the electronic device 101 as a response of the query. The electronic device 101 may obtain the image analysis result as the response of the query. As described above, the electronic device 101 may obtain the first information indicating "a girl wears a one-piece dress". For example, the electronic device 101 may recognize a face object within the image and identify a face of a girl. The electronic device 101 may also recognize a one-piece dress object in a lower portion of the face object. The electronic device 101 may obtain the image analysis result indicating that a girl wears a one-piece dress in that the one-piece dress object is placed in a power portion of the face object. As described above, the electronic device 101 may obtain the image analysis result based on at least one of at least one object recognition result or at least one relationship between objects.

In operation 430, the electronic device 101 may obtain second information which is the additional information. According to an embodiment of the present disclosure, the second information may include information independent from the first information which is the image analysis result. For example, the second information may include at least one of relationship information between a sender transmitting the image and a recipient receiving the image, relationship information between the sender and the electronic device 101, or relationship information between the recipient and the electronic device 101. Further, the second information may include information related to the first information which is the image analysis result. The electronic device 101 may obtain the second information independent from the first information according to a predetermined input, or may obtain the second information through a result of learning an external environment. For example, the electronic device 101 may obtain relationship information indicating that the relationship between the electronic device 101 and the recipient is a "friend relationship". As described above, the relationship information indicating "friend relationship" may be previously determined by a user, or may be obtained by a learning result based on interaction between a user and the electronic device 101.

According to an embodiment of the present disclosure, the second information may include information related to at least one identified object included in the image analysis result. For example, the second information may include information related to "girl" or "one-piece dress" in the first information indicating that "a girl wears a one-piece dress". Specifically, the second information may include a price, a purchase detail, or a dress changing history of the "one-piece dress", or may include information indicating that the "girl" is a "granddaughter" of the recipient. The electronic device 101 may obtain the information related with the identified object according to a predetermined input or may obtain through the result of learning external environment.

In operation 440, the electronic device 101 may output a message generated based on the first information and the second information. For example, as illustrated in FIG. 5B, the electronic device 101 may output a message 520 including the first information indicating that "a girl wears a one-piece dress" and a message 530 including the second information "granddaughter" and "Dude" corresponding to "friend relationship", e.g. "Dude, your granddaughter puts on a one-piece dress.". The electronic device 101 may generate the message 530 using an attribute of the second information. Specifically, the electronic device 101 may dispose a word "Dude" in a front portion of a sentence in that an attribute of the word "Dude" based on the relationship information is an appellation. Further, the electronic device 101 may replace "girl" in the first information with "granddaughter", in that an attribute of the word "granddaughter" is a word capable of replacing "girl". In the meantime, the electronic device 101 may additionally convert "wears" into "puts on" based on the relationship information between the electronic device 101 and the recipient, e.g., the relationship information of "friend relationship". Accordingly, the electronic device 101 may output the message 530 indicating that "Dude, a granddaughter puts on a one-piece dress". The outputted message 530 may include both the first information indicating "puts on a one-piece dress" and the second information indicating "Dude" and "granddaughter". As described above, the electronic device 101 may output a message including the image analysis result and the additional information.

In the meantime, the electronic device 101 may recognize a user, e.g., the recipient of the message, based on data from a camera. The electronic device 101 may replace the "girl" with a "granddaughter" when the user is a grandfather of the girl recognized in the image. Similarly, for example, when the user is a father of the girl recognized in the image, the electronic device 101 may replace the "girl" with a "daughter".

Figure 6:
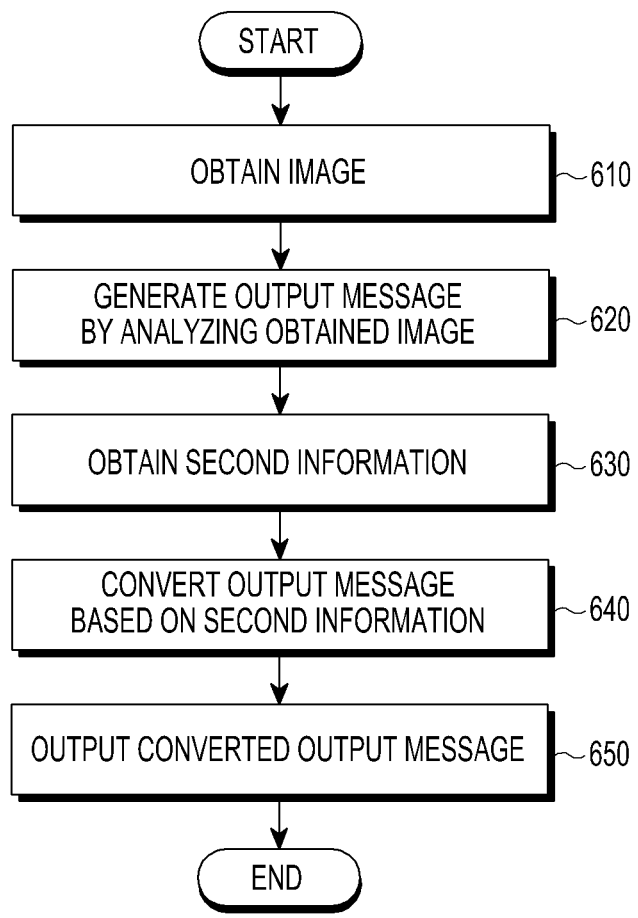
FIG. 6 is a flowchart illustrating a method for controlling an electronic device according to an embodiment of the present disclosure.

FIG. 6 is a flowchart illustrating a method for controlling an electronic device according to an embodiment of the present disclosure.

In operation 610, the electronic device 101 may obtain an image. As described above, the electronic device 101 may capture an image through a camera module included therein, receive an image through a communication module, or load an image stored in the memory.

In operation 620, the electronic device 101 may analyze the obtained image and generate an output message. According to an embodiment of the present disclosure, the electronic device 101 may apply a recognition algorithm to the image and obtain an image analysis result. The electronic device 101 may generate an output message including an image analysis result. For example, as illustrated in the left embodiment of FIG. 5B, the electronic device 101 may generate an output message 520, e.g., "a girl wears a one-piece dress", including a result of analyzing the image 510.

In operation 630, the electronic device 101 may obtain second information which is additional information. For example, the electronic device 101 may obtain relationship information between the electronic device 101 and the recipient, e.g., "friend relationship", which is independent from the image analysis result, as the second information. Further, the electronic device 101 may obtain the second information indicating that the "girl" related with the image analysis result is a "granddaughter" of the recipient. According to an embodiment of the present disclosure, the electronic device 101 may obtain the second information according to previously inputted information or a learning result.

In operation 640, the electronic device 101 may convert the generated output message using the second information. For example, the electronic device 101 may include "Dude" in a front portion of a sentence based on the second information indicating "friend relationship". Further, the electronic device 101 may convert the verb in the sentence from "wears" to "puts on" based on the second information "friend relationship". In the meantime, the electronic device 101 may replace the "girl" in the output message with a "granddaughter" based on the second information indicating that the "girl" is a granddaughter of the recipient. The electronic device 101 may generate a message, e.g., "a granddaughter puts on a one-piece dress" converted by using the second information. In operation 650, the electronic device 101 may output the converted output message. The embodiment of FIG. 5B illustrates that the electronic device 101 outputs the output message converted into a voice, but the embodiment is merely an example and there is no limitation as to a way of outputting a message as long as the output message is recognizable by a user.

Figure 7:
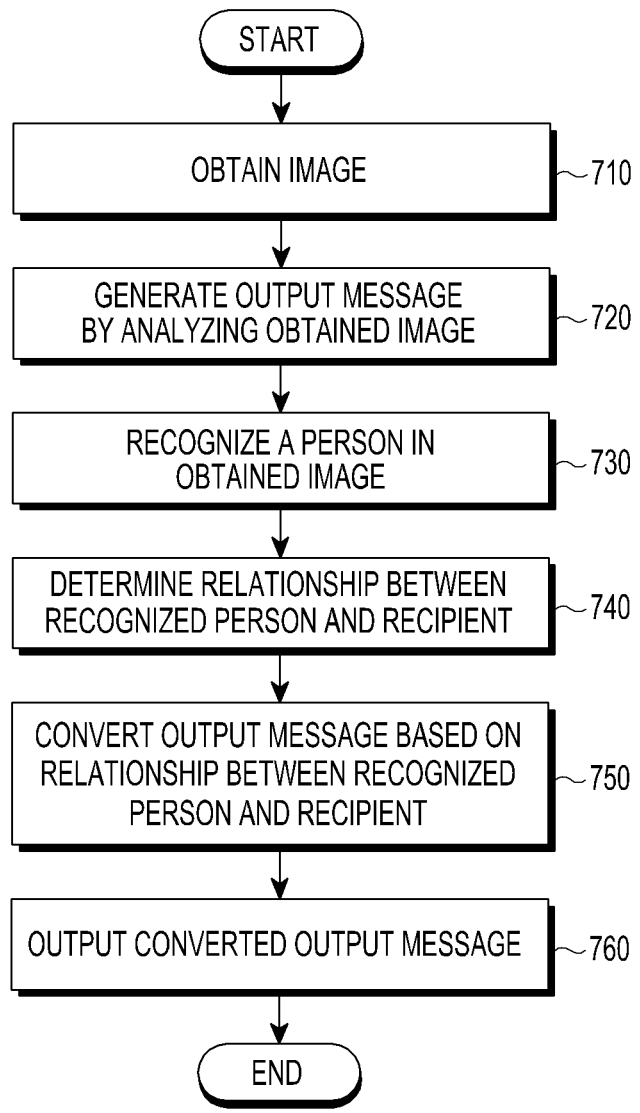
FIG. 7 is a flowchart illustrating a method for controlling an electronic device according to an embodiment of the present disclosure.

FIG. 7 is a flowchart illustrating a method for controlling an electronic device according to an embodiment of the present disclosure. The embodiment related to FIG. 7 is described in detail with reference to FIG. 8.

Figure 8:
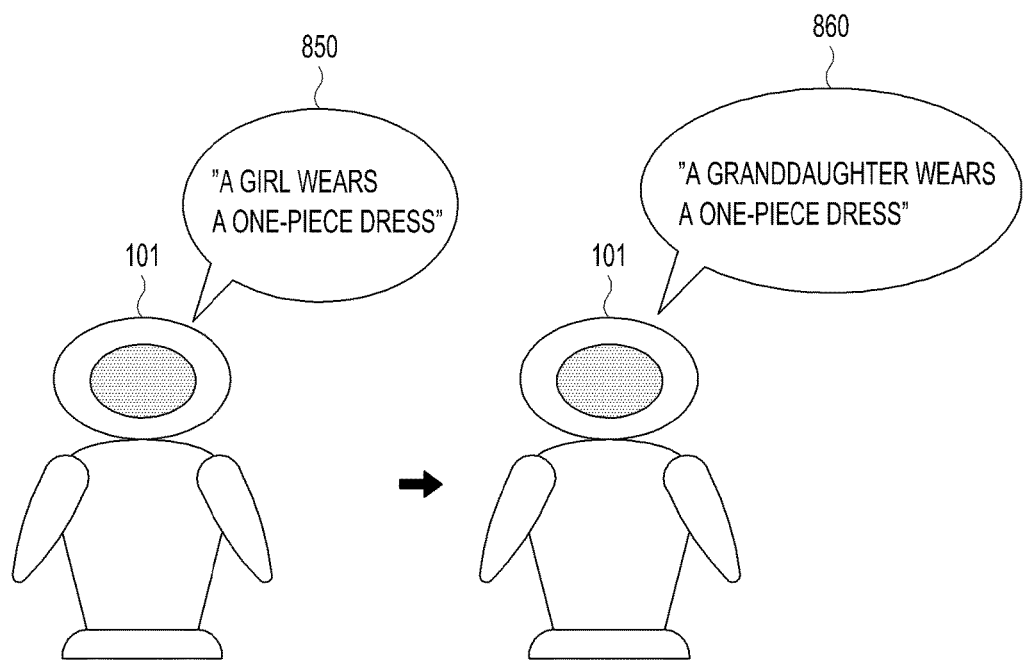
FIG. 8 is a concept view illustrating an output message according to an embodiment of the present disclosure.

FIG. 8 is a concept view illustrating an output message according to an embodiment of the present disclosure.

Referring to FIG. 7, in operation 710, the electronic device 101 may obtain an image. As described above, the electronic device 101 may capture an image through a camera module included therein, receive an image through a communication module, or load an image stored in the memory. For example, the electronic device 101 may obtain an image 510 as shown in FIG. 5A.

In operation 720, the electronic device 101 may analyze the obtained image and generate an output message. According to an embodiment of the present disclosure, the electronic device 101 may apply a recognition algorithm to the image and obtain an image analysis result. The electronic device 101 may generate an output message including an image analysis result. For example, as illustrated in the left embodiment of FIG. 8, the electronic device 101 may generate an output message 850, e.g., "a girl wears a one-piece dress", including a result of analyzing the image 510.

In operation 730, the electronic device 101 may recognize a person in the obtained image 510. For example, the electronic device 101 may recognize the "girl" from the result of analyzing the image 510. The electronic device 101 may recognize identification of the "girl" using, e.g., face recognition of the "girl". The electronic device 101 may recognize that the identification of the "girl" is Jane. The electronic device 101 may compare a face of a person in the image 510 with a pre-stored template for face recognition, and recognize the person in the image 510 based on a result of the comparison.

In operation 740, the electronic device 101 may determine the relationship between the recognized person and the recipient of the output message. For example, the electronic device 101 may determine the relationship between the recognized person and the recipient by using information related with the recognized person. The electronic device 101 may store various information related with Jane. The electronic device 101 may store information, e.g., personal information or family relationship information, in connection with the template for face recognition. The electronic device 101 may previously store family relationship information, e.g., indicating that Jane is a granddaughter of the recipient of the output message, e.g., James.

In operation 750, the electronic device 101 may convert the generated output message based on the relationship between the recognized person and the recipient of the output message. For example, in the output message 850, e.g., "a girl wears a one-piece dress", the electronic device 101 may replace the "girl" with a "granddaughter" based on the additional information indicating that a subject of "girl" is a granddaughter of the recipient, e.g., James.

In operation 760, the electronic device 101 may output the converted output message. For example, as illustrated in the embodiment of FIG. 8, the electronic device 101 may output the converted output message 860, e.g., "a granddaughter wears a one-piece dress" In the meantime, according to an embodiment of the present disclosure, the electronic device 101 may output the output message 860 including both the image analysis result and the relationship information without a converting process.

As described above, the electronic device 101 may output the output message including the additional information related with the image analysis result, e.g., the relationship information between the recognized person and the recipient.

Figure 9:
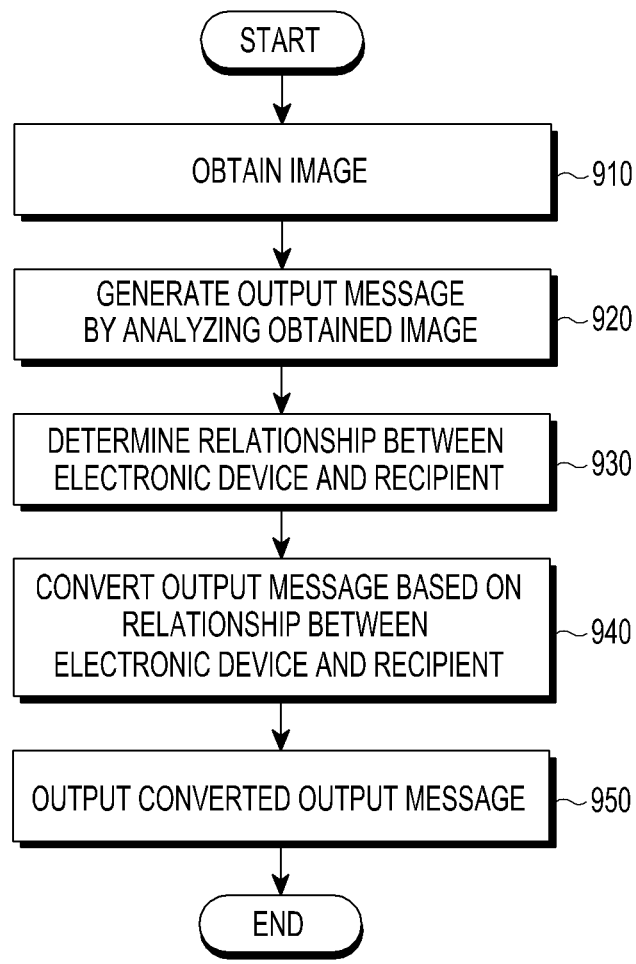
FIG. 9 is a flowchart illustrating a method for controlling an electronic device according to an embodiment of the present disclosure.

FIG. 9 is a flowchart illustrating a method for controlling an electronic device according to an embodiment of the present disclosure. The embodiment of FIG. 9 is described in further detail with reference to FIGS. 10A and 10B.

Figure 10A:
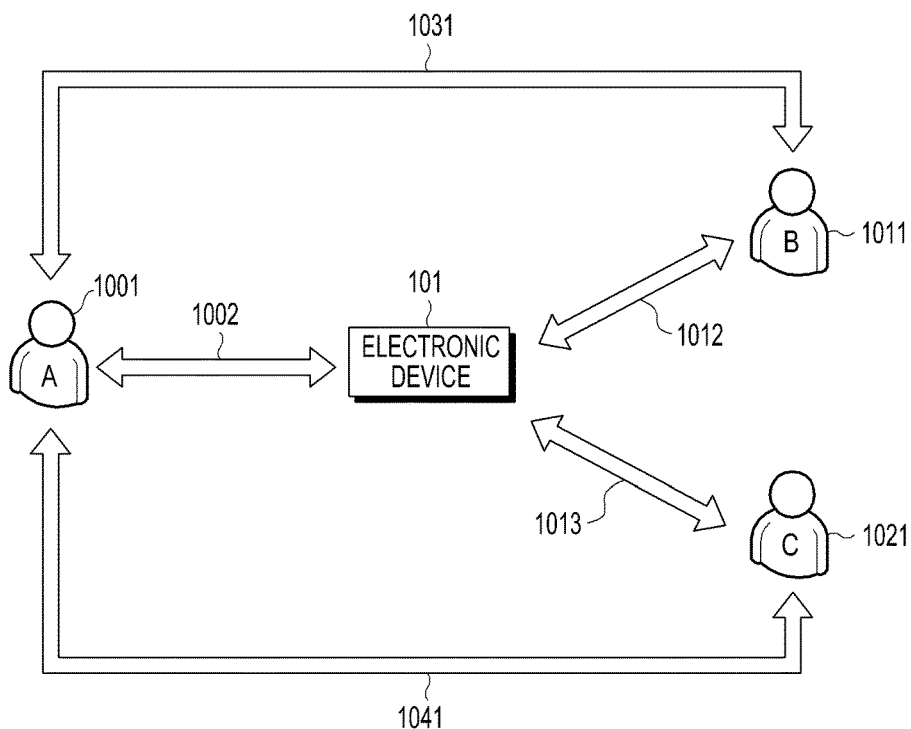
FIG. 10A is a concept view illustrating relationship information according to an embodiment of the present disclosure.
Figure 10B:
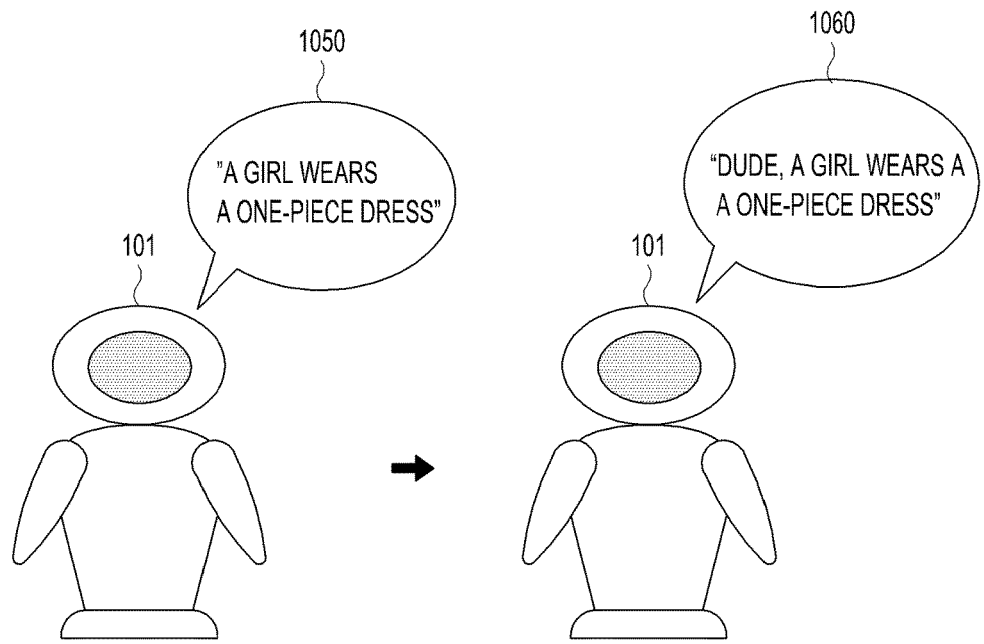
FIG. 10B is a concept view illustrating output message conversion according to an embodiment of the present disclosure.

FIG. 10A is a concept view illustrating relationship information according to an embodiment of the present disclosure. FIG. 10B is a concept view illustrating output message conversion according to an embodiment of the present disclosure.

Referring to FIG. 9, in operation 910, the electronic device 101 may obtain an image. As described above, the electronic device 101 may capture an image through a camera module included therein, receive an image through a communication module, or load an image stored in the memory. For example, the electronic device 101 may obtain an image 510 as shown in FIG. 5A.

In operation 920, the electronic device 101 may analyze the obtained image and generate an output message. According to an embodiment of the present disclosure, the electronic device 101 may apply a recognition algorithm to the image 510 to obtain an image analysis result. The electronic device 101 may generate an output message including an image analysis result. For example, as illustrated in the embodiment of FIG. 10B, the electronic device 101 may generate an output message 1050, e.g., "a girl wears a one-piece dress", including a result of analyzing the image 510.

In operation 930, the electronic device 101 may determine a relationship between the electronic device 101 and the recipient of the output message. For example, the electronic device 101 may determine the relationship between the electronic device 101 and the recipient of the output message as a "friend relationship".

The electronic device 101 may manage various relationships as shown in FIG. 10A.

Referring to FIG. 10A, the electronic device 101 may recognize a sender A 1001 of the image. Further, the electronic device 101 may determine at least one of recipients 1011 and 1021 to whom the output message including an image analysis result and additional information is transmitted. The electronic device 101 may transmit the output message to at least one of a first recipient B 1011 and a second recipient C 1021. In an embodiment, the electronic device 101 may transmit an output message to a first receiving device used by the first recipient B 1011, and the electronic device 101 may transmit an output message to a second receiving device used by the second recipient C 1021. In this case, the electronic device 101 may transmit an output message to the receiving devices in various communication schemes. The electronic device 101 may transmit a message using a message communication application. In an embodiment, the electronic device 101 may output the output message in a voice to at least one of the first recipient B 1011 and the second recipient C 1021. For example, the electronic device 101 may synthesize a content of a message to a voice and output the output message in a voice. There is no limitation on the way of synthesizing the contents of the messages into a voice by the electronic device 101. Meanwhile, the sender A may be a same person as the recipient, or may be different from the recipient.

According to an embodiment of the present disclosure, the electronic device 101 may convert the output message and provide the converted output message. For example, the electronic device 101 may generate the output message using the image analysis result, convert the output message using additional information, and then output the converted output message.

The electronic device 101 may identify a first relationship 1031 between the sender A 1001 and the first recipient B 1011. The electronic device 101 may identify a second relationship 1041 between the sender A 1001 and the second recipient C 1021. The electronic device 101 may identify a third relationship 1002 between the sender A 1001 and the electronic device 101, a fourth relationship 1012 between the first recipient B 1011 and the electronic device 101, and a fifth relationship 1013 between the electronic device 101 and the second recipient C 1021.

The electronic device 101 may set and store, in advance, at least one of the first relationship 1031 to the fifth relationship 1013, or may set at a time of outputting the output message. For example, the electronic device 101 may determine a recipient to receive the output message and may obtain relationship information corresponding to the determined recipient.

When the electronic device 101 transmits the output message to the first recipient B 1011, the electronic device 101 may convert the output message based on at least one of the first relationship 1031, the third relationship 1002, and the fourth relationship 1012. When the electronic device 101 transmits the output message to the second recipient C 1021, the electronic device 101 may convert the output message based on at least one of the second relationship 1041, the third relationship 1002, and the fifth relationship 1013. The converted message may be converted in accordance with a different condition depending on the recipient, and the message converted in accordance with the different condition may be different from each other.

Meanwhile, the electronic device 101 may configure at least one of the first relationship 1031 to the fifth relationship 1013 according to information previously inputted to the electronic device 101. For example, the electronic device 101 may receive information indicating that the relationship between the sender A 1001 and the first recipient B 1011 is a romantic relationship, and may configure the first relationship 1031 as the romantic relationship information according to the inputted information. Further, the electronic device 101 may receive information indicating that the first recipient B is a superior and the electronic device 101 is an inferior, and may configure the fourth relationship 1012 as the superior-inferior relationship information according to the inputted information. The electronic device 101 may previously store the relationship information or may learn at least one or more information through a sensor to infer the relationship information. A result of inferring the relationship information may be created into a database and stored in a memory accessible by the electronic device 101.

According to an embodiment of the present disclosure, the electronic device 101 may manage a relationship matrix. The relationship matrix may be a matrix for the relationship between a recipient and the electronic device 101 and the relationship between a sender and a recipient, and may include information regarding the relationship between the sender and the electronic device 101. For example, among relationships between a recipient and the electronic device 101, a friendship may reflect informal characteristics to the relationship matrix, a secretary-ship may reflect formal characteristics to the relationship matrix, and a romantic relationship may reflect emotional and romantic characteristics to the relationship matrix. Further, celebrity's fad words, voice, or other features may also be reflected to the relationship matrix according to the user's settings. For the relationship between the recipient and the sender, when being a close relationship such as a family relationship or friendship, the appellation and output message may be reprocessed, and when being a public relationship, the content may be generated to have polite words. Further, in a special relationship, pet names may be included between the recipient and the sender.

In operation 940, the electronic device 101 may convert the generated output message based on the relationship between the electronic device 101 and the recipient of the output message. For example, the electronic device 101 may add an appellation, e.g., "Dude", to the output message based on the "friend relationship" between the electronic device 101 and the recipient of the output message. In operation 950, the electronic device 101 may output the converted output message 1060. According to an embodiment of the present disclosure, the electronic device 101 may convert the output message based on at least one of the relationship information between the electronic device 101 and the sender or between the sender and the recipient, as well as the relationship between the electronic device 101 and the recipient.

Figure 11:
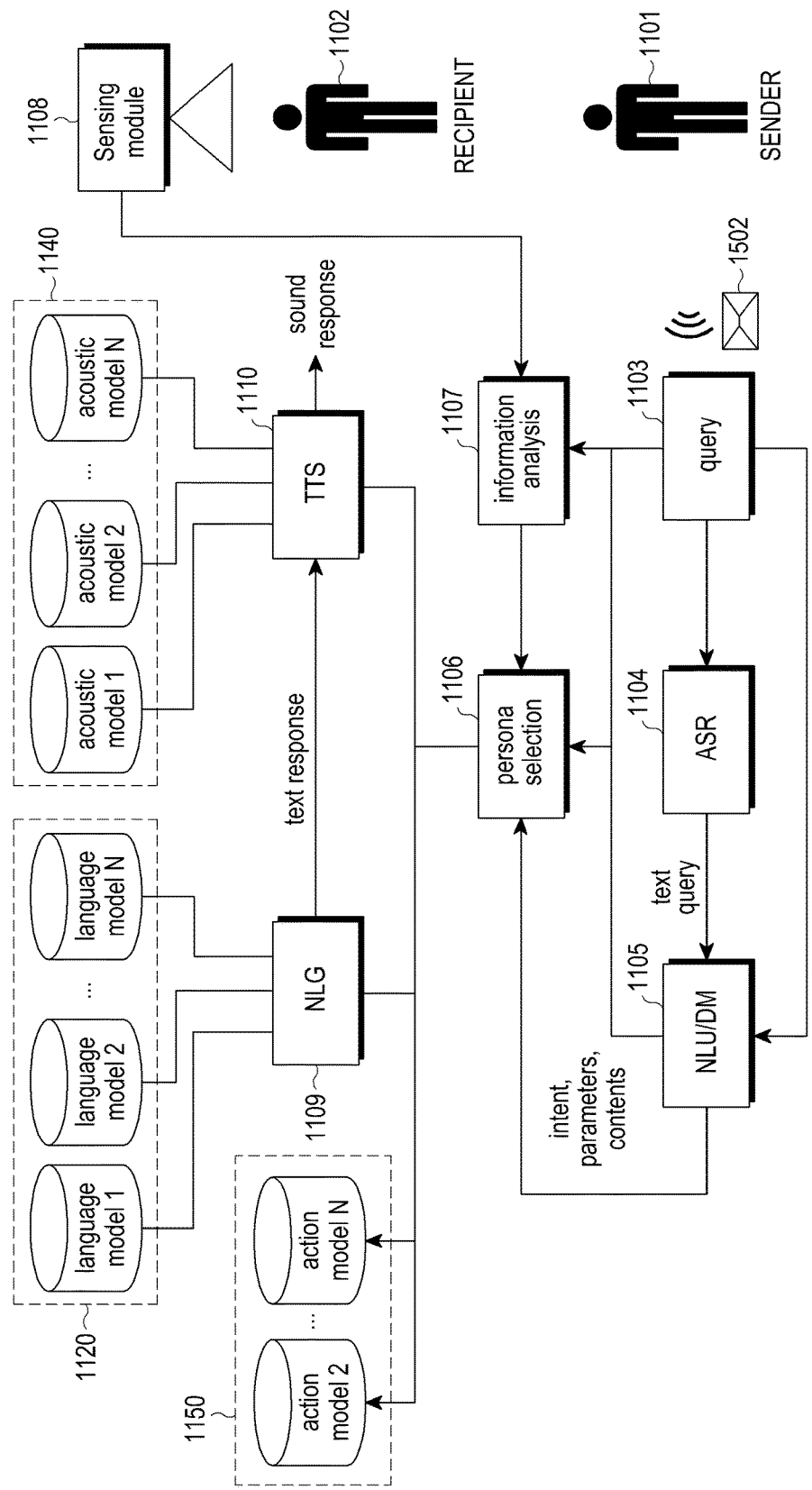
FIG. 11 is a concept view illustrating message conversion by an electronic device according to an embodiment of the present disclosure.

FIG. 11 is a concept view illustrating message conversion by an electronic device according to an embodiment of the present disclosure.

Referring to FIG. 11, the electronic device 101 may generate an output message 1502 including an image from the sender 1101. The electronic device 101 may query (1103) the output message 1502 including a result of analyzing the image and additional information with a voice to perform voice recognition (acoustic speech recognition) 1104. Alternatively, the electronic device 101 may query the metadata of the message 1502 to perform information analysis 1107. In particular, the electronic device 101 may determine the recipient 1102 with the information gathered by performing information analysis 1107 through the sensing module 1108. Further, the electronic device 101 may use the information regarding the recipient 1102 for attribute determination (or personal determination) 1106.

The electronic device 101 may obtain text as a result of the voice recognition 1104 and may query the same to perform natural language understanding (NLU)/dialog management (DM) 1105. Here, the text may be recognized as a sentence through the NLU/DM. The electronic device 101 may use at least one of the intent, parameter, and content obtained through the NLU/DM 1105 for attribute selection (or personal selection) 1106. The electronic device 101 may use the query 1103 of the message 1502 itself for the attribute selection 1106.

The electronic device 101 may select one of at least one language model 1120 through a natural language generator (NLG) 1109 based on the determined attribute. For example, the electronic device 101 may determine at least one text generation variable.

The electronic device 101 may select one of at least one behavior model based on the determined attribute. For example, the electronic device 101 may determine at least one action model 1150.

The electronic device 101 may select one of at least one acoustic model 1140 based on the determined attribute. For example, the electronic device 101 may determine at least one voice generation variable to output the message converted into text through the NLG 1109. The electronic device 101 may output a voice response (or sound response) according to the selected acoustic model. The electronic device 101 may perform text-to-speech (TTS) 1110 to output the sound response.

As described above, the electronic device 101 may provide dynamic results to the interacting user by changing the parameters on the NLG or TTS module according to the relationship between at least one or more entities or the content to be transferred.

The electronic device 101 may utilize, e.g., the sensor, such as vision or sound, for identifying at least one or more users and environment, connectivity, and personal profile data, as well as the content of the message to be transferred in the attribute selection process 1106. For the language model 1120, different language models may be determined depending on the recipient and the electronic device 101. For example, when the relationship between the recipient 1102 and the electronic device 101 is set as friends previously or by study, a language model for configuring words or phrases expressing intimacy may be selected, and for an urgent message, an acoustic model with a feature of fast and clear tones may be selected and language-exchanged. According to an embodiment of the present disclosure, the electronic device 101 may modulate the voice with a low-frequency band voice acoustic model and output the same based on the information indicating that the recipient has difficulty hearing high-frequency band voices.

Figure 12:
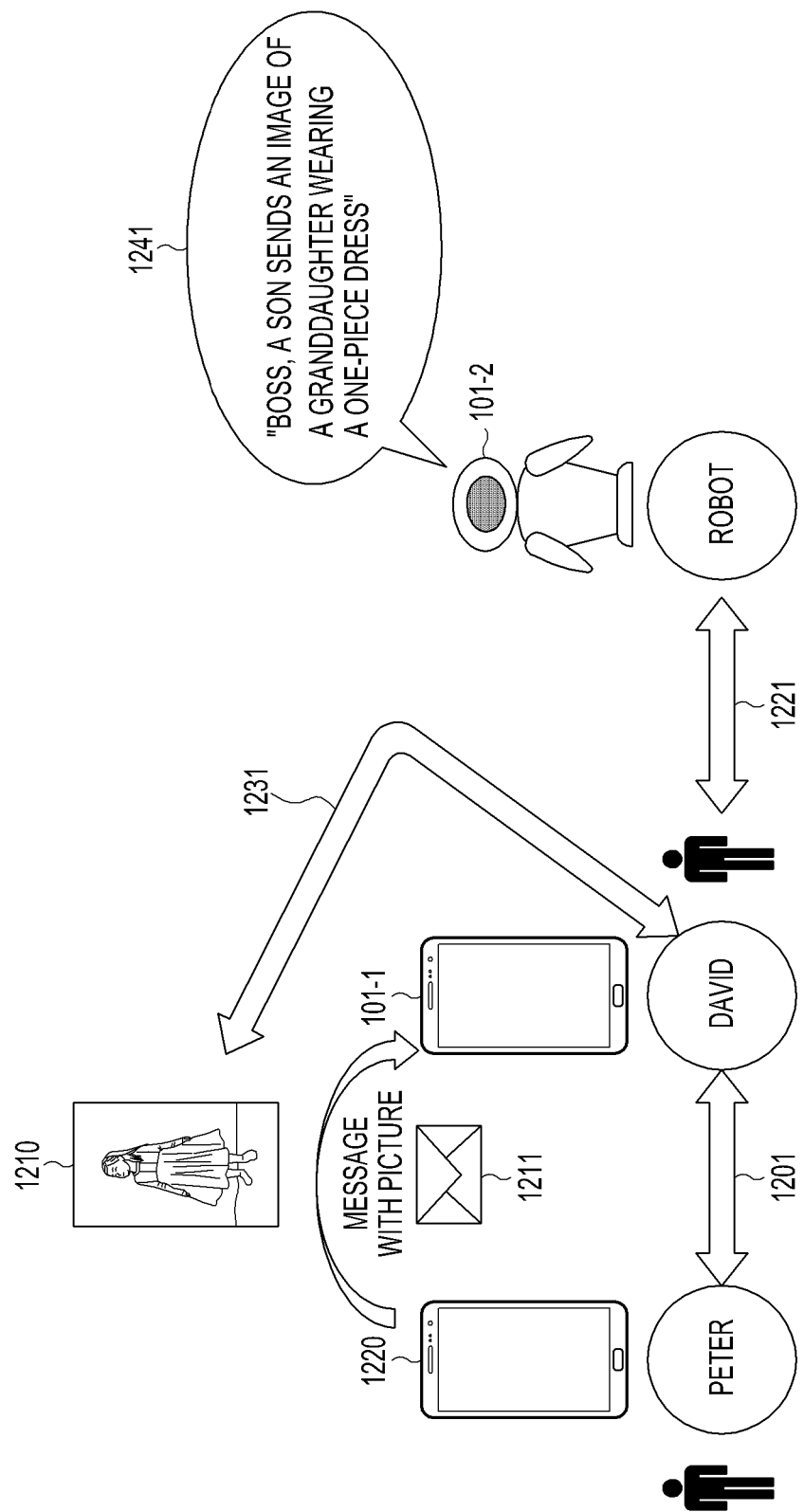
FIG. 12 is a concept view illustrating a message output according to an embodiment of the present disclosure.

FIG. 12 is a concept view illustrating a message output according to an embodiment of the present disclosure.

Referring to FIG. 12, the electronic device may convert the output message using relationships between a person identified in the image and the recipient, between the electronic device and the recipient, and between the sender of the image and the recipient.

Specifically, the electronic device 101-1 may receive the message 1211 including an image 1210 from another electronic device 1220. It is supposed that the other electronic device 1220 is a device used by a user, e.g., "Peter", and the electronic device 101-1 is a device used by a user, e.g., "David". The electronic device 101-1 may receive the message 1211. An electronic device 101-2 may be connected with the electronic device 101-1. The electronic device 101-2 may determine whether the electronic device 101-1 receives the message 1211 including the image 1210, and may further receive and analyze the image 1210. The electronic device 101-2 may recognize a person in the image 1210, e.g., Jane, using the result of analyzing the image 1210. As described above, the electronic device 101-2 may previously store a template to recognize Jane, and recognize the person in the image 1210 by comparing attributes of the person with the template. Here, the template may be an image related with Jane, and the electronic device 101-2 may previously store an image related with Jane as the template. For example, the electronic device 101-2 may obtain an image regarding a face of Jane in advance, and store the image as a Jane-related template. Later, the electronic device 101-2 may recognize a face area of the obtained image and compare the face area with the previously stored template, thereby recognizing the person in the image as Jane.

The electronic device 101-2 may determine the relationship between a person identified in the image 1210 Jane and the recipient David. The electronic device 101-2 may determine that the relationship between the person identified in the image 1210 and the recipient is a granddaughter-grandfather relationship. The electronic device 101-2 may previously store various personal information or relationship information according to a person, and may determine a relationship 1231 between the person in the image 1210 and the recipient based on the stored personal information or the relationship information by a person.

In the meantime, the electronic device 101-2 may determine the relationship 1201 between the sender of the image 1210, Peter and the recipient of the image 1210, David. For example, the electronic device 101-2 may determine that the relationship 1201 between the sender of the image 1210 and the recipient of the image 1210 is a son-father relationship. The electronic device 101-2 may previously store various personal information or relationship information regarding the sender of the image 1210, and may determine the relationship 1201 between the sender of the image 1210 and the recipient of the image 1210 based on the stored personal information or relationship information depending on a person.

Further, the electronic device 101-2 may determine the relationship 1221 between the recipient of the image 1210, David and the electronic device 101-2. The electronic device 101-2 may grant an attribute to itself, such that the electronic device 101-2 may determine the relationship 1221 between the recipient of the image 1210, e.g., David, and the electronic device 101-2 itself based on the granted attribute. For example, the electronic device 101-2 may determine that the relationship 1221 between the recipient of the image 1210, e.g., David, and the electronic device 101-2 is a president-secretary relationship. A user may input the relationship 1221, in advance, to the electronic device 101-2, and thus the relationship 1221 is set therein.

The electronic device 101-2 may convert the image analysis result based on various relationships 1201, 1221, and 1231 and generate the output message. For example, the electronic device 101-2 may obtain a result of analyzing the image 1210, e.g., "a girl wears a one-piece dress" The electronic device 101-2 may replace the "girl" in the image analysis result with a "granddaughter" based on the relationship 1231 between a person identified in the image 120, e.g., Jane, and the recipient of the image 1210, e.g., David. The electronic device 101-2 may add an appellation, e.g., "Boss" in a front portion of a sentence based on the relationship 1231 between the recipient of the image 1210, e.g., David, and the electronic device 101-2. The electronic device 101-2 may add a content, e.g., "a son sends~" to the output message 1241 according to the relationship 1201 between the sender of the image 1210, e.g., Peter, and the recipient of the image 1210, e.g., David. As such, the electronic device 101-2 may generate the output message 1241, e.g., "Boss, a son sends an image of a granddaughter wearing a one-piece dress", and then output the same. For example, the electronic device 101-2 may convert the image analysis result using at least one of relationships between a person identified in the image, the sender, and the recipient and output the converted image analysis result.

FIGS. 13A to 13E are flowcharts illustrating operations of an electronic device and a server according to an embodiment of the present disclosure.

Figure 13A:
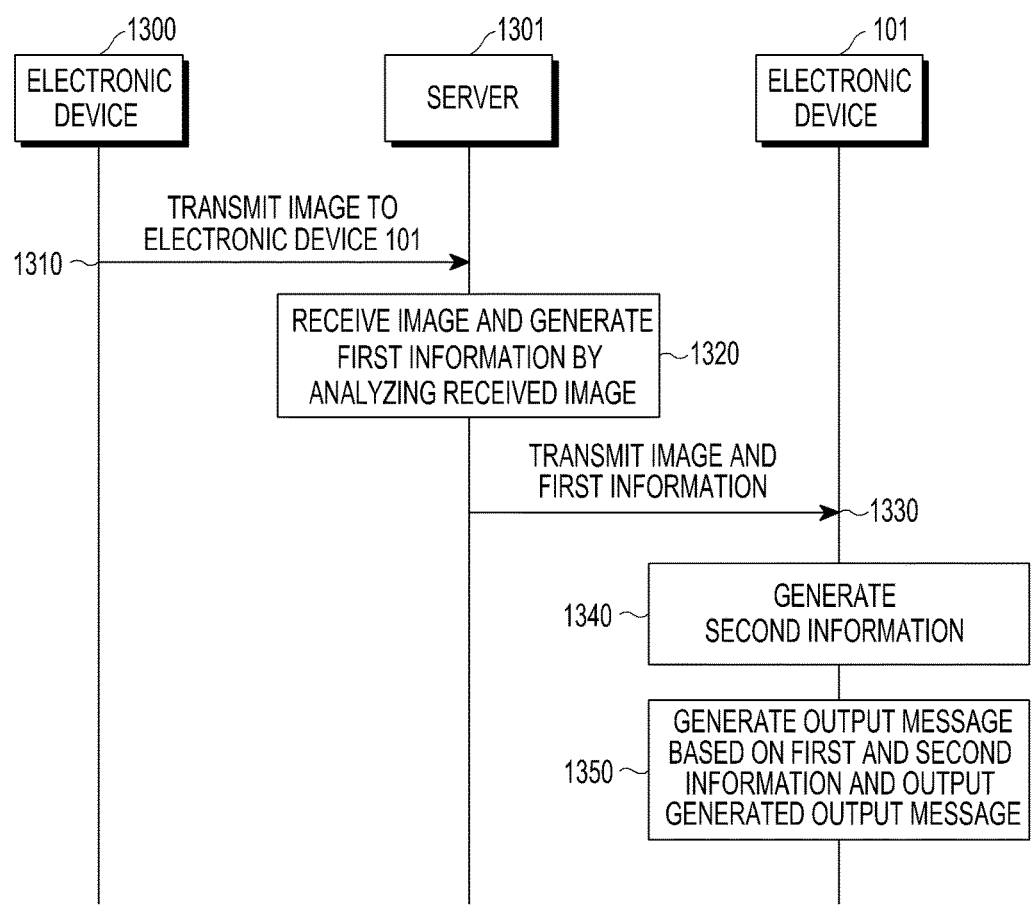
FIGS. 13A to 13E are flowcharts illustrating operations of an electronic device and a server according to an embodiment of the present disclosure.

Referring to FIG. 13A, in operation 1310, the electronic device 1300 may transmit an image to a server 1301. The electronic device 1300 may transmit an image to the electronic device 101 through the server 1301. For example, the server 1301 may be a relay server capable of performing transmission/reception of an image.

In operation 1320, the server 1301 may receive an image and analyze the received image to generate first information. As described above, the server 1301 may apply various recognition algorithms to the received image and recognize at least one object in the image or a relationship between at least one object in the image, thereby generating the first information including an image analysis result.

In operation 1330, the server 1301 may transmit the image and the first information to the electronic device 101. In operation 1340, the electronic device 101 may generate second information. According to an embodiment of the present disclosure, the electronic device 101 may generate the second information independent from the first information. For example, the electronic device 101 may generate the second information based on, e.g., a relationship between a user of the electronic device 1300 and a user of the electronic device 101. According to an embodiment of the present disclosure, the electronic device 101 may generate the second information related with the first information. For example, the electronic device 101 may generate information related with at least one object identified in the image as the second information. In operation 1350, the electronic device 101 may generate the output message based on the first information and the second information and output the generated output message. According to an embodiment of the present disclosure, the electronic device 101 may convert the first information based on the second information and output the converted information.

Figure 13B:
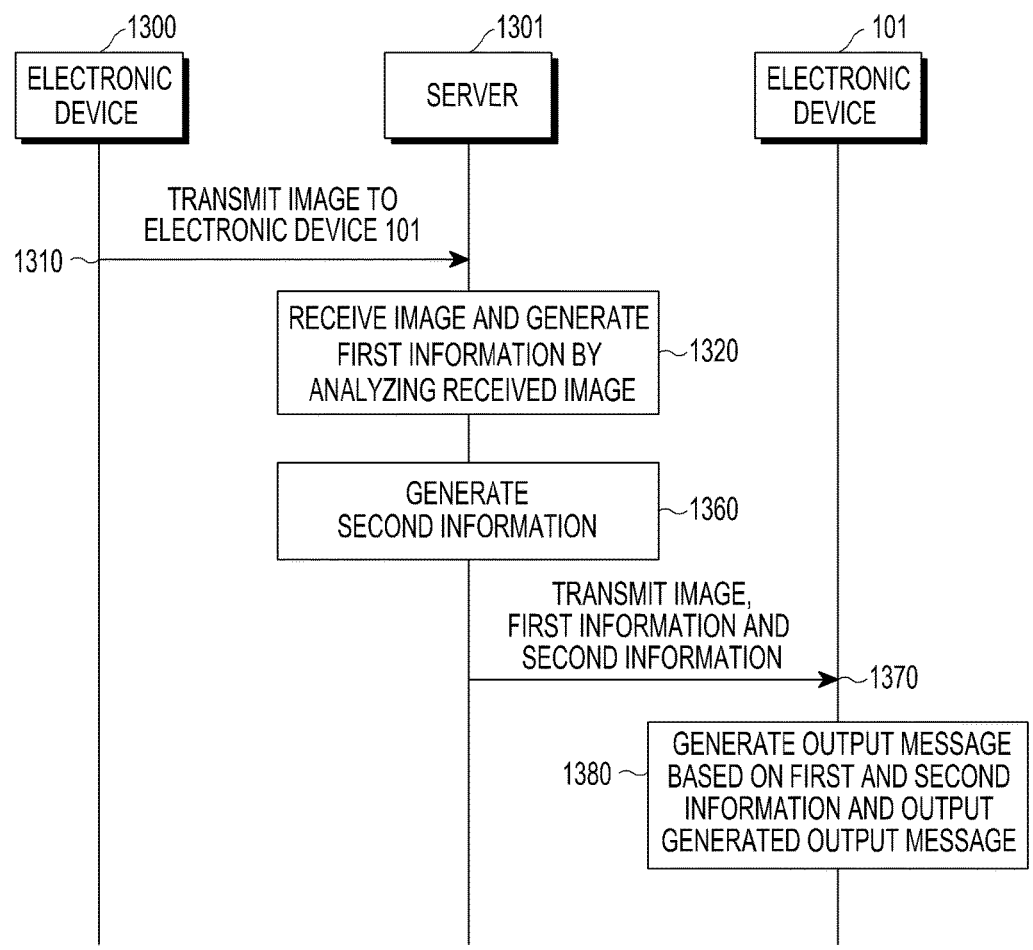

Referring to FIG. 13B, in operation 1310, the electronic device 1300 may transmit an image to a server 1301. The electronic device 1300 may transmit an image to the electronic device 101 through the server 1301.

In operation 1320, the server 1301 may receive an image and analyze the received image to generate first information. As described above, the server 1301 may apply various recognition algorithm to the received image and recognize at least one object in the image or a relationship between at least one object in the image, thereby generating the first information including an image analysis result.

In operation 1360, server 1301 may generate second information. According to an embodiment of the present disclosure, the server 1301 may generate the second information independent from the first information. For example, the server 1301 may generate the second information based on, e.g., a relationship between a user of the electronic device 1300 and a user of the electronic device 101. According to an embodiment of the present disclosure, the server 1301 may generate the second information related with the first information. For example, the server 1301 may generate information related with at least one object identified in the image as the second information. In operation 1370, the server 1301 may transmit the image, the first information, and the second information to the electronic device 101. In operation 1380, the electronic device 101 may generate the output message based on the first information and the second information and output the generated output message. According to an embodiment of the present disclosure, the electronic device 101 may convert the first information based on the second information and output the converted information.

Figure 13C:
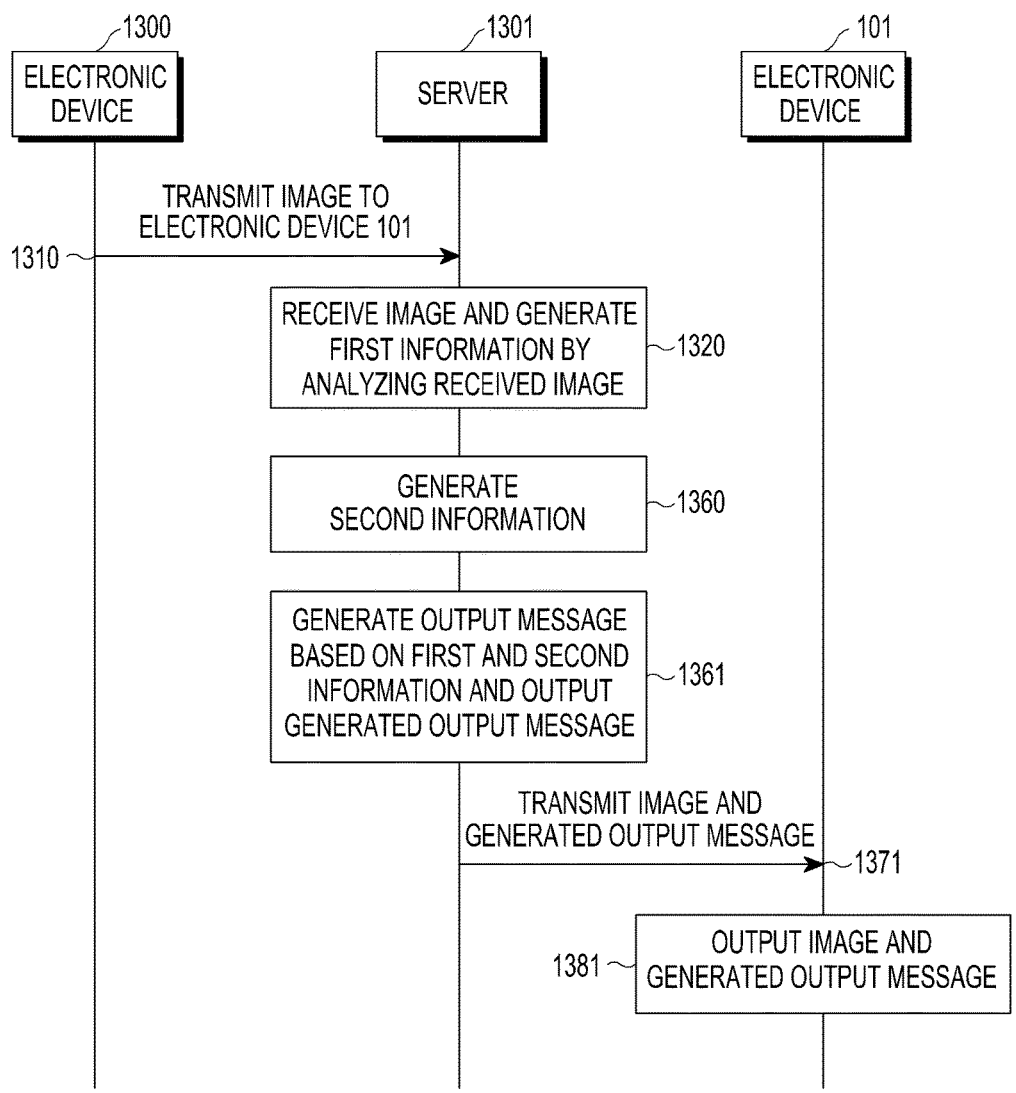

Referring to FIG. 13C, in operation 1310, the electronic device 1300 may transmit an image to a server 1301. The electronic device 1300 may transmit an image to the electronic device 101 through the server 1301.

In operation 1320, the server 1301 may receive an image and analyze the received image to generate first information. As described above, the server 1301 may apply various recognition algorithm to the received image and recognize at least one object in the image or a relationship between at least one object in the image, thereby generating the first information including an image analysis result.

In operation 1360, server 1301 may generate second information. According to an embodiment of the present disclosure, the server 1301 may generate the second information independent from the first information. For example, the server 1301 may generate the second information based on, e.g., a relationship between a user of the electronic device 1300 and a user of the electronic device 101. According to an embodiment of the present disclosure, the server 1301 may generate the second information related with the first information. For example, the server 1301 may generate information related with at least one object identified in the image as the second information. In operation 1361, the server 1301 may generate the output message based on the first information and the second information. According to an embodiment of the present disclosure, the electronic device 101 may convert the first information based on the second information and generate the output message.

In operation 1371, the server 1301 may transmit the image and generated output message to the electronic device 101. In operation 1381, the electronic device 101 may output at least one of the image or the generated output message.

Figure 13D:
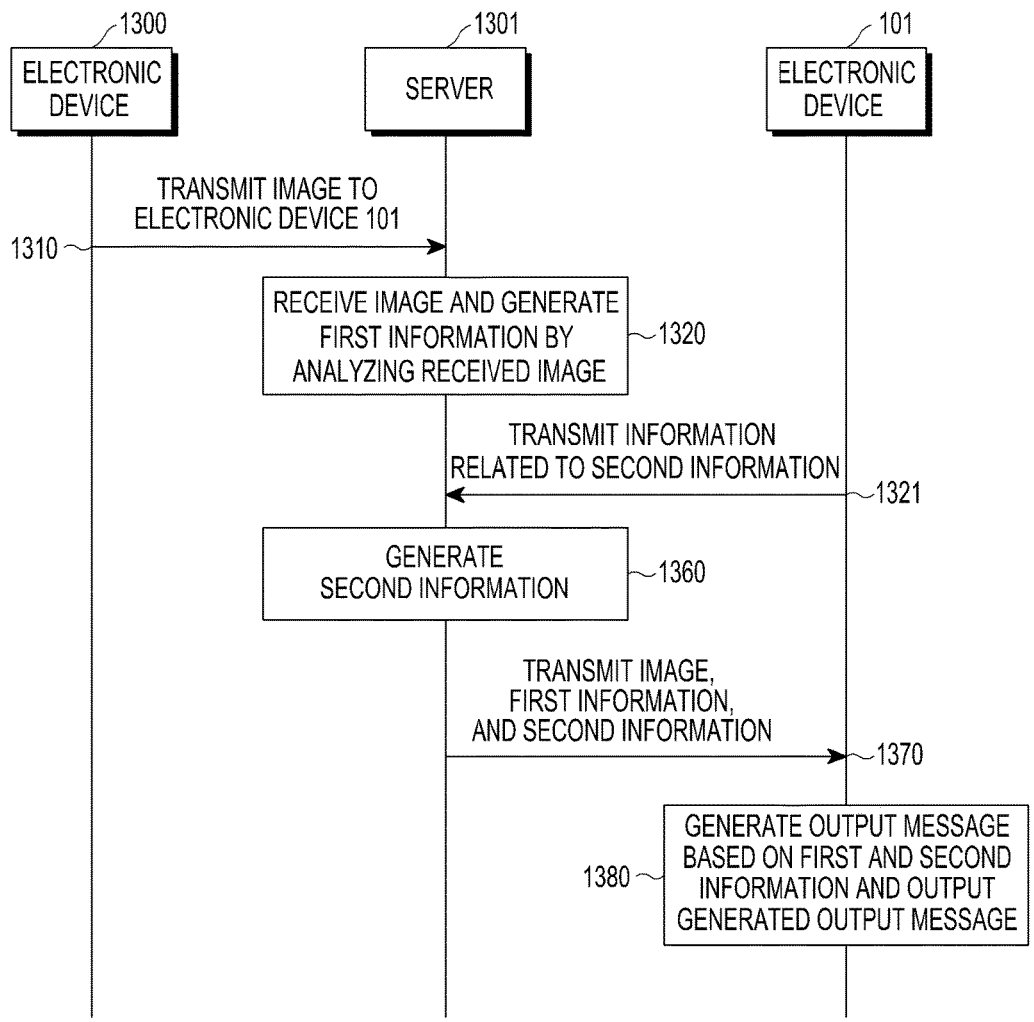
Figure 13E:
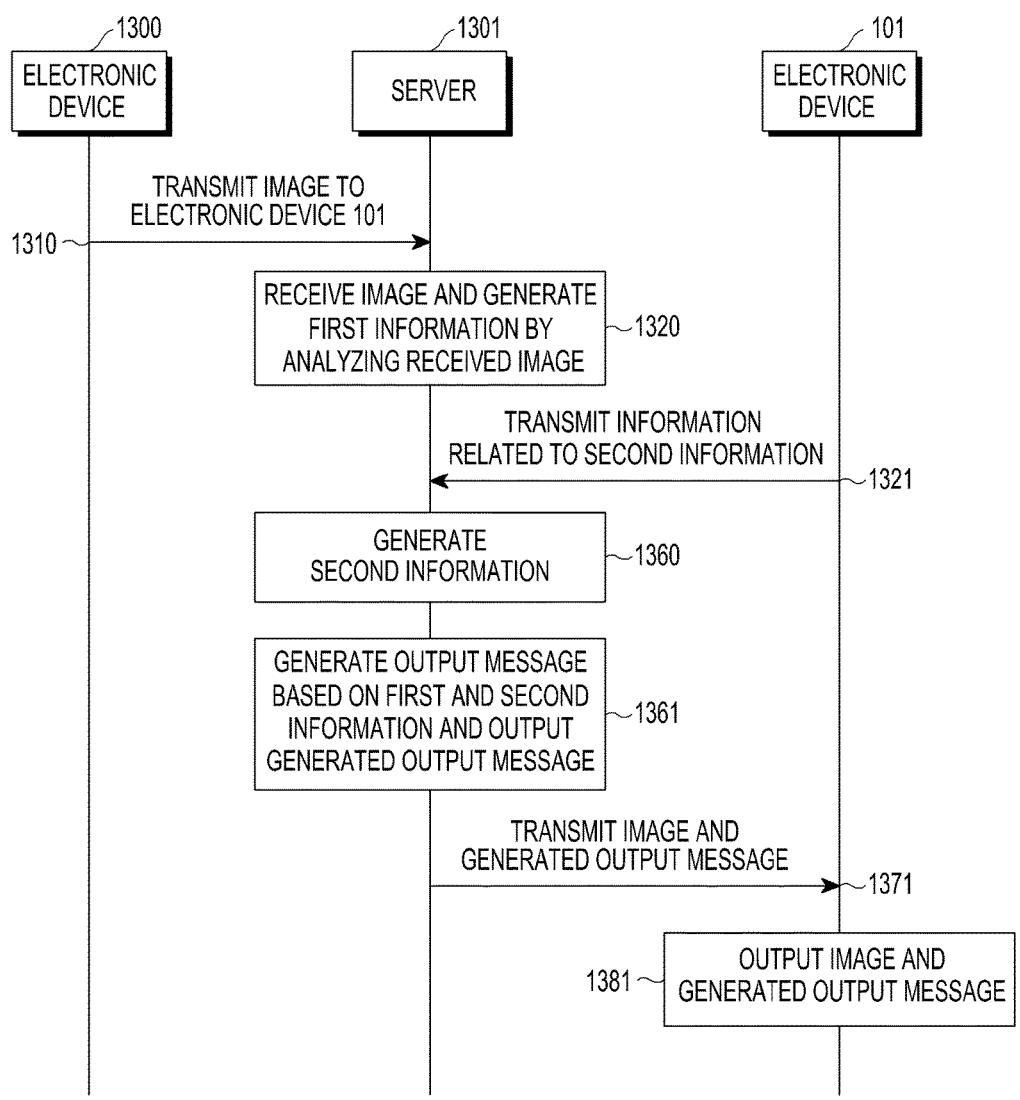

FIGS. 13D and 13E are flowcharts illustrating operations of a server 1301 according to an embodiment of the present disclosure.

Referring to FIGS. 13D and 13E, as shown in FIGS. 13B and 13C, the server 1301 may generate the second information in operation 1360. Meanwhile, in operation 1321, the server 1301 may receive information regarding the second information from the electronic device 101 before generating the second information. In order to generate the second information, the server 1301 may request the electronic device 101 to transmit information regarding the second information, or may periodically or non-periodically collect information related with the second information from the electronic device 101. The information related with the second information may be the second information itself as information to generate the second information.

As described with reference to FIGS. 13A to 13E, the process for generating the output message using the image analysis, analysis result, and additional information may be performed at least one of the server 1301 or the receiving electronic device 101.

Figure 14:
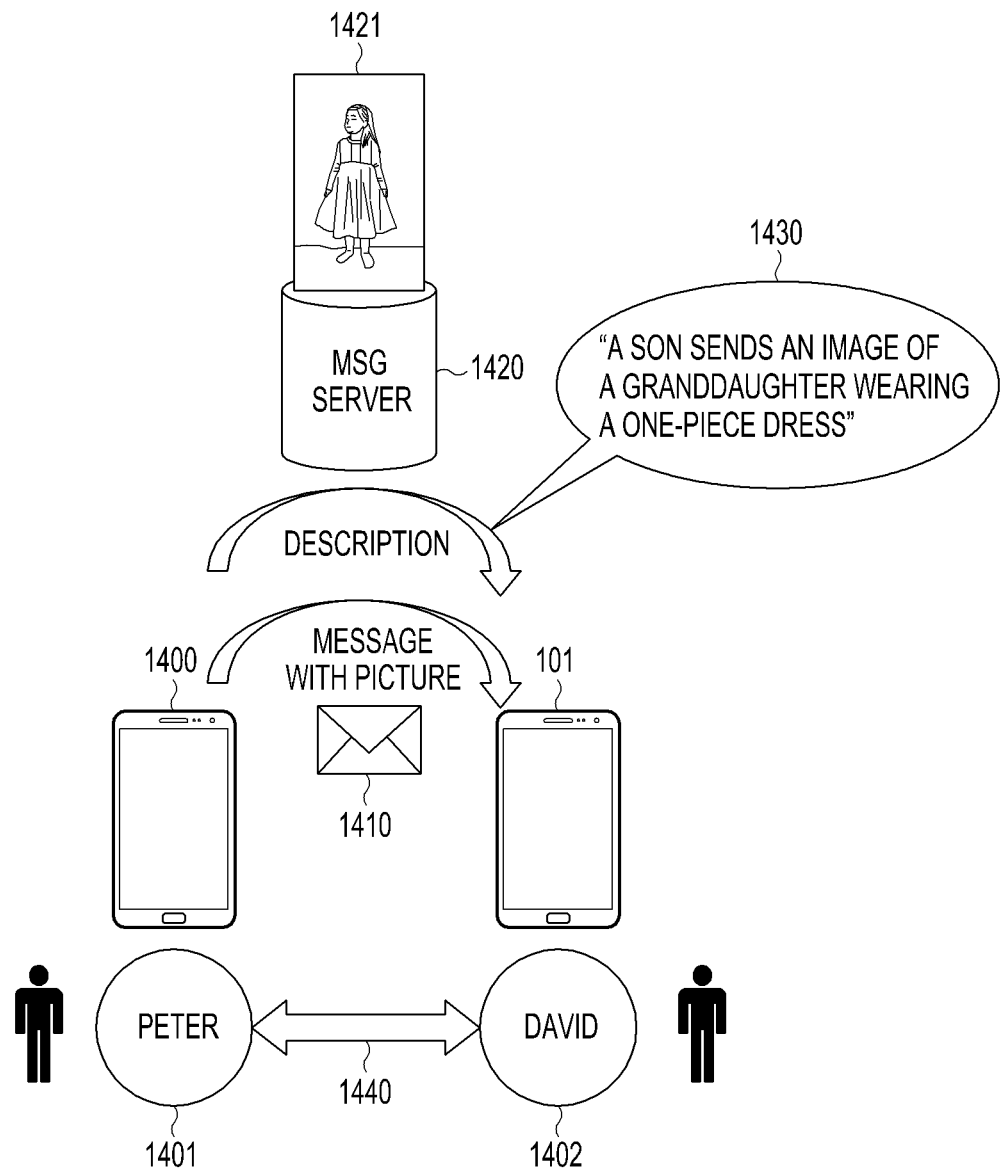
FIG. 14 is a concept view illustrating output message generation of a server according to an embodiment of the present disclosure.

FIG. 14 is a concept view illustrating output message generation of a server according to an embodiment of the present disclosure.

Referring to FIG. 14, a message server (MSG server) 1420 may receive a message 1410 including an image 1421 from an electronic device 1400 of a sender 1401. The electronic device 1400 may transmit the message 1410 including the image 1421 to the electronic device 101 through the message server 1420. For example, the message server 1420 may be a relay server capable of replaying the message 1410. Further, the message server 1420 may store a recognition algorithm analyzing the image 1421. The message server 1420 may store personal information and relationship information of the message transmitting and recipients 1401 and 1402. The message server 1420 may also store personal information and relationship information of a person identified from the result of analyzing the image 1421.

The message server 1420 may analyze the image 1421 included in the received message 1410. The message server 1420 may apply the stored recognition algorithm to the image 1421 and obtain an image analysis result including a relationship between at least one object and a result of recognizing at least one object in the image 1421. For example, the message server 1420 may analyze the image 1421 and obtain the image analysis result, e.g., "a girl wears a one-piece dress". The message server 1420 may convert the image analysis result using additional information. Specifically, the message server 1420 may convert the image analysis result based on the relationship between a person identified in the image 1421 and the recipient. For example, the message server 1420 may obtain a recognition result indicating that the person identified in the image 1421 is Jane and store information about the identified person in advance. The message server 1420 may previously store that the identified person, e.g., Jane, is a granddaughter of the recipient 1402, e.g., David, as the information about the identified person. The message server 1420 may convert the image analysis result, e.g., from "a girl wears a one-piece dress" to "a granddaughter wears a one-piece dress", based on the previously stored information. The image analysis result may be converted based on the relationship between the sender 1401 of the message 1410 and the recipient 1402 of the message 1410. For example, the message server 1420 may previously store that the relationship 1440 between the sender 1401 and the recipient 1402 is a son-father relationship. The message server 1420 may convert the converted message "a granddaughter wears a one-piece dress" into a message "a son sends an image of a granddaughter wearing a one-piece dress" based on the recognized relationship 1440. The message server 1420 may transmit an output message 1430 including the converted message "a son sends an image of a granddaughter wearing a one-piece dress" to the electronic device 101. The message server 1420 may transmit at least one of the message 1410 or the output message 1430 to the electronic device 101.

As described above, the relay server relaying the image may generate the output message including the image analysis result and additional information and transmit the generate output message to the receiving electronic device.

Figure 15A:
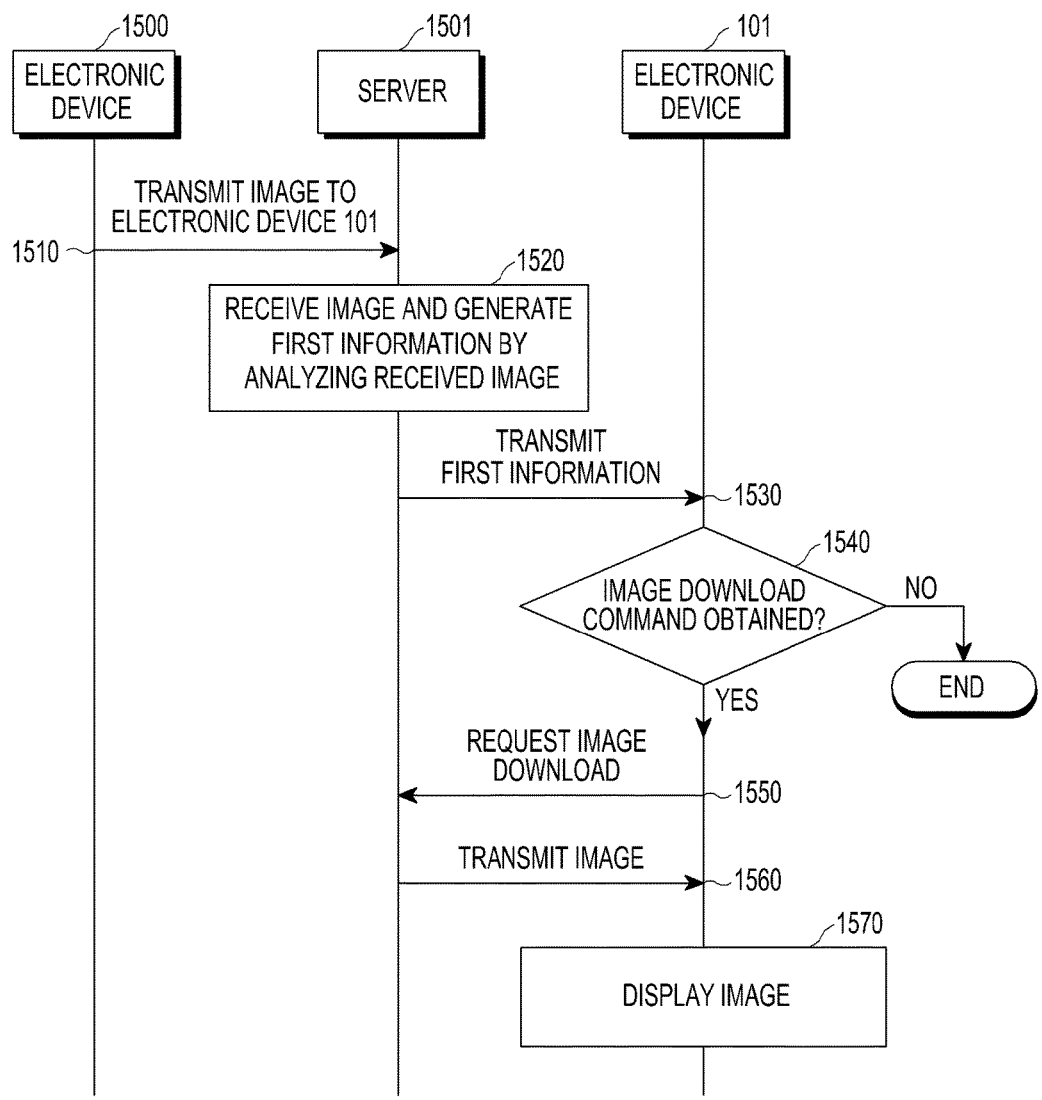
FIGS. 15A to 15C are flowcharts illustrating a method for controlling an electronic device according to an embodiment of the present disclosure.
Figure 15B:
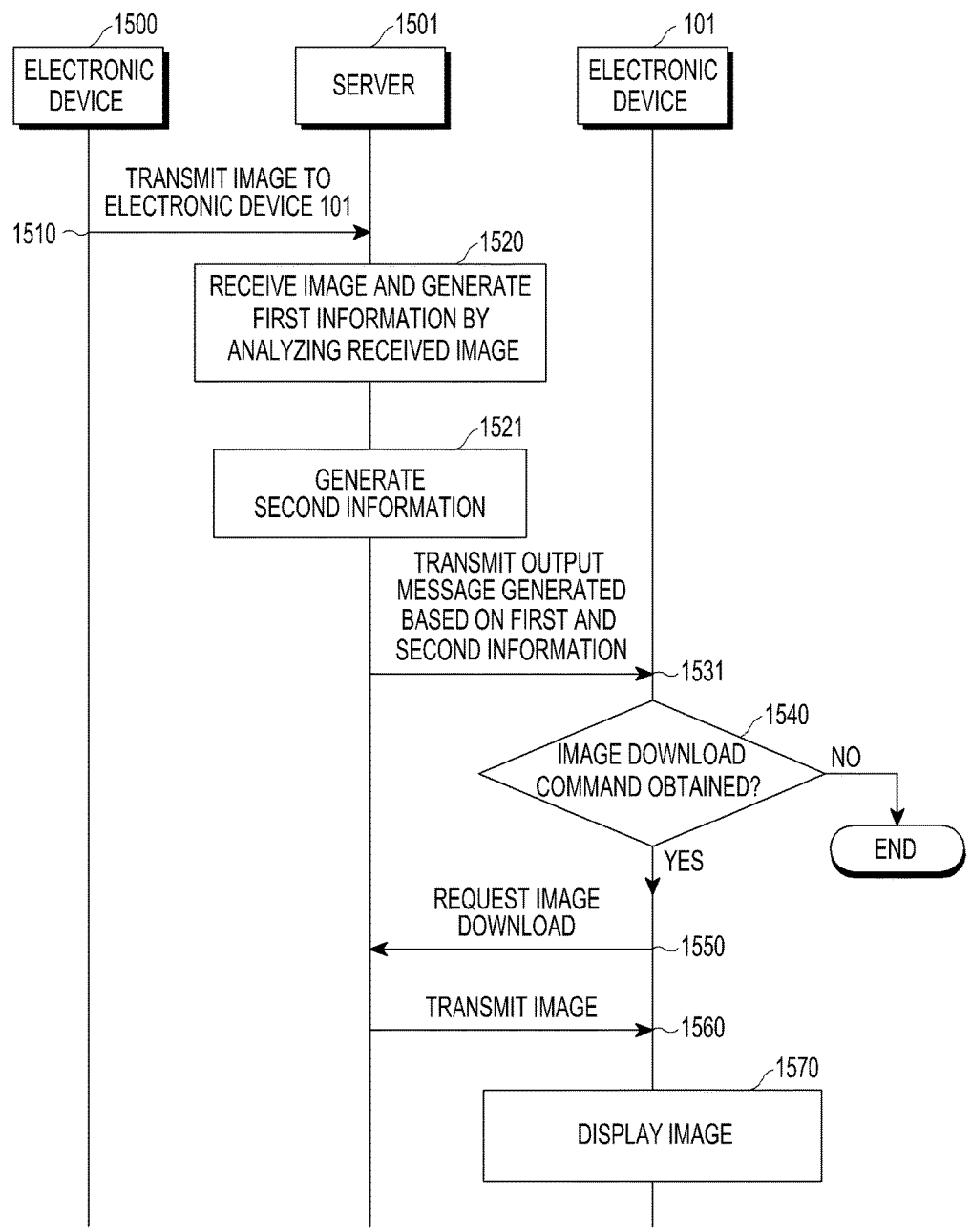

FIGS. 15A and 15B are flowcharts illustrating a method for controlling an electronic device according to an embodiment of the present disclosure.

Referring to FIG. 15A, in operation 1510, an electronic device 1500 may transmit an image to a server 1501. The electronic device 1500 may transmit an image to the electronic device 101 through the server 1501.

In operation 1520, the server 1501 may receive an image and analyze the received image to generate first information. The server 1501 may apply various recognition algorithm to the received image and recognize at least one object in the image or a relationship between at least one object in the image, thereby generating the first information including an image analysis result.

In operation 1530, the server 1501 may transmit the first information to the electronic device 101. In other words, the server 1501 may transmit the first information to the electronic device 101 before transmitting the image to the electronic device 101.

The electronic device 101 may receive the first information and display the received first information. In operation 1540, the electronic device 101 may obtain a command for an image download regarding whether to perform an image download related with the received first information. Upon obtaining the image download command, in operation 1550, the electronic device 101 may send a request for the image download to the server 1501. In operation 1560, the server 1501 may transmit the image to the electronic device 101 in response to the image download request. In operation 1570, the electronic device 101 may display the received image.

As described above, the electronic device 101 may receive the image analysis result, before downloading the image, to determine whether the image is downloaded.

Referring to FIG. 15B, in operation 1510, an electronic device 1500 may transmit an image to a server 1501. The electronic device 1500 may transmit an image to the electronic device 101 through the server 1501.

In operation 1520, the server 1501 may receive an image and analyze the received image to generate first information. The server 1501 may apply various recognition algorithm to the received image and recognize at least one object in the image or a relationship between at least one object in the image, thereby generating the first information including an image analysis result.

In operation 1521, server 1501 may generate second information. According to an embodiment of the present disclosure, the server 1501 may generate the second information independent from the first information. For example, the server 1501 may generate the second information based on, e.g., a relationship between a user of the electronic device 1500 and a user of the electronic device 101. According to an embodiment of the present disclosure, the server 1501 may generate the second information related with the first information. For example, the server 1501 may generate information related with at least one object identified in the image as the second information.

In operation 1531, the server 1501 may transmit an output message generated based on the first information and the second information to the electronic device 101. The server 1501 may transmit the output message based on the first information and the second information to the electronic device 101 before transmitting the image to the electronic device 101.

The electronic device 101 may receive the first information and display the received first information. In operation 1540, the electronic device 101 may obtain a command for an image download regarding whether to perform an image download related with the received first information. Upon obtaining the image download command, in operation 1550, the electronic device 101 may send a request for the image download to the server 1501. In operation 1560, the server 1501 may transmit the image to the electronic device 101 in response to the image download request. In operation 1570, the electronic device 101 may display the received image.

As described above, the electronic device 101 may receive the output message including the image analysis result, before downloading the image, to determine whether the image is downloaded.

Figure 15C:
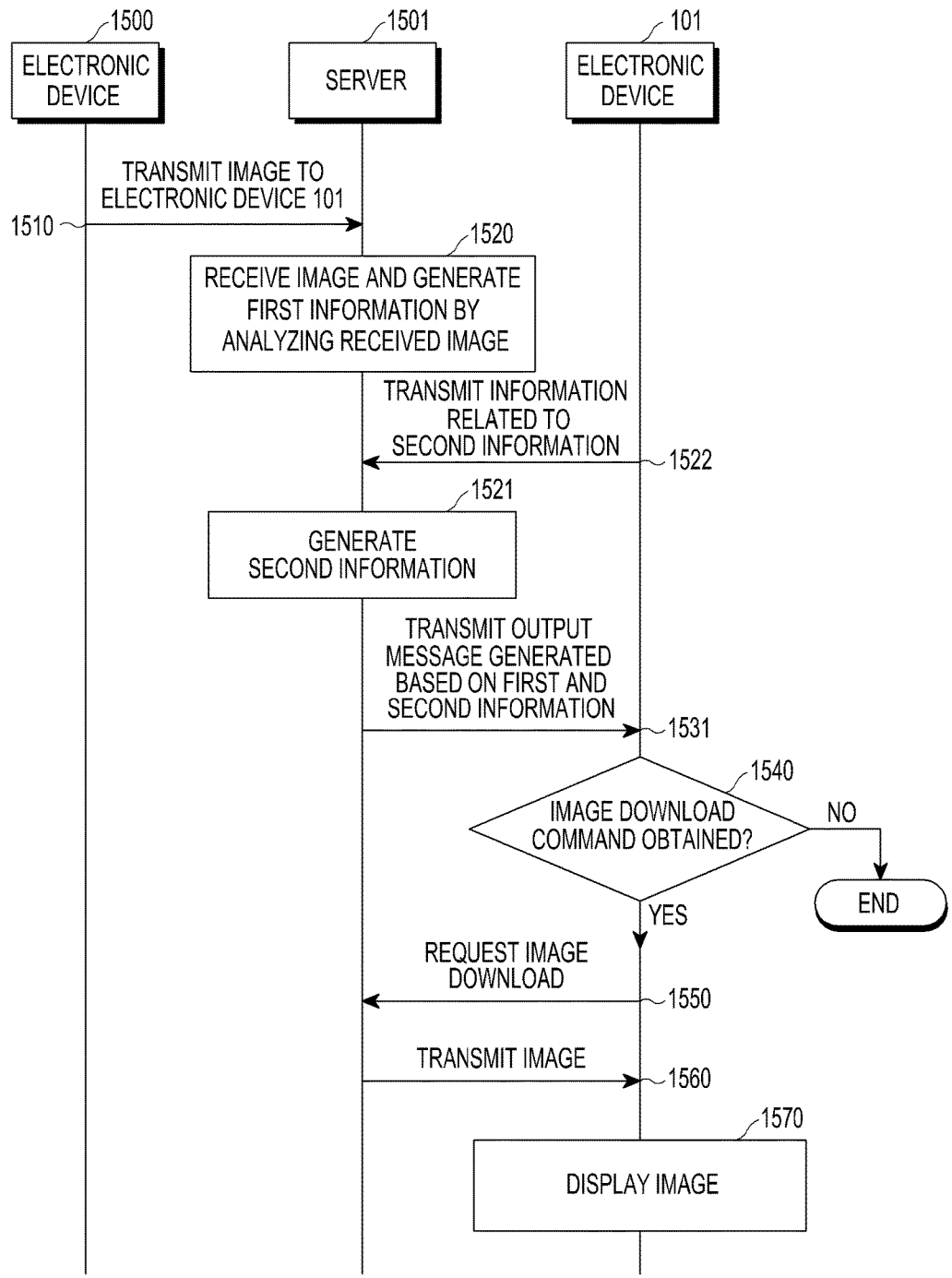

FIG. 15C is a flowchart illustrating an operation of a server according to an embodiment of the present disclosure.

Referring to FIG. 15C, as shown in FIG. 15B, the server 1501 may generate the second information in operation 1521. Meanwhile, in operation 1522, the server 1501 may receive information regarding the second information from the electronic device 101 before generating the second information. In order to generate the second information, the server 1501 may request the electronic device 101 to transmit information regarding the second information, or may periodically or non-periodically collect information related with the second information from the electronic device 101. The information related with the second information may be the second information itself as information to generate the second information.

Figure 16A:
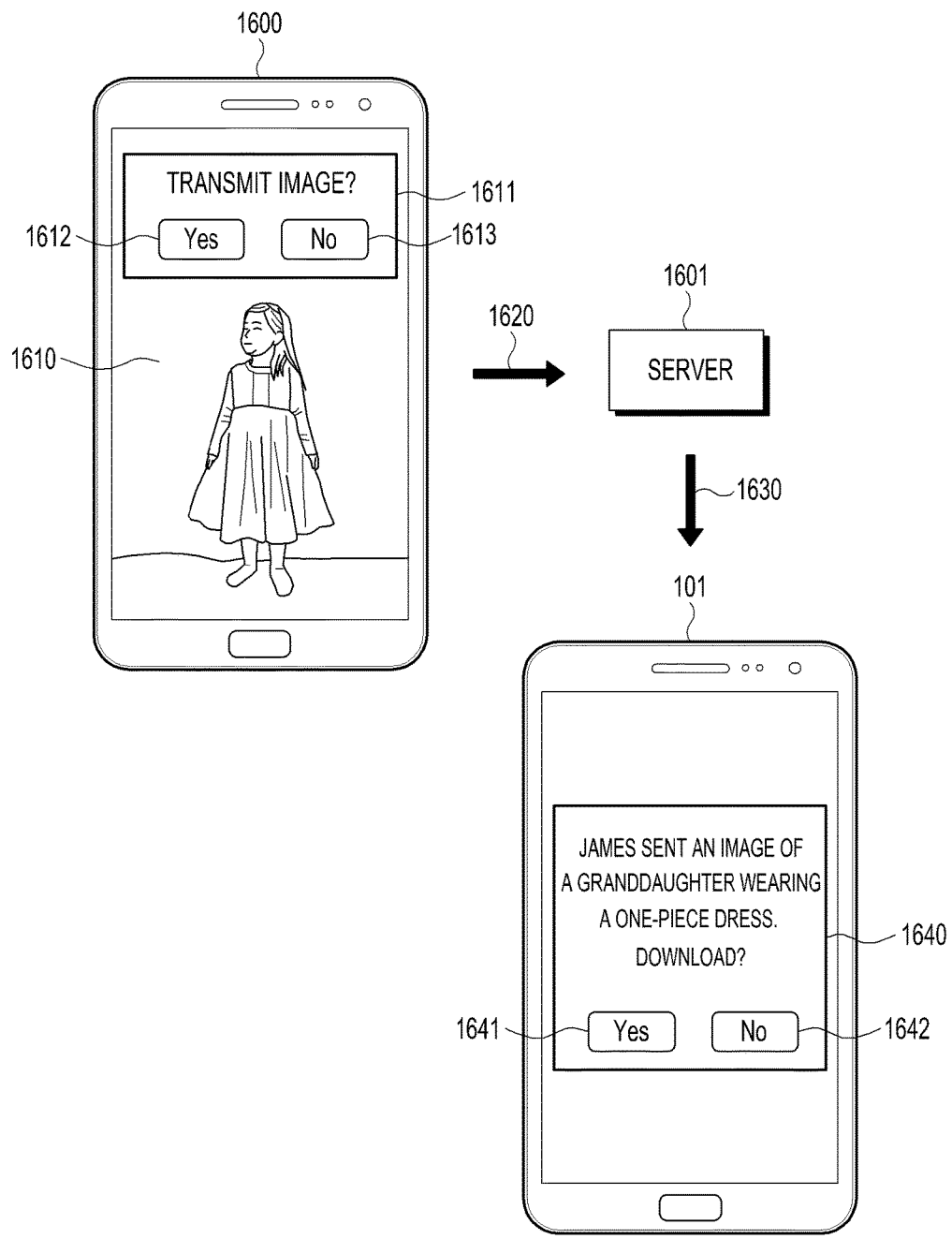
FIGS. 16A and 16B are concept views illustrating an electronic device according to an embodiment of the present disclosure.
Figure 16B:
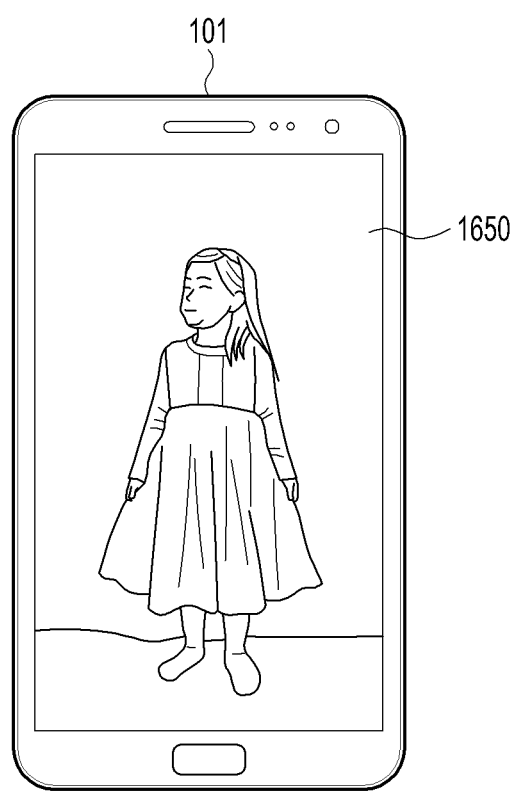

FIGS. 16A and 16B are concept views illustrating an electronic device according to an embodiment of the present disclosure.

Referring to FIG. 16A, a transmitting electronic device 1600 may transmit an image stored therein to a receiving electronic device 101. The electronic device 1600 may display a graphic user interface 1611 to transmit an image 1610. The graphic user interface 1611 may include at least one of selection buttons 1612 and 1613 to determine whether to transmit the image 1610. Upon detecting an input to the selection button 1612 requesting transmission, the electronic device 1600 may transmit (1620) the image 1610 to a server 1601.

The server 1601 may analyze the image 1610 and obtain an image analysis result. Further, the server 1601 may generate additional information. According to an embodiment of the present disclosure, the server 1601 may generate the additional information independent from the image analysis result. For example, the server 1601 may generate the additional information based on, e.g., a relationship between a user of the electronic device 1600 and a user of the electronic device 101. According to an embodiment of the present disclosure, the server 1601 may generate the additional information related with the image analysis result. For example, the server 1601 may generate information related with at least one object identified in the image as the second information. Accordingly, the server 1601 may generate an output message including the image analysis result and the additional information. Or, the server 1601 may generate an output message where the image analysis result is converted using the additional information. The server 1601 may transmit (1630) the output message to the electronic device 101.

The electronic device 101 may display a graphic user interface 1640 based on the received output message. According to an embodiment of the present disclosure, the graphic user interface 1640 may include the output message including content of requesting whether to download an image and an image analysis result. Further, the graphic user interface 1640 may include a button 1641 to approve the image download and a button 1642 to reject the image download. A user may identify the content of the image in advance through the graphic user interface 1640 and determine whether to download the image after identifying the content of the image. When the button 1641 to approve an image download is designated, the electronic device 101 may send a request for an image download to a server 1601, and the server 1601 may transmit the image to the electronic device 101 in response to the request for the image download. As illustrated in FIG. 16B, the electronic device 101 may display the received image 1650.

Figure 17:
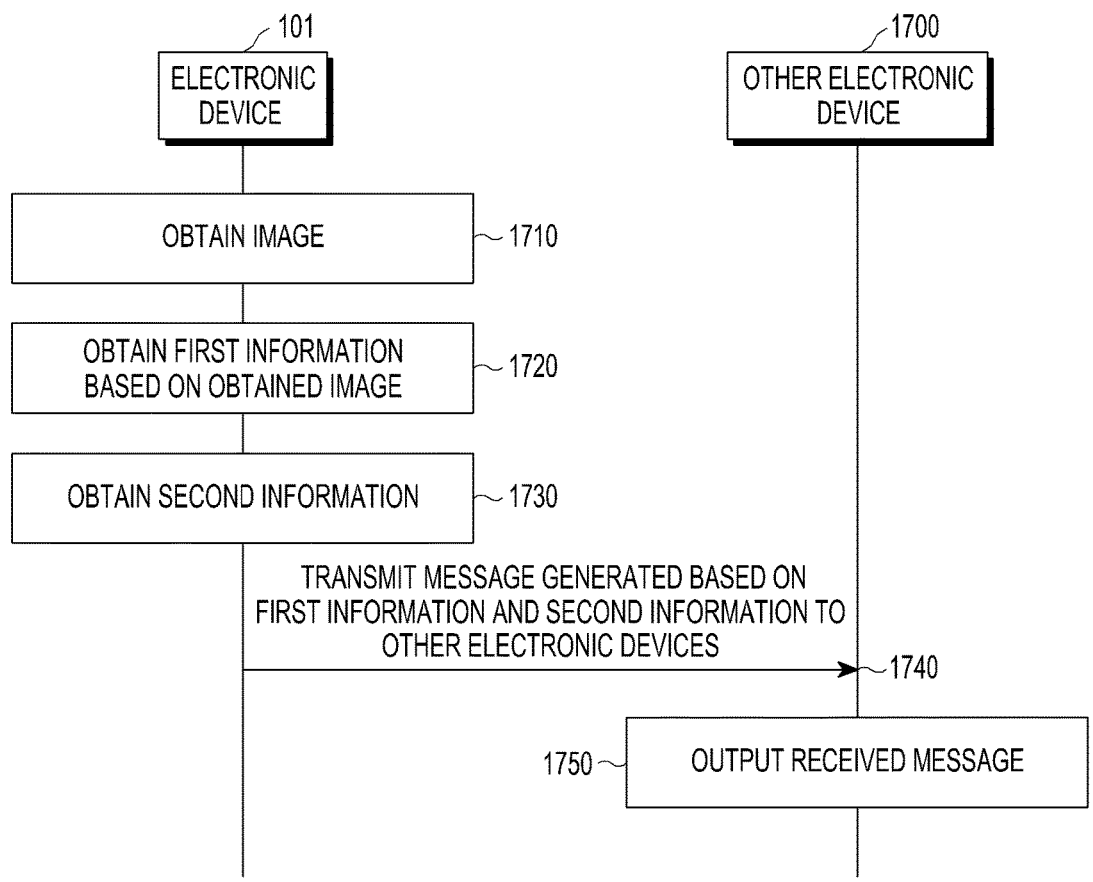
FIG. 17 is a flowchart illustrating a method for controlling an electronic device according to an embodiment of the present disclosure.

FIG. 17 is a flowchart illustrating a method for controlling an electronic device according to an embodiment of the present disclosure.

Referring to FIG. 17, in operation 1710, the electronic device 101 may obtain an image. As described above, the electronic device 101 may capture an image through a camera module included therein, receive an image through a communication module, or load an image stored in the memory.

In operation 1720, the electronic device 101 may analyze the obtained image and obtain first information. According to an embodiment of the present disclosure, the electronic device 101 may apply a recognition algorithm to the image and obtain an image analysis result. The electronic device 101 may generate the first information including the image analysis result.

In operation 1730, the electronic device 101 may obtain second information which is additional information. For example, the electronic device 101 may obtain relationship information between the electronic device 101 and the recipient, which is independent from the image analysis result, as the second information. Further, the electronic device 101 may obtain the second information related with the image analysis result. According to an embodiment of the present disclosure, the electronic device 101 may obtain the second information according to previously inputted information or a learning result.

In operation 1740, the electronic device 101 may transmit an output message generated based on the first information and the second information to another electronic device 1700. The electronic device 101 may previously transmit the message to the other electronic device 1700, and then transmit the corresponding image upon receiving a request for sending an image from the other electronic device 1700. In operation 1750, the other electronic device 1700 may display the message received from the electronic device 101.

Figure 18:
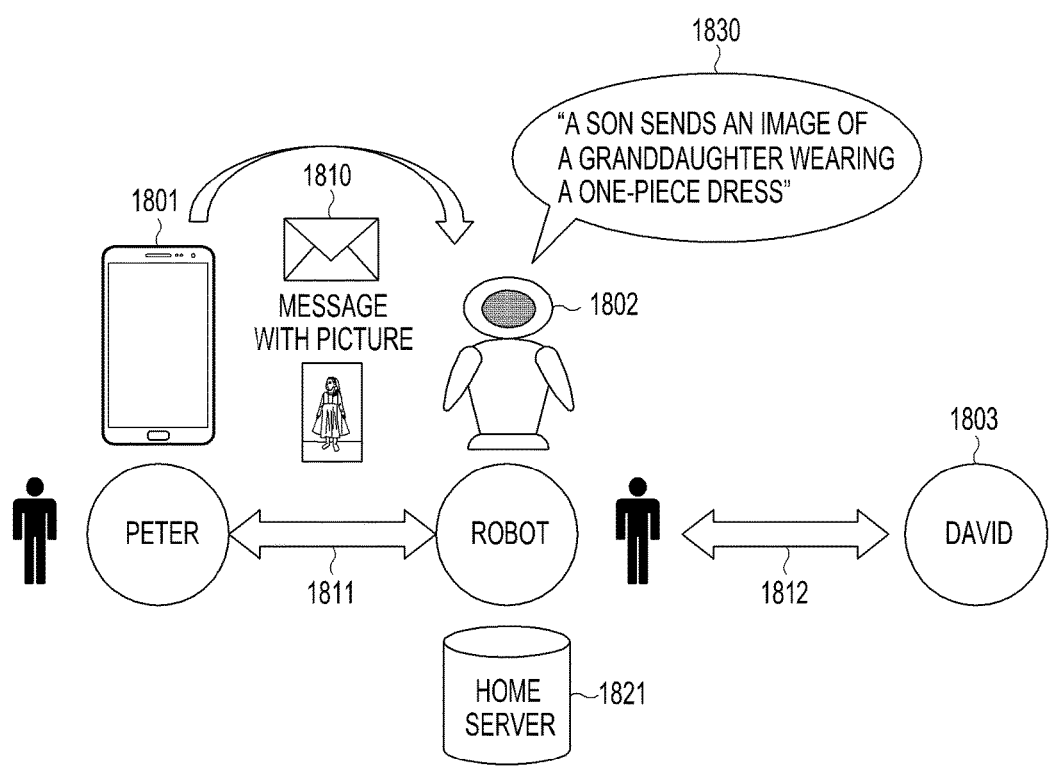
FIG. 18 is a concept view illustrating an operation of an electronic device operating as a home server according to an embodiment of the present disclosure.

FIG. 18 is a concept view illustrating an operation of an electronic device operating as a home server according to an embodiment of the present disclosure.

Referring to FIG. 18, an electronic device 1802 may be connected with a home server 1821. The home server 1821 may store personal information and relationship information according to a person. According to an embodiment of the present disclosure, the electronic device 1802 may store personal information and relationship information according to a person.

The electronic device 1802 may receive a message 1810 including the image from another electronic device 1801. The electronic device 1802 may analyze the image in the received message 1810 and obtain an image analysis result. According to an embodiment of the present disclosure, the electronic device 1802 may send a request for image analysis to the home server 1821 using a query, and the home server 1821 may transmit the image analysis result obtained by analyzing the received image to the electronic device 1802.

The electronic device 1802 may generate an output message 1830 using the image analysis result and additional information. The electronic device 1802 may convert the image analysis result using the additional information to generate the output message 1830. The electronic device 1802 may obtain the additional information from the home server 1821 to generate the output message 1830. Or, the home server 1821 may generate the output message 1830 using the image analysis result and additional information, and transmit the generated output message 1830 to the electronic device 1802. The electronic device 1802 or the home server 1821 may generate the output message 1830 using at least one of the relationship 1811 between a sender and the electronic device 1802, the relationship 1812 between the electronic device 1802 and a recipient 1803, or the relationship between a person identified in the image and the recipient 1803. The electronic device 1802 may recognize the recipient 1803 of the message 1810 and may output the output message, e.g., with a voice. The electronic device 1802 may additionally receive an input of a command for displaying image from the recipient 1803 and display the image in response to the command for displaying image.

Figure 19:
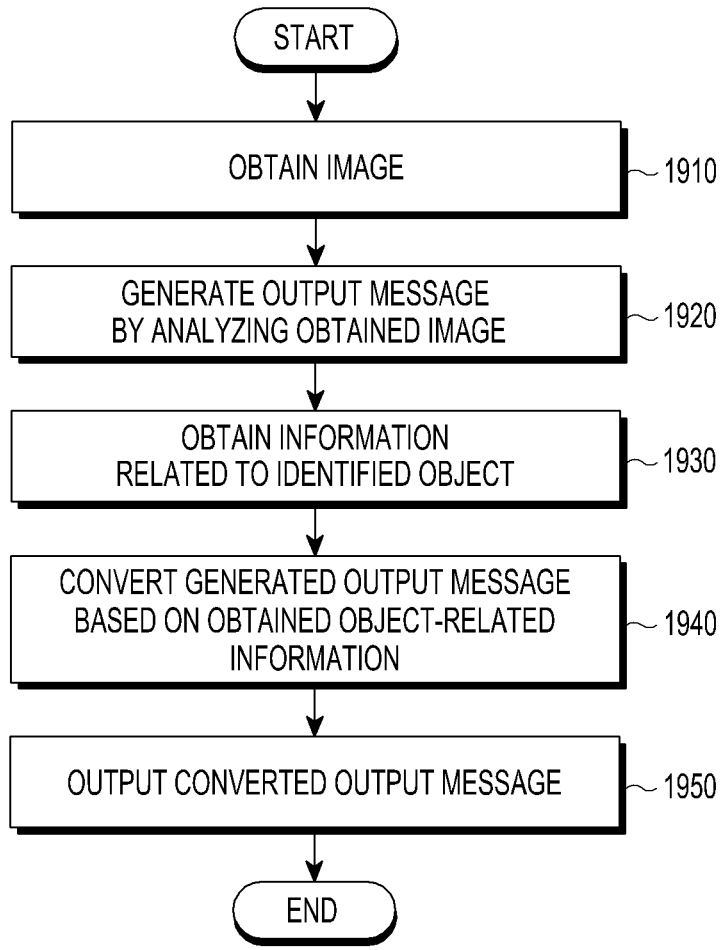
FIG. 19 is a flowchart illustrating a method for controlling an electronic device according to an embodiment of the present disclosure.

FIG. 19 is a flowchart illustrating a method for controlling an electronic device according to an embodiment of the present disclosure. The embodiment of FIG. 19 is described in further detail with reference to FIGS. 20A and 20B.

Figure 20A:
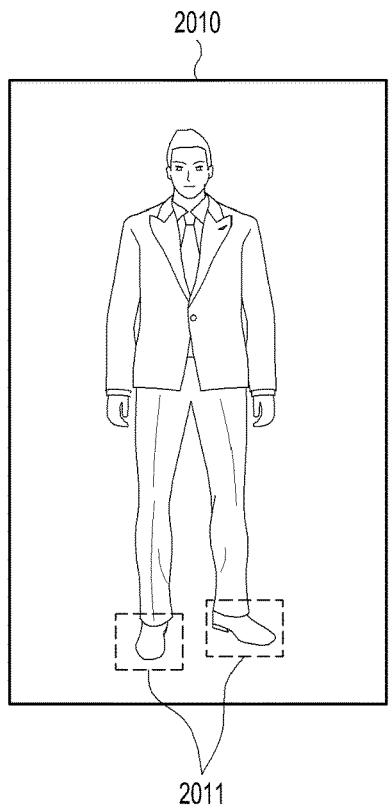
FIG. 20A is a concept view illustrating an image according to an embodiment of the present disclosure.
Figure 20B:
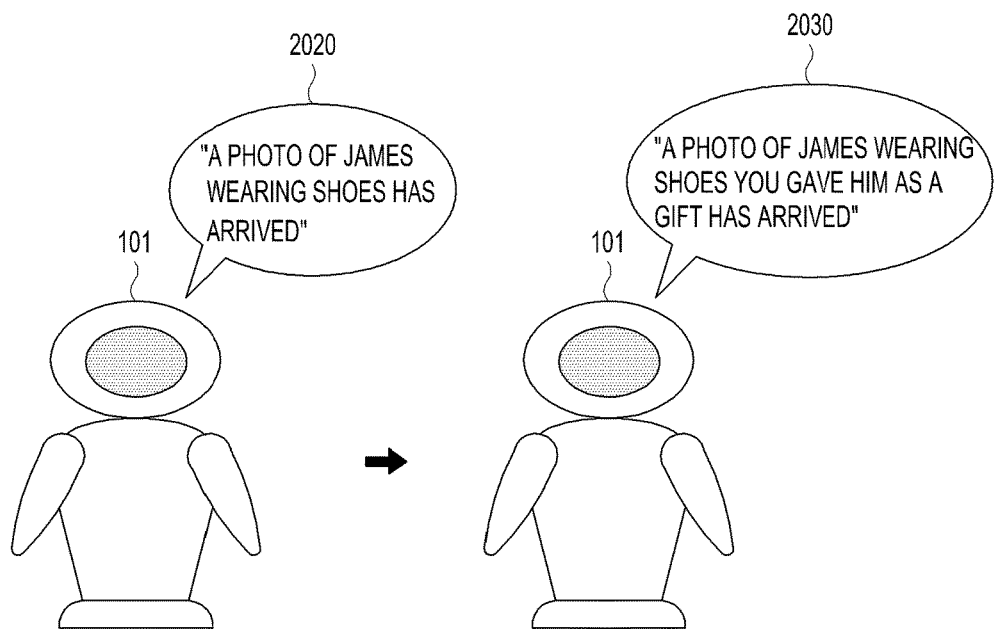
FIG. 20B is a concept view illustrating output message conversion according to an embodiment of the present disclosure.

FIG. 20A is a concept view illustrating an image according to an embodiment of the present disclosure. FIG. 20B is a concept view illustrating output message conversion according to an embodiment of the present disclosure.

Referring to FIG. 19, in operation 1910, the electronic device 101 may obtain an image. As described above, the electronic device 101 may capture an image through a camera module included therein, receive an image through a communication module, or load an image stored in the memory. For example, the electronic device 101 may obtain an image 2010 as shown in FIG. 20A. The image 2010 may include an object 2011 for shoes.

In operation 1920, the electronic device 101 may analyze the obtained image and generate an output message. According to an embodiment of the present disclosure, the electronic device 101 may apply a recognition algorithm to the image and obtain an image analysis result. The electronic device 101 may generate the output message including the image analysis result. For example, the electronic device 101 may obtain the image analysis result based on at least one of at least one object in the image 2010 and a relationship between at least one object. Specifically, the electronic device 101 may recognize a face object within the image 2010 and obtain the image analysis result indicating that a person in the image is James. Further, the electronic device 101 may recognize a top object below the face object and a bottom object below the top object. The electronic device 101 may also recognize the shoe object 2011 below the bottom object. The electronic device 101 may obtain the image analysis result indicating that James wears the shoe object 2011 based on position relationships between the face object and the top object and between the bottom object and the shoe object 2011. Accordingly, the electronic device 101 may generate the output message 2020 including the image analysis result, e.g., "a photo of James wearing shoes has arrived".

In operation 1930, the electronic device 101 may obtain the recognized object-related information. For example, the electronic device 101 may recognize the shoe object 2011 and obtain the object-related information having a history that a user of the electronic device 101 gave the recognized shoe object 2011 to James as a gift. As described above, the electronic device 101 may store personal information for various persons including the user. For example, the electronic device 101 may previously store, e.g., the history of gift by the user in association with a shoes template. The electronic device 101 may compare the recognized shoe object 2011 with a template, thereby obtaining the object-related information that the recognized shoe object 2011 is a gift the user gave to James.

In operation 1940, the electronic device 101 may convert the generated output message based on the obtained object-related information. In operation 1950, the electronic device 101 may output the converted output message. For example, as illustrated in FIG. 20B, the electronic device 101 may convert the output message 2020 indicating that "a photo of James wearing shoes has arrived" into "a photo of James wearing shoes you gave him as a gift has arrived" and output the converted output message 2030. The electronic device 101 may convert the text "shoes" into "shoes you gave him as a gift" using the object-related information indicating that the "shoes" in the output message 2020 is a gift by the user.

As described above, the electronic device 101 may convert the image analysis result using object-related information on objects with various attributes as well as a person in the image.

Figure 21:
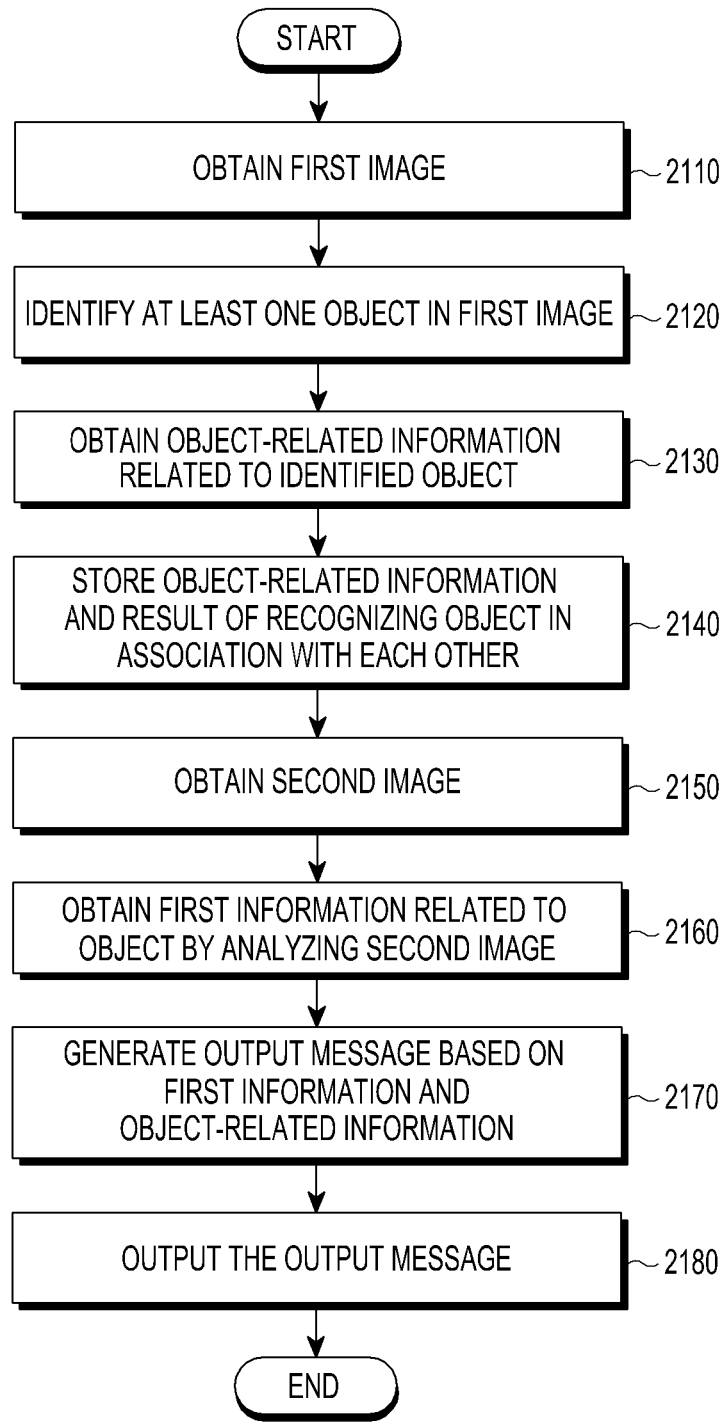
FIG. 21 is a flowchart illustrating a method for controlling an electronic device according to an embodiment of the present disclosure.

FIG. 21 is a flowchart illustrating a method for controlling an electronic device according to an embodiment of the present disclosure.

Referring to FIG. 21, in operation 2110, the electronic device 101 may obtain a first image. As described above, the electronic device 101 may capture an image through a camera module included therein, receive an image through a communication module, or load an image stored in the memory.

In operation 2120, the electronic device 101 may recognize at least one object from the first image. The electronic device 101 may apply a recognition algorithm to the first image to thus identify and recognize at least one object. In operation 2130, the electronic device 101 may obtain object-related information related with the recognized object. In operation 2140, the electronic device 101 may store the result of recognizing the object and the object-related information which are associated with each other. According to an embodiment of the present disclosure, the electronic device 101 may obtain a detected event corresponding to a time when the first image is obtained as the object-related information. For example, the electronic device 101 may execute an application enabling electronic commerce and process an electronic commerce command to deliver a shoe product to a recipient, James. The electronic device 101 may obtain the first image about the shoe product which is a target for the electronic commerce, while processing the electronic commerce command, and store a template for the shoe object in the first image. The electronic device 101 may store the template for the shoe object and information related with the electronic commerce which are associated with each other. For example, the electronic device 101 may store the electronic commerce related information in association with the template of the shoe object, as the object-related information.

In operation 2150, the electronic device 101 may obtain a second image. In operation 2160, the electronic device 101 may analyze the second image and obtain first information on the object. For example, the electronic device 101 may receive the second image in which James wears shoes from another electronic device used by James. The electronic device 101 may analyze the second image and obtain the first information indicating that "James wears shoes".

In operation 2170, the electronic device 101 may generate an output message based on the first information and the object-related information. In operation 2180, the electronic device 101 may output the output message. For example, the electronic device 101 may compare the shoe object in the second image with a pre-stored template for the shoe object, and obtain the object-related information, based on the comparison result, indicating that the shoe object in the second image is a gift the user gave to James. The electronic device 101 may generate the output message, e.g., "James wears shoes you gave to James as a gift", based the first information and the object-related information, and output the generated output message.

As described above, the electronic device 101 may previously obtain and store a template and object-related information for a specific object, and convert an image analysis result, which is obtained later, using the previously stored object-related information.

Figure 22:
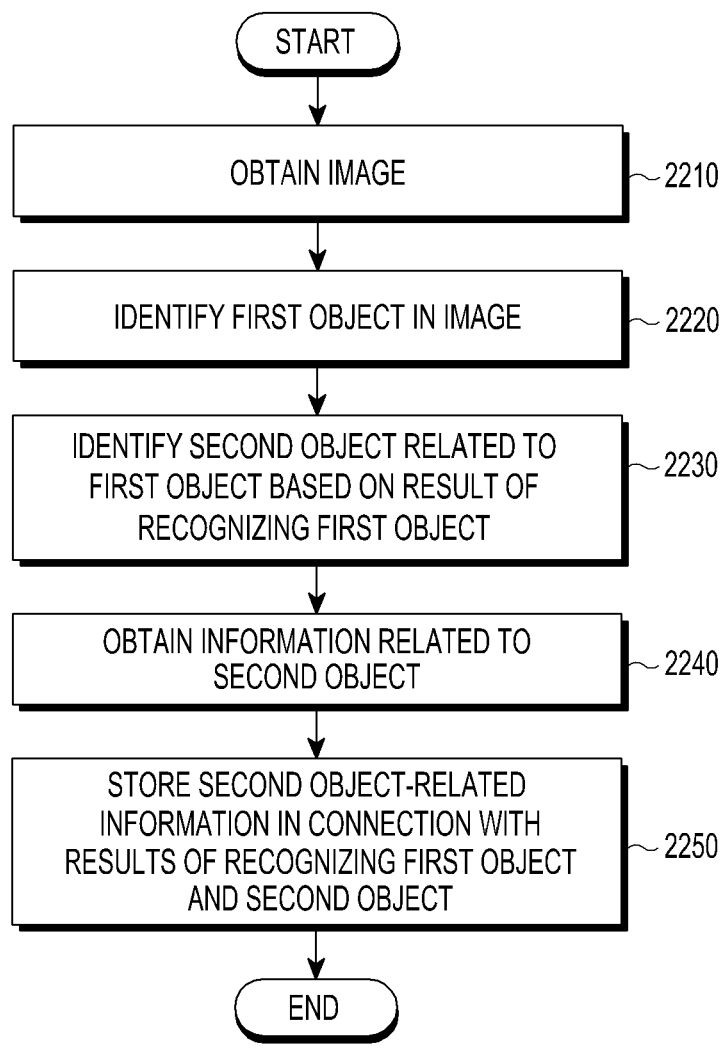
FIG. 22 is a flowchart illustrating a method for controlling an electronic device according to an embodiment of the present disclosure.

FIG. 22 is a flowchart illustrating a method for controlling an electronic device according to an embodiment of the present disclosure. The embodiment of FIG. 22 describes a way of storing an object template and object-related information by the electronic device 101.

The embodiment of FIG. 22 is described in greater detail with reference to FIGS. 23A to 23C.

Figure 23A:
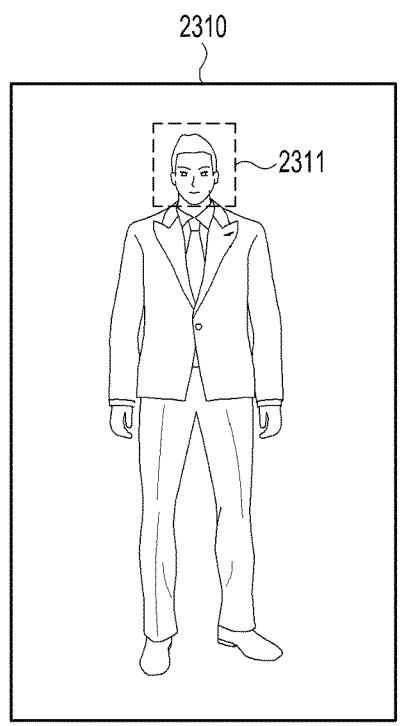
FIGS. 23A to 23C are concept views illustrating image processing according to an embodiment of the present disclosure.
Figure 23B:
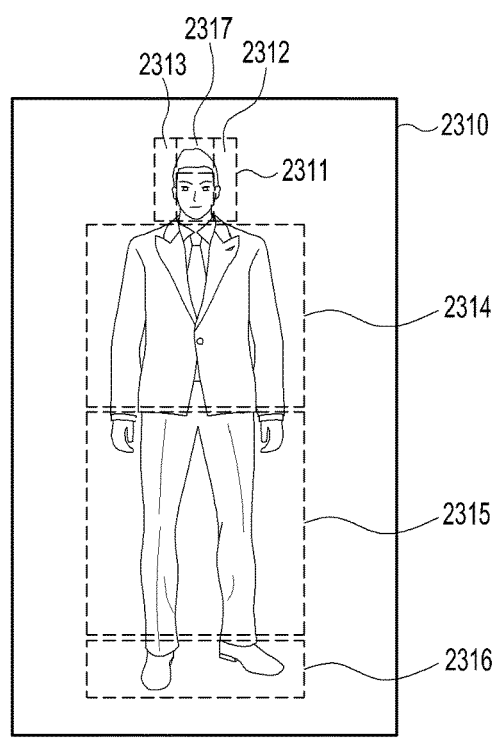
Figure 23C:
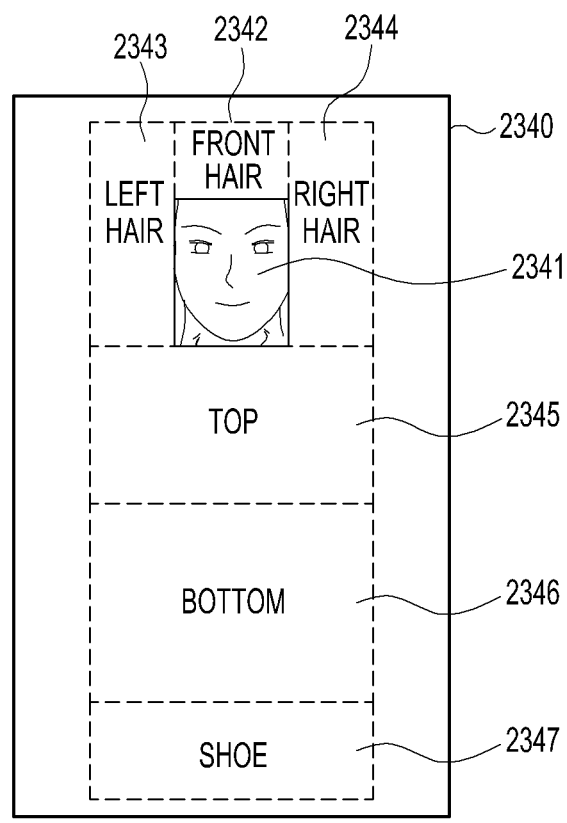

FIGS. 23A to 23C are concept views illustrating an obtained image according to various embodiments of the present disclosure.

Referring to FIG. 22, in operation 2210, the electronic device 101 may obtain an image including a first object. For example, referring to FIG. 23A, the electronic device 101 may obtain an image 2310 including a first object 2311. In the embodiment of FIG. 23A, the electronic device 101 may obtain the image 2310 including the first object 2311 corresponding to a face of a person.

In operation 2220, the electronic device 101 may recognize the first object 2311 within the image. According to an embodiment of the present disclosure, the electronic device 101 may store an object recognition algorithm for various objects, e.g., a person or tree, and the electronic device 101 may apply the stored object recognition algorithm to the obtained image to recognize the first object 2311. According to an embodiment of the present disclosure, the electronic device 101 may store various object recognition algorithms, and a person of ordinary skill in the art may readily understand that any object recognition algorithm may be used without limitation. In the embodiment of FIG. 23A, the electronic device 101 may apply a face recognition algorithm to the image 2310, thereby recognizing the first object 2311 which is a face object.

In operation 2230, the electronic device 101 may recognize a second object related with the first object based on the result of recognizing the first object. According to an embodiment of the present disclosure, the electronic device 101 may recognize the second object related to the first object based on a type of the first object. For example, in the embodiment of FIG. 23B, the electronic device 101 may recognize the second object including right hair 2312, left hair 2313, a top 2314, a bottom 2315, a shoe 2316, and front hair 2317, which are related with the first object 2311, based on the face object which is a type of the first object 2311. Specifically, the electronic device 101 may identify a recognition target area related to the first object in that the type of the first object is a face. Here, the recognition target area is an area set in a predetermined position with respect to the identified first object, such that the recognition target area may be differently set depending on the type of the first object. For example, the electronic device 101 may previously set, as the recognition target area, a hair-related area adjacently placed at an upper portion and left/right portions of the face object, corresponding to the face object, a top-related area adjacently placed below the face object, a bottom-related area adjacently placed below the top-related area, a shoe-related area adjacently placed below the bottom-related area. The recognition target area is described in greater detail with reference to FIG. 23C. The electronic device 101 may recognize an object disposed in the recognition target area of the image, thereby recognizing the second object. The electronic device 101 may perform recognition within a predetermined area according to the first object without recognizing all objects in the image, resulting in a reduction in an amount of computation and time required for recognizing the second object.

In the embodiment of FIG. 23B, the electronic device 101 may obtain the result of recognizing the second object, in which there are no left and right hair 2312 and 2313, the front hair 2317 is short having an exposed forehead, the top has a long sleeve, the bottoms 2315 are long pants, and the footwear 2316 is shoes. According to an embodiment of the present disclosure, the electronic device 101 may compare the object in the recognition target area with a pre-stored template for each of the recognition target area and obtain the result of recognizing the second object. For example, the electronic device 101 may store various templates, e.g., a long sleeve, a half sleeve, a T-shirt, a shirt, or a jumper, corresponding to the recognition target area placed below the face object. The electronic device 101 may compare the object 2314 below the first object 2311 with a stored template and obtain the result of recognizing the second object based on the comparison result. For example, the electronic device 101 may obtain a template having a highest similarity as the result of recognizing the second object. As an example, the electronic device 101 may store a template for each of the recognition target area. Instead, the electronic device 101 may also send a query including the image of the recognition target area to, e.g., a server managing an external database and receive a recognition result in response to the query, thereby obtaining the result of recognizing the second object. The electronic device 101 or the server may modify or add the template for the second object, for example by using a learning algorithm.

In operation 2240, the electronic device 101 may obtain information related with the second object. According to an embodiment of the present disclosure, the electronic device 101 may obtain an event detected when the image 2310 is obtained as the second object-related information. For example, the electronic device 101 may obtain bio-information at a time when the image 2310 is obtained, and may obtain information indicating that the user is happy based on the result of analyzing the bio-signal. The electronic device 101 may store emotion information "happiness" as the second object-related information.

In operation 2250, the electronic device 101 may store the second object-related information in connection with the results of recognizing the first object and the second object. In operation 2250, the electronic device 101 may store each template for the first object and the second object, in connection with the result of recognizing the second object.

FIG. 23C is a concept view illustrating a recognition target area according to an embodiment of the present disclosure.

The electronic device 101 may previously set recognition target areas 2341 to 2347 corresponding to a first object 2341 in an image 2340. The recognition target areas 2341 to 2347 of FIG. 23C are illustrative and the electronic device 101 may previously set the recognition target areas, for example as shown in Table 1. For example, the electronic device 101 may set the size of the first object to have a "a" pixel of horizontal length and a "b" pixel of vertical length. The "a" and "b" may be parameters for comparing a relative size with respect to the first object to determine the size of the recognition target area.

TABLE 1

| Recognition Target Area | Position Information |
| --- | --- |
| Front Hair | a by 0.7xb pixel above the face object |
| Left Hair | 0.5xa by 1.7xb pixel at a left side of the face object |
| Right Hair | 0.5xa by 1.7xb pixel at a right side of the face object |
| Top | 2xa by 1.1xb pixel below the face object |
| Bottom | 2xa by 1.6xb pixel below the top object |
| Shoes | 2xa by 0.4xb pixel below the bottom object |

The electronic device 101 may set the recognition target area according to a type of the first object which is the first recognition target. For example, the electronic device 101 may set the recognition target area shown in Table 1 for the face object, but may set a different recognition target area from Table 1 for a different type of object. As described above, the electronic device 101 may store a template corresponding to each of the recognition target area and recognize a second object based on the result of making a comparison of the template. For example, the electronic device 101 may store templates for various front hair shapes corresponding to the recognition target area for the front hair, and may recognize a template having a highest similarity with the recognition target area of the front hair in the image as the second object. The electronic device 101 may restrict the target object for comparison to the object placed in the recognition target area, such that the electronic device 101 may reduce the amount of a computation and time consumed for comparison and recognition.

Meanwhile, according to an embodiment of the present disclosure, the electronic device 101 may determine the recognition target area based on depth information. The electronic device 101 may determine the depth information and determine the recognition target area depending on an area having a depth value which difference with that of the first object is less than a predetermined threshold value.

Figure 24A:
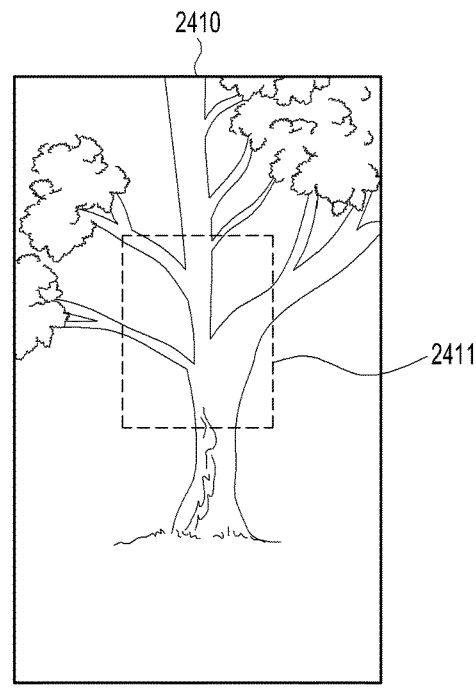
FIGS. 24A to 24C are concept views illustrating image processing according to an embodiment of the present disclosure.
Figure 24B:
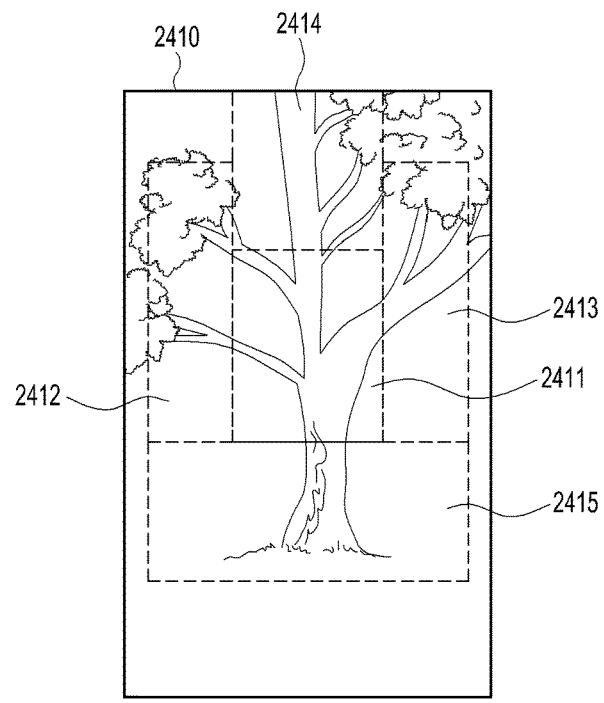
Figure 24C:
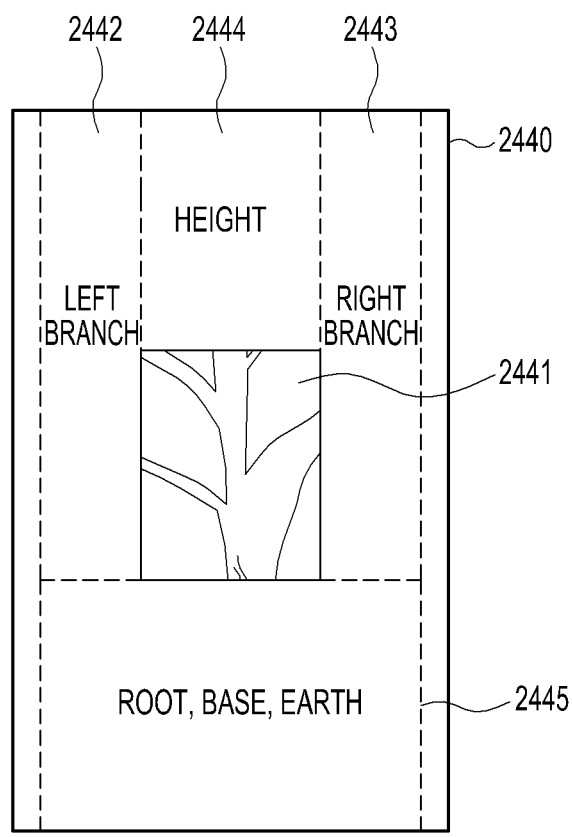

FIGS. 24A to 24C are concept views illustrating image processing according to an embodiment of the present disclosure.

Referring to FIG. 24A, the electronic device 101 may obtain an image 2410 including a first object 2411. In the embodiment of FIG. 24A, the electronic device 101 may obtain the image 2410 including the first object 2411 corresponding to a main stem of a plant.

The electronic device 101 may recognize the first object 2411 in the image. According to an embodiment of the present disclosure, the electronic device 101 may store an object recognition algorithm for various objects, e.g., a person or tree, and the electronic device 101 may apply the stored object recognition algorithm to the obtained image to recognize the first object 2411. In the embodiment of FIG. 24A, the electronic device 101 may apply a plant recognition algorithm to the image 2410, thereby recognizing the first object 2411 which is the main stem.

The electronic device 101 may recognize second objects 2412 to 2415 related with the first object 2411 based on the result of recognizing the first object 2411. According to an embodiment of the present disclosure, the electronic device 101 may recognize the second objects 2412 to 2415 related with the first object 2411 based on a type of the first object 2411. For example, in the embodiment of FIG. 24B, the electronic device 101 may recognize the second object including a left branch 2412, a right branch 2413, a height 2414 of the tree, and a root, base, earth 2415, which are related with the first object, based on the main stem object which is the type of the first object 2411. Specifically, the electronic device 101 may identify a recognition target area related to the first object 2411 in that the type of the first object 2411 is a main stem. For example, the electronic device 101 may set the recognition target area, corresponding to the main stem object, including a height-related area adjacently placed above the main stem object, a branch-related area adjacently placed at left/right sides of the main stem object, and an earth-related area adjacently placed below the main stem object. The recognition target area is described in greater detail with reference to FIG. 24C. The electronic device 101 may recognize an object disposed in the recognition target area of the image, thereby recognizing the second object. The electronic device 101 may perform recognition within a predetermined area according to the first object without recognizing all objects in the image, resulting in a reduction in a computation amount and time required for recognizing the second object.

In the embodiment of FIG. 24B, the electronic device 101 may obtain a result of recognizing the second object including health condition of the left and right branches 2412 and 2413, information on a height 2414, and a shape of a base 2415. According to an embodiment of the present disclosure, the electronic device 101 may compare the object in the recognition target area with a pre-stored template for each of the recognition target area and obtain the result of recognizing the second object. For example, the electronic device 101 may store various templates, e.g., earth, a base shape, or a root shape, corresponding to the recognition target area placed below the main stem object. The electronic device 101 may compare the object 2415 below the first object 2411 with a stored template and obtain the result of recognizing the second object based on the comparison result. For example, the electronic device 101 may obtain a template having a highest similarity as the result of recognizing the second object. As an example, the electronic device 101 may store a template for each of the recognition target area. Instead, the electronic device 101 may also send a query including the image of the recognition target area to, e.g., a server managing an external database and receive a recognition result in response to the query, thereby obtaining the result of recognizing the second object. The electronic device 101 or the server may modify or add the template for the second object, for example by using a learning algorithm.

FIG. 24C is a concept view illustrating a recognition target area according to an embodiment of the present disclosure.

Referring to FIG. 24C, the electronic device 101 may previously set recognition target areas 2441 to 2445 corresponding to a first object 2441 in an image 2440. The recognition target areas 2441 to 2445 of FIG. 24 are illustrative and the electronic device 101 may previously set the recognition target areas, for example as shown in Table 2. For example, the electronic device 101 may set the size of the first object to have a "d" pixel of horizontal length and an "e" pixel of vertical length. The "d" and "e" may be parameters for comparing a relative size with respect to the first object to determine the size of the recognition target area.

TABLE 2

| Recognition Target Area | Position Information |
|---|---|
| Left Branch | 0.5xd by 1.7xe pixel at a left side of the main stem object |
| Right Branch | 0.5xd by 1.7xe pixel at a right side of the main stem object |
| Height | d by e pixel above the main stem object |
| Earth | 2xd by 1.1xe pixel below the main stem object |

The electronic device 101 may set the recognition target area according to a type of the first object which is the first recognition target. For example, the electronic device 101 may set the recognition target area shown in FIGS. 24A to 24C for the main stem object, which is different from the recognition target area of FIGS. 23A to 23C. As described above, the electronic device 101 may store a template corresponding to each of the recognition target area and recognize a second object based on the result of making a comparison of the template. For example, the electronic device 101 may store templates for various shapes corresponding to the recognition target area for the earth, and may recognize a template having a highest similarity with the recognition target area of the earth within the image as the second object.

Meanwhile, according to an embodiment of the present disclosure, the electronic device 101 may determine the recognition target area based on depth information. The electronic device 101 may determine the depth information and determine the recognition target area depending on an area having a depth value which difference with that of the first object is less than a predetermined threshold value.

As described above with reference to FIGS. 23A to 23C and FIGS. 24A to 24C, the electronic device 101 may set the recognition target area according to a type of the first object. Accordingly, the electronic device 101 may recognize the second object using the result of recognizing the first object.

Further, the electronic device 101 may store a template for the identified object in connection with the second object-related information.

Figure 25:
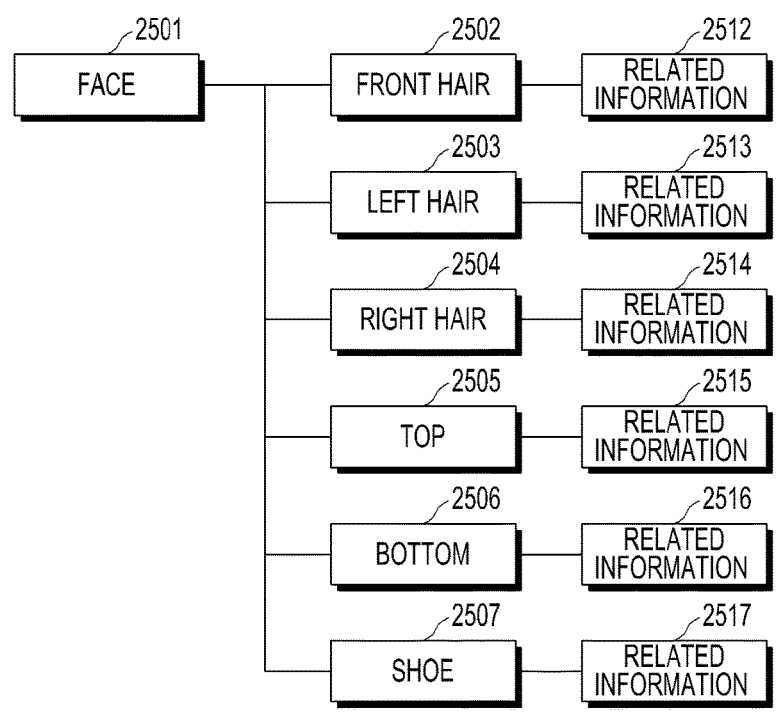
FIG. 25 is a concept view illustrating a stored identification result data structure according to an embodiment of the present disclosure.

FIG. 25 is a concept view illustrating a stored identification result data structure according to an embodiment of the present disclosure.

Referring to FIG. 25, the electronic device 101 may store the first object 2501 in connection with the identified second objects 2502 to 2507 as illustrated in FIG. 25. For example, the electronic device 101 may store the result of recognizing the second objects 2502 to 2507 including the result of recognizing front hair, left hair, right hair, a top, a bottom, and a shoe, corresponding to the first object 2501 of the face object. Meanwhile, in the embodiment of FIG. 25, the data structure is illustrated to have a hierarchical structure. However, the data structure shown in FIG. 25 is illustrative, and the first object 2501 and the second objects 2502 to 2507 may be stored to have a same class with each other. The electronic device 101 may manage the data structure shown in FIG. 25 by saving in accordance with time sequence or by renewing the data structure. The electronic device 101 may add a new object to the template and may output information related thereto.

The electronic device 101 may store object-related information 2512 to 2517 corresponding to the respective second objects 2502 to 2507, in connection with the second objects 2502 to 2507. According to an embodiment of the present disclosure, the electronic device 101 may determine the object-related information 2512 to 2517 based on an event detected at a time when the image including the second objects 2502 to 2507 is obtained, and store the determined object-related information. For example, the electronic device 101 may store object-related information 2517 indicating that a corresponding object in relation to the template of the shoe object 2507 is a gift the user gave to James. Later, the electronic device 101 may obtain a different image and convert an image analysis result for the different image using the object-related information 2512 to 2517.

According to an embodiment of the present disclosure, the electronic device 101 may store the result of recognizing the first object, the result of recognizing the second object, and the object-related information, or transmit the result of recognizing the first object, the result of recognizing the second object, and the object-related information to another electronic device. Alternatively, the electronic device 101 may store and manage the result of recognizing the first object, the result of recognizing the second object, and the object-related information, in accordance with time sequence, e.g., an order of date.

Figure 26:
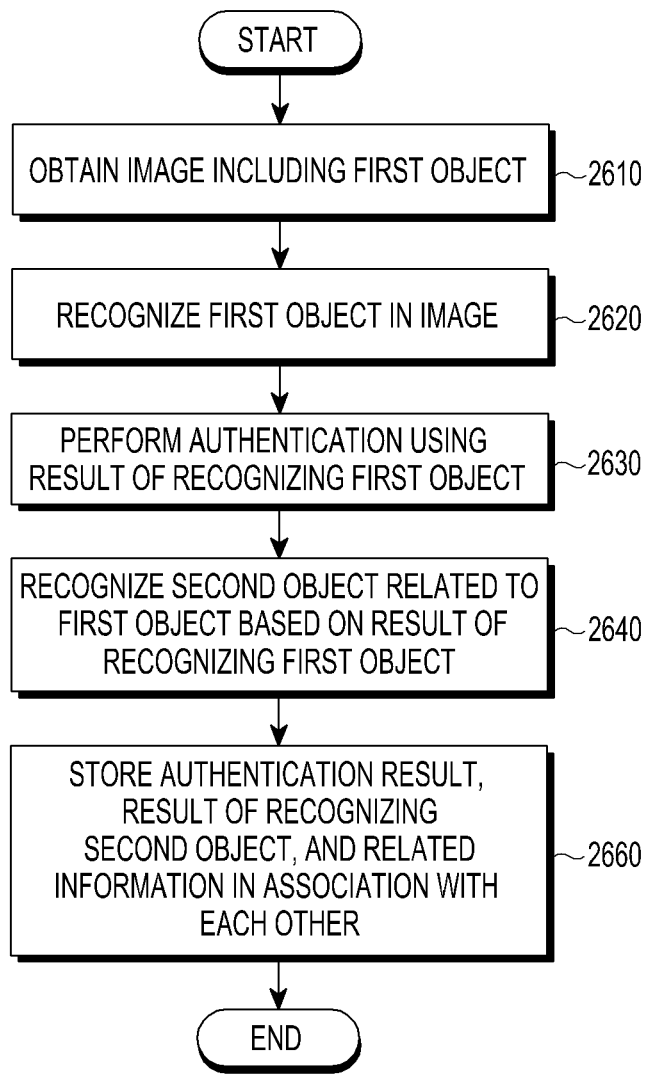
FIG. 26 is a flowchart illustrating a method for controlling an electronic device according to an embodiment of the present disclosure.

FIG. 26 is a flowchart illustrating a method for controlling an electronic device according to an embodiment of the present disclosure.

Referring to FIG. 26, in operation 2610, the electronic device 101 may obtain an image including a first object. In operation 2620, the electronic device 101 may recognize a first object from the first image. As described above, the electronic device 101 may store various object recognition algorithms and apply the object recognition algorithms to the obtained image to recognize the first object. In operation 2630, the electronic device 101 may perform authentication using the result of recognizing the first object. For example, the electronic device 101 may recognize a face object from the image and perform authentication using the result of recognizing the face object. In operation 2640, the electronic device 101 may recognize a second object related with the first object based on the result of recognizing the first object.

In operation 2660, the electronic device 101 may store an authentication result and the result of recognizing the second object, and the second object-related information, which are associated with each other. For example, the electronic device 101 may determine, using the authentication result, that a captured target is James. The electronic device 101 may also determine that a top object is a long sleeve using the result of recognizing the second object. The electronic device 101 may obtain object-related information indicating that the object corresponding to the top object in the recognition result is a gift a user gave to James. The electronic device 101 may store the result of recognizing James, the result of recognizing the top object (e.g., the template and information on the long sleeve), and the object-related information (e.g., information indicating that a user gave to James as a gift), which are associated with each other.

Figure 27:
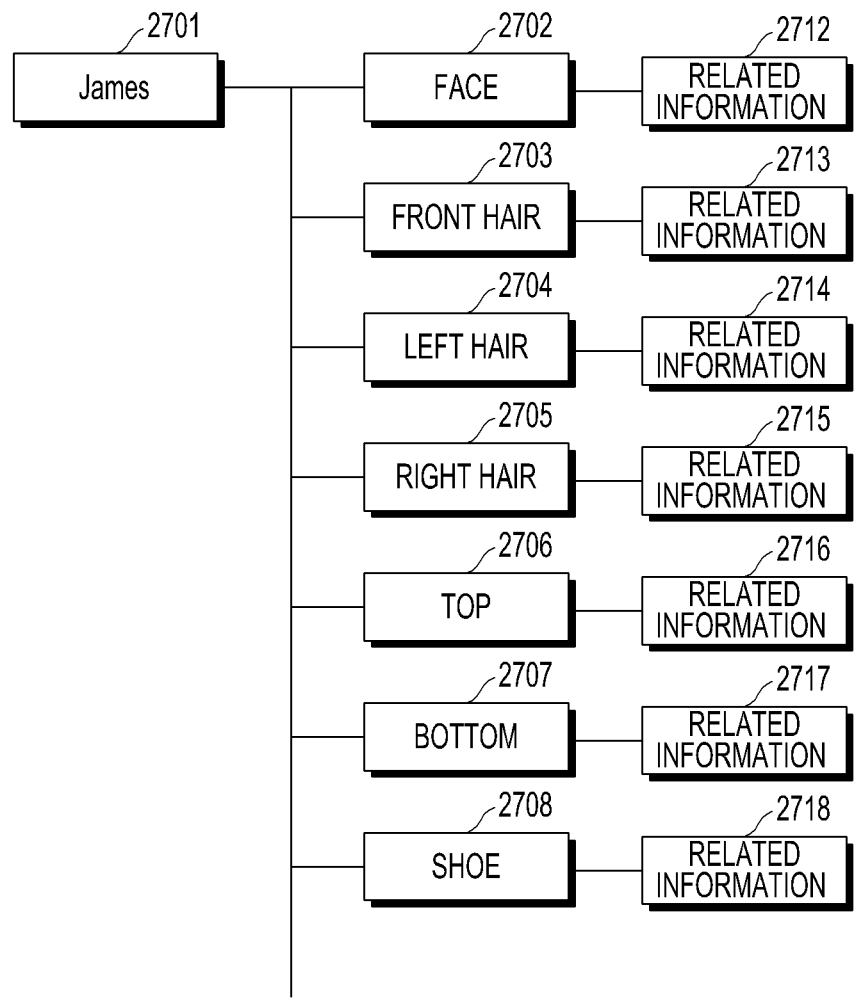
FIG. 27 is a concept view illustrating a stored data structure of an identification result according to an embodiment of the present disclosure.

FIG. 27 is a concept view illustrating a stored data structure of an identification result according to an embodiment of the present disclosure.

Referring to FIG. 27, the electronic device 101 may store the authentication result 2701 in connection with the result 2702 of recognizing the first object and the result 2703 to 2708 of recognizing the second object. Meanwhile, in the embodiment of FIG. 27, the data structure is illustrated to have a hierarchical structure. However, the data structure shown in FIG. 27 is illustrative and the authentication result 2701, the result 2702 of recognizing the first object, and the result 2703 to 2708 of recognizing the second object may be stored to have a same class with each other. The electronic device 101 may manage the data structure shown in FIG. 27 by saving in accordance with time sequence or by renewing the data structure. The electronic device 101 may store object-related information 2712 to 2718 corresponding to the result 2702 of recognizing the first object and the result 2703 to 2708 of recognizing the second object. Later, the electronic device 101 may obtain a different image and convert an image analysis result for the different image using the object-related information 2712 to 2718.

Figure 28:
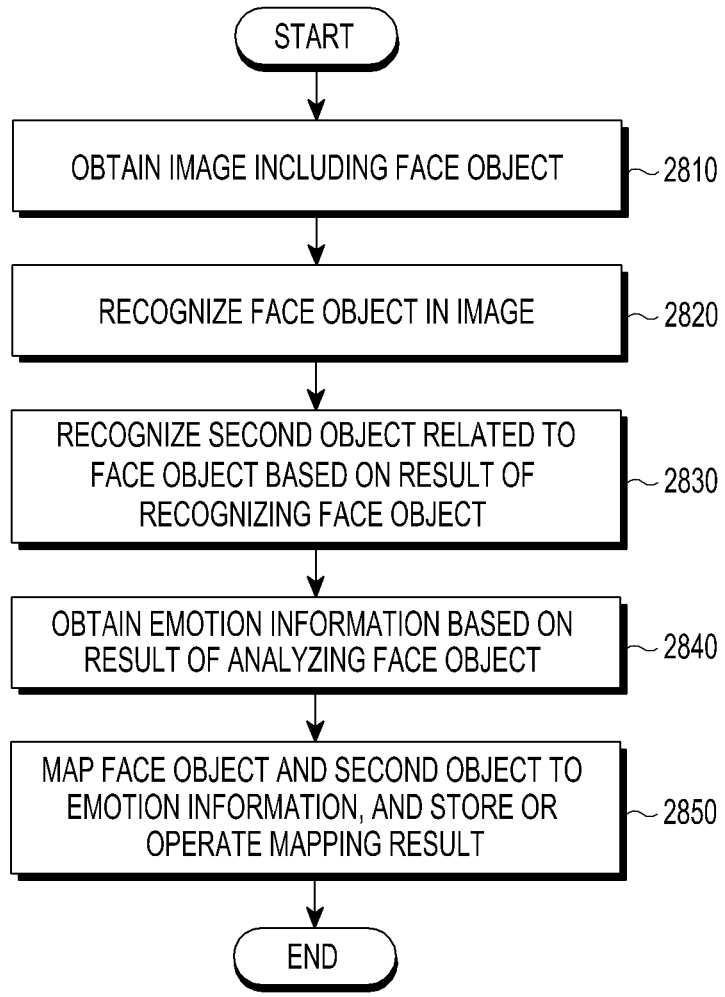
FIG. 28 is a flowchart illustrating additional information processing according to an embodiment of the present disclosure.

FIG. 28 is a flowchart illustrating additional information processing according to an embodiment of the present disclosure. The embodiment of FIG. 28 is described in greater detail with reference to FIGS. 29A to 29C.

Figure 29A:
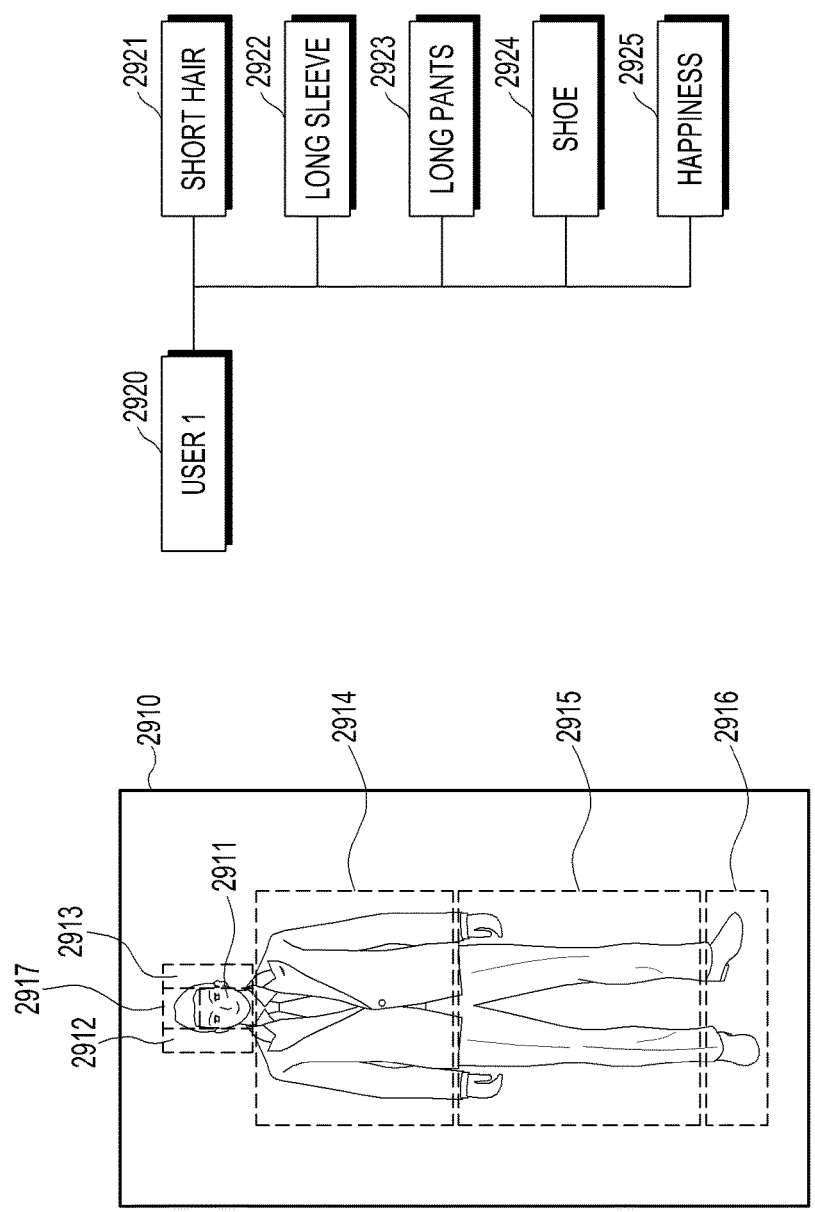
FIGS. 29A to 29C are concept views illustrating processing of emotion information and a reflection of an output message according to an embodiment of the present disclosure.
Figure 29B:
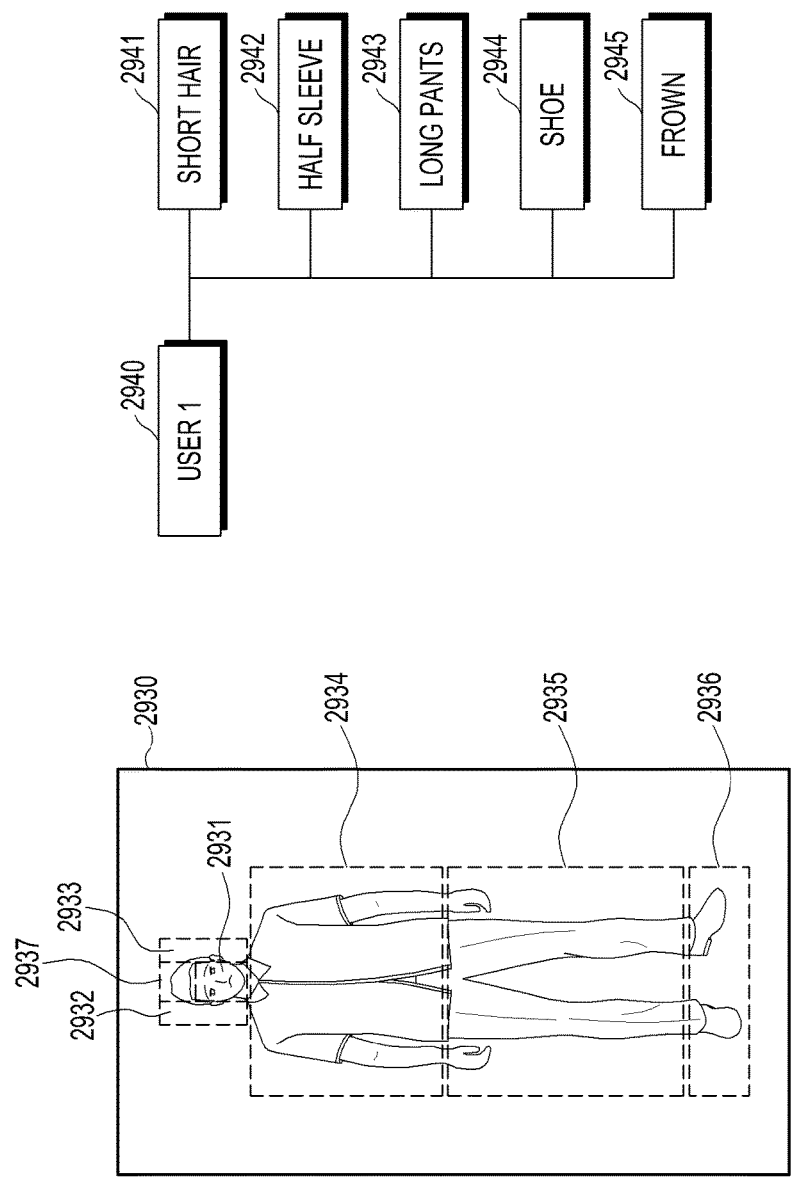
Figure 29C:
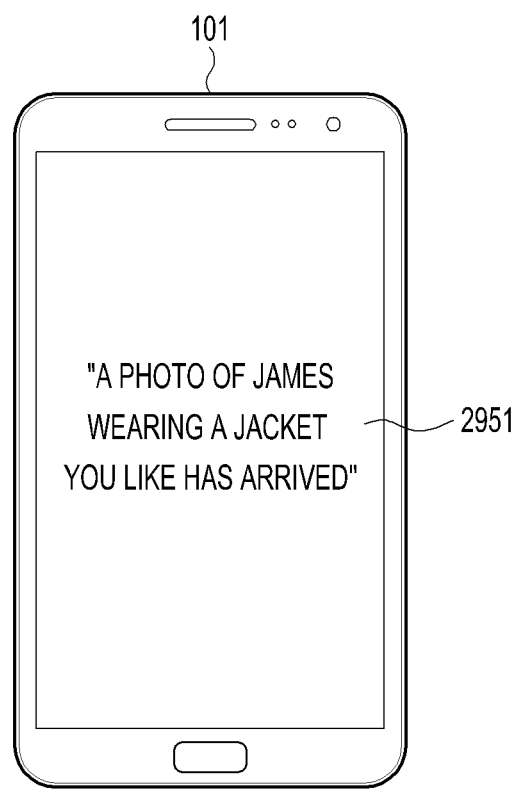

FIGS. 29A to 29C are concept views illustrating processing of emotion information and a reflection of an output message according to an embodiment of the present disclosure.

Referring to FIGS. 28 and 29A, in operation 2810, the electronic device 101 may obtain an image 2910 including a face object 2911. In operation 2820, the electronic device 101 may recognize the face object 2911 in the image. The electronic device 101 may store a face recognition algorithm and recognize information indicating that a type of the object is a face and the face object 2911 has a smiling shape. The electronic device 101 may analyze features of, e.g., an eye, a nose, a mouse, or a worry line of the recognized face object, thereby obtaining face expression information. According to an embodiment of the present disclosure, the electronic device 101 may perform authentication using the result of recognizing the face object 2911. For example, the electronic device 101 may determine that a person in the image 2910 is a user 1 by the recognition result.

In operation 2830, the electronic device 101 may recognize second objects 2912 to 2917 related with the face object based on the result of recognizing the face object 2911. In operation 2840, the electronic device 101 may obtain emotion information according to the result of recognizing the face object. For example, in the embodiment of FIG. 29A, the electronic device 101 may obtain the emotion information of happiness as additional information based on the result of recognizing the face object having a smiling shape.

In operation 2850, the electronic device 101 may map the face object 2911 and the second objects 2912 to 2917, to the emotion information, and store or operate the mapping result. For example, as illustrated in FIG. 29A, the electronic device 101 may store the results 2912 to 2924 of recognizing the second objects which correspond to the user 1 2920, and may additionally store the emotion information 2925 in connection with at least one of the user 1 2920 and the results 2921 to 2924 of recognizing the second objects.

Referring to FIG. 29B, the electronic device 110 may obtain an image 2930 including a face object 2931. The electronic device 101 may recognize the face object 2931 in the image. The electronic device 101 may store a face recognition algorithm and recognize information indicating that a type of the object is a face and the face object 2931 has a frowning shape. The electronic device 101 may perform authentication using the result of recognizing the face object 2931 and may determine that a person in the image 2930 is a user 1.

The electronic device 101 may recognize second objects 2932 to 2937 related with the face object based on the result of recognizing the face object 2931. The electronic device 101 may obtain emotion information according to the result of analyzing the face object. For example, in the embodiment of FIG. 29B, the electronic device 101 may obtain the emotion information of frown as additional information based on the result of recognizing the face object having a frowning shape.

The electronic device 101 may store or operate the face object 2931 and the second objects 2932 to 2937, and the emotion information, which are associated with each other. For example, as illustrated in FIG. 29B, the electronic device 101 may store the results 2941 to 2944 of recognizing the second objects which are corresponded to the user 1 2940, and may additionally store the emotion information 2945 in connection with at least one of the user 1 2940 and the results 2941 to 2944 of recognizing the second objects.

The electronic device 101, when receiving a different image at a later time, may recognize an object exceeding a predetermined threshold value with templates of the second objects 2912 to 2917 inside the different image. The electronic device 101 may convert an image analysis result for the different image using pre-stored emotion information 2925. For example, as illustrated in FIG. 29C, the electronic device 101 may convert the image analysis result for the different image indicating that "a photo of James wearing a jacket has arrived" into an output message 2951 indicating that "a photo of James wearing a jacket you like has arrived".

Figure 30:
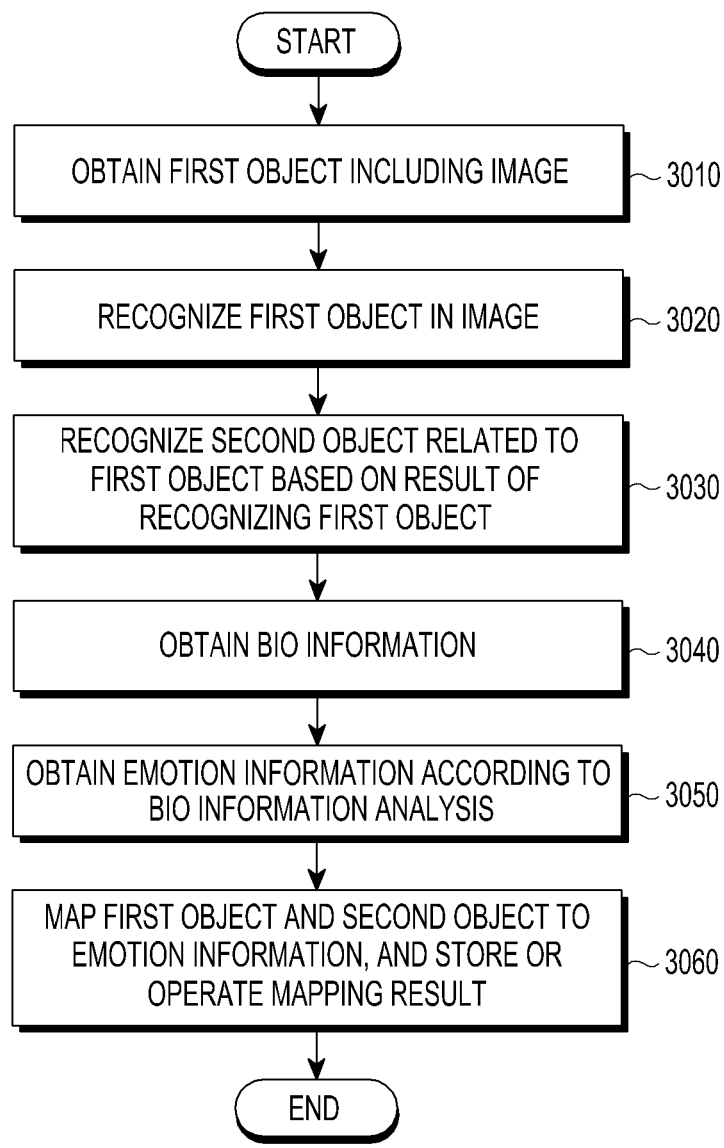
FIG. 30 is a flowchart illustrating acquisition of emotion information according to an embodiment of the present disclosure.

FIG. 30 is a flowchart illustrating acquisition of emotion information according to an embodiment of the present disclosure.

Referring to FIG. 30, in operation 3010, the electronic device 101 may obtain an image including a first object. In operation 3020, the electronic device 101 may recognize a first object from the first image. In operation 3030, the electronic device 101 may recognize a second object related with the face object based on the result of recognizing the face object.

In operation 3040, the electronic device 101 may obtain bio-information. The electronic device 101 may obtain bio-information detected at a time when the image is obtained. The bio-information may include at least one of an EEG signal, an ECG signal, an EMG signal, an electrooculogram (EOG) signal, blood pressure, and body temperature, and any bio-information representing a physiologic state of a body may be used without limitation. The electronic device 101 may include a sensor detecting the bio-information and obtain the bio-information through the sensor. Or, the electronic device 101 may obtain the bio-information from another electronic device including the sensor. It is not shown in the drawings, but the bio-information obtained from the other electronic device may be stored in a server, and the electronic device 101 may obtain the bio-information from the server.

In operation 3050, the electronic device 101 may obtain emotion information according to a result of analyzing the bio-information. The electronic device 101 may obtain emotion information through a result of adding weight for various bio-information. In operation 3060, the electronic device 101 may map the face object and the second object to the emotion information, and store or operate the mapping result.

Figure 31:
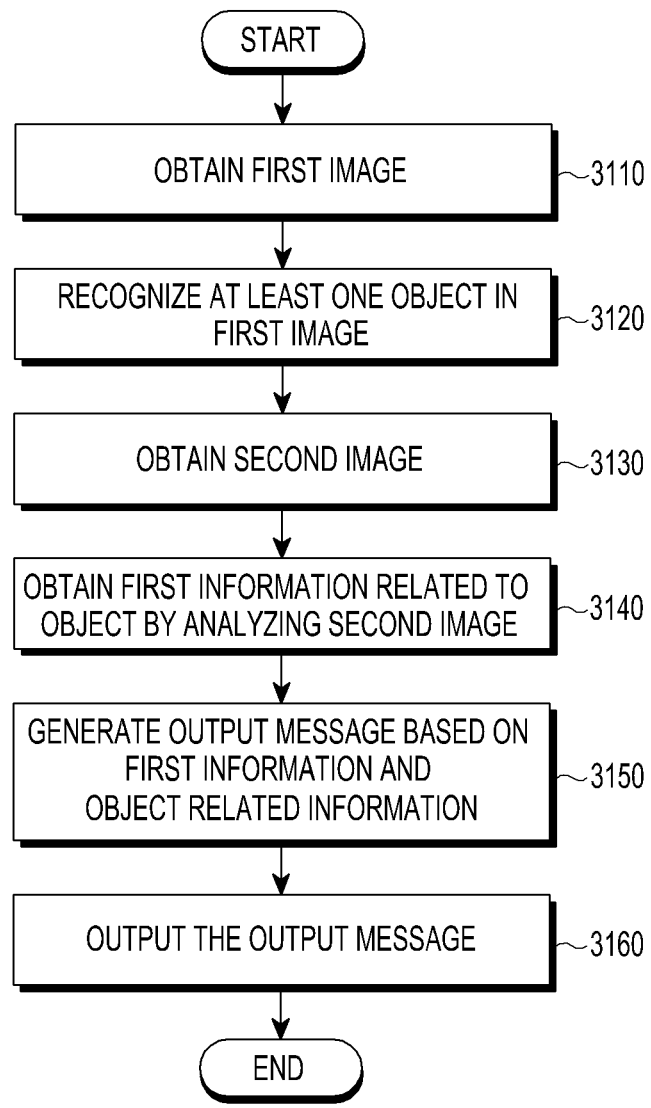
FIG. 31 is a flowchart illustrating a method for controlling an electronic device according to an embodiment of the present disclosure.

FIG. 31 is a flowchart illustrating a method for controlling an electronic device according to an embodiment of the present disclosure. The embodiment related to FIG. 31 is described in greater detail with reference to FIG. 32.

Figure 32:
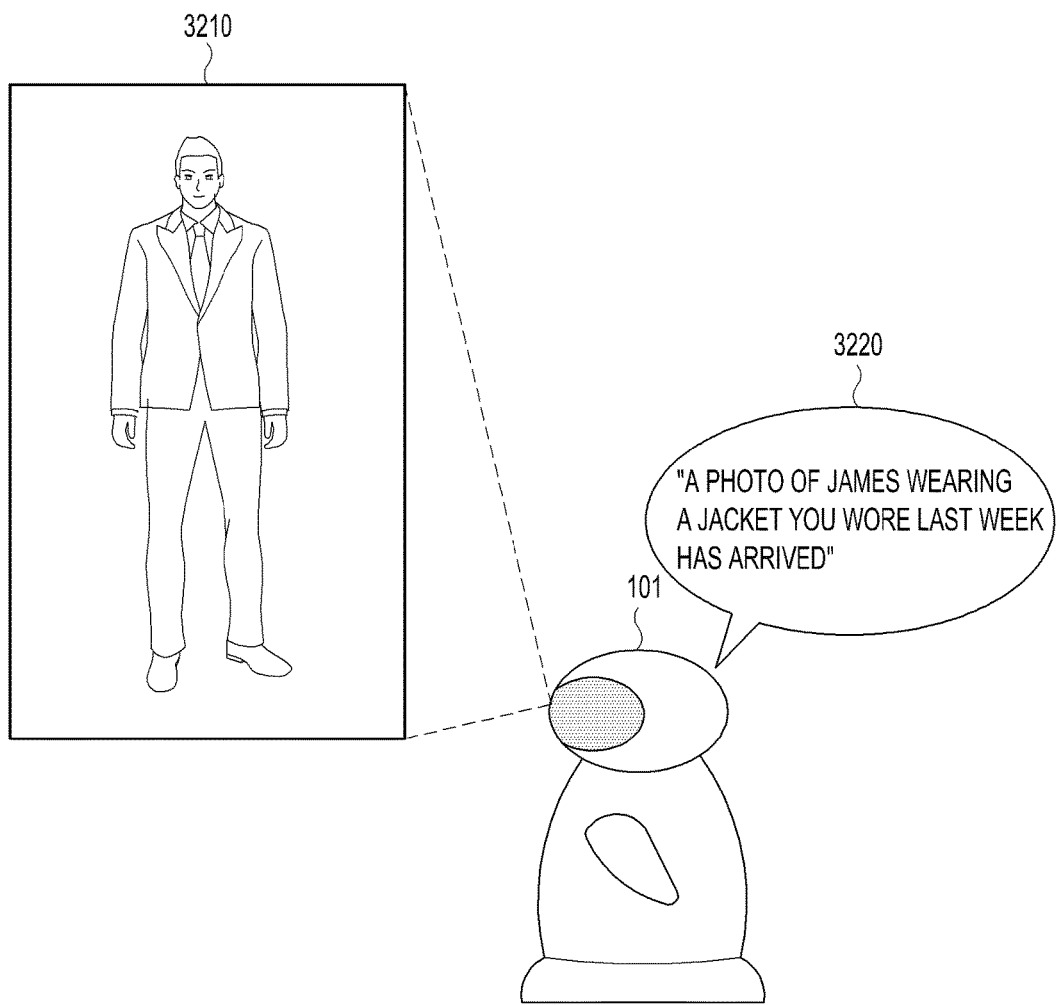
FIG. 32 is a concept view illustrating an operation of an electronic device according to an embodiment of the present disclosure.

FIG. 32 is a concept view illustrating an operation of an electronic device according to an embodiment of the present disclosure.

Referring to FIG. 31, in operation 3110, the electronic device 101 may obtain a first image. In operation 3120, the electronic device 101 may recognize at least one object from the first image. For example, the electronic device 101 may store the result of recognizing the object in the first image and an object template, which are associated with each other.

In operation 3130, the electronic device 101 may obtain a second image. For example, the electronic device 101 may obtain a second image 3210 as shown in FIG. 32. In operation 3140, the electronic device 101 may analyze the second image and obtain first information related to the object. For example, the electronic device 101 may analyze the second image and obtain the first information including an image analysis result indicating that "a photo of James wearing a jacket has arrived".

In operation 3150, the electronic device 101 may generate an output message based on the first information and the result of recognizing the object within the first image. Specifically, the electronic device 101 may determine that the jacket in the first image is the same as the jacket in the second image based on making a comparison of templates. The electronic device 101 may convert the first information by using the result of recognizing the jacket object in the first image, such as, the result of recognizing the object indicating that the jacket is what the user wore last week. In operation 3160, as illustrated in FIG. 32, the electronic device 101 may output the output message 3220 indicating that "a photo of James wearing a jacket you wore last week has arrived".

Figure 33:
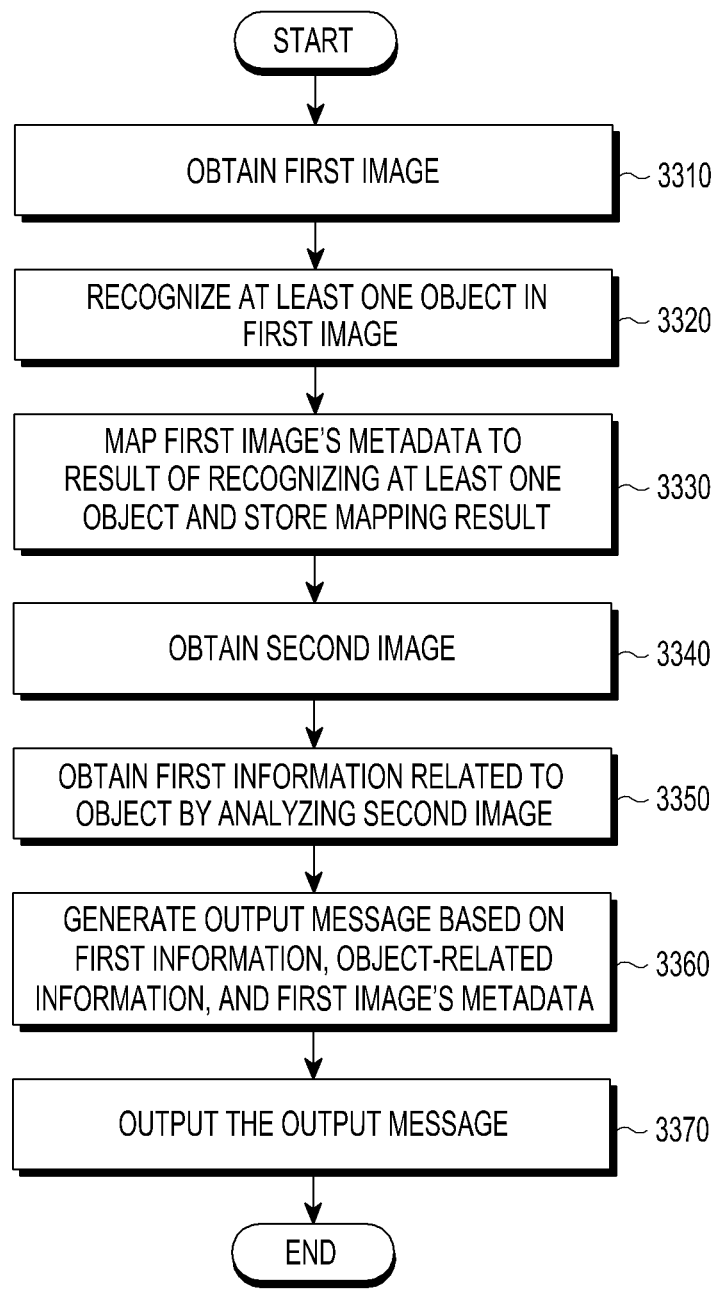
FIG. 33 is a flowchart illustrating a method for controlling an electronic device according to an embodiment of the present disclosure.

FIG. 33 is a flowchart illustrating a method for controlling an electronic device according to an embodiment of the present disclosure. The embodiment of FIG. 33 is described in further detail with reference to FIGS. 34A and 34B.

Figure 34A:
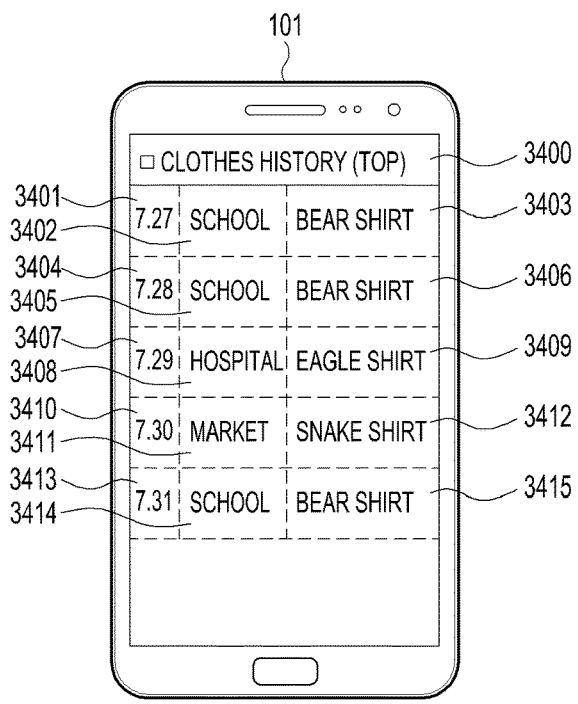
FIGS. 34A and 34B are concept views illustrating an electronic device according to embodiments of the present disclosure.
Figure 34B:
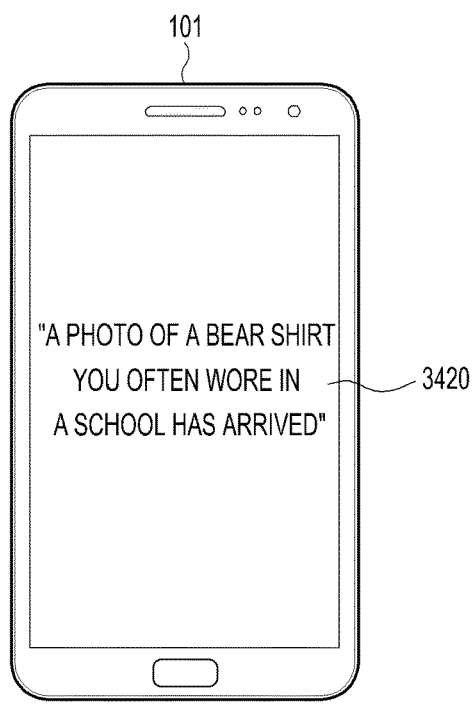

FIGS. 34A and 34B are concept views illustrating an electronic device according to embodiments of the present disclosure.

Referring to FIG. 33, in operation 3310, the electronic device 101 may obtain a first image. In operation 3320, the electronic device 101 may recognize at least one object from the first image. In operation 3330, the electronic device 101 may store metadata of the first image in connection with a result of recognizing at least one object. According to an embodiment of the present disclosure, the electronic device 101 may obtain the first image where people wear various dresses, and may store templates for the dresses identified in the first image in connection with a place where the first image is captured. In this embodiment, the metadata is information regarding a place where the first image is captured. In various embodiments, the metadata of the image may comprise at least one of information regarding the place where the image is captured, information regarding a time when the image is captured, title of the image, information regarding photographer. For example, as illustrated in FIG. 34A, the electronic device 101 may display a graphic user interface 3400 including a database. The electronic device 101 may display place information 3402, 3405, 3408, 3411, and 3414 and results 3403, 3406, 3409, 3412, and 3415 of recognizing second objects, which are corresponded to each other, in accordance with dates 3401, 3404, 3407, 3410, and 3413.

In operation 3340, the electronic device 101 may obtain a second image. In operation 3350, the electronic device 101 may analyze the second image and obtain first information on the object. In operation 3360, the electronic device 101 may generate the output message based on the first information, a result of recognizing the object, and the metadata of the first image. In operation 3370, the electronic device 101 may output the output message. For example, the electronic device 101 may analyze the second image and obtain the first information indicating that "a person wears a bear shirt". Further, the electronic device 101 may determine that the bear shirt in the first image is the same as the bear shirt in the second image. As such, the electronic device 101 may convert the first information using the metadata of the first image. For example, as illustrated in FIG. 34B, the electronic device 101 may output the output message 3420 where the first information is converted into "a photo of a bear shirt you often wore in a school has arrived".

Figure 35:
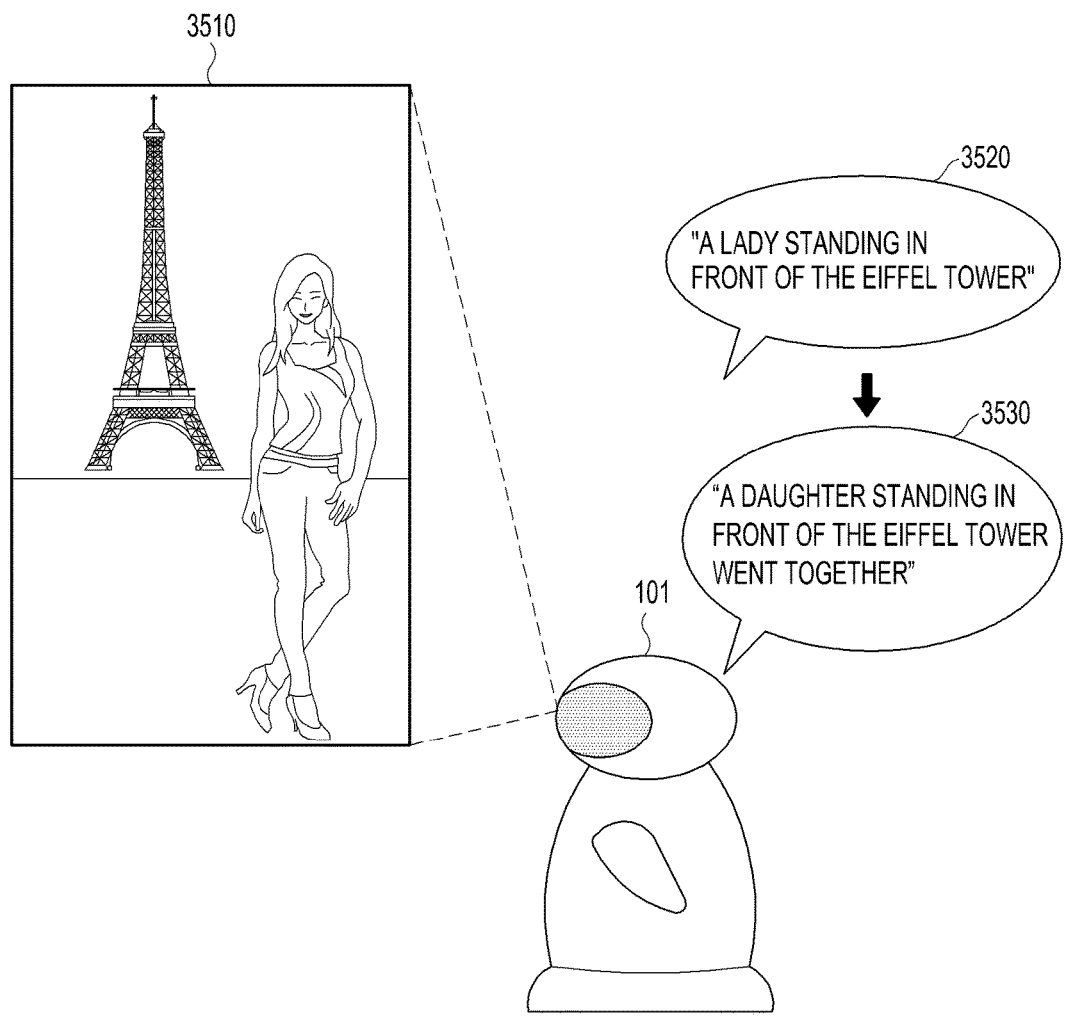
FIG. 35 is a concept view illustrating output message conversion according to an embodiment of the present disclosure.

FIG. 35 is a concept view illustrating output message conversion according to an embodiment of the present disclosure.

Referring to FIG. 35, the electronic device 101 may obtain an image 3510. The electronic device 101 may analyze the image 3510 and generate an output message 3520 indicating that "a lady standing in front of the Eiffel Tower". The electronic device 101 may obtain at least one of metadata of the image 3510, e.g., a captured time or a captured place. The electronic device 101 may obtain information from other applications corresponding to the metadata of the image 3510. For example, the electronic device 101 may identify the metadata indicating that the captured time of the image 3510 is Aug. 12, 2015 and the captured place is Paris. The electronic device 101 may obtain information from a schedule management application corresponding to the time of Aug. 12, 2015 and the place of Paris. The schedule management application may allow a user to store information indicating "Paris, travel with a daughter" on Aug. 12, 2015. The electronic device 101 may obtain information from a schedule management application corresponding to the metadata. The electronic device 101 may convert the output message 3520 using information from the schedule management application. Specifically, the electronic device 101 may replace the "lady" in the output message with a "daughter", and may add a phrase "went with your" to generate the converted output message 3530.

As described above, according to an embodiment of the present disclosure, the electronic device 101 may convert the image analysis result by using information from other applications as additional information. For example, according to an embodiment of the present disclosure, the electronic device 101 may generate the output message including the image analysis result and information from other applications related with the metadata of the image.

Figure 36:
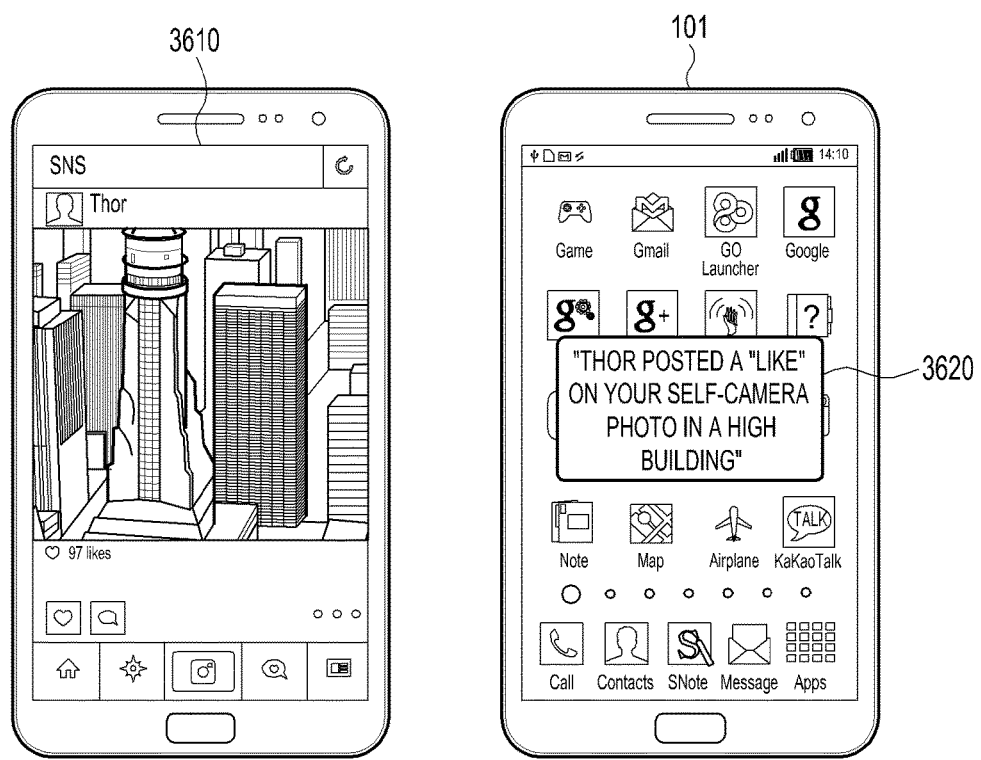
FIG. 36 is a concept view illustrating an operation of an electronic device according to an embodiment of the present disclosure.

FIG. 36 is a concept view illustrating an operation of an electronic device according to an embodiment of the present disclosure.

The electronic device 101 according to FIG. 36 may perform an explanation for social networking services (SNS) and a post. In SNS of the related art, when another user leaves a comment for a document written by a user, a SNS management server transmits a message notifying a registered electronic device of the user that the comment is posted. However, no function has been provided in SNS of the related art, where the user is notified for which post the comment is posted by the other user.

Referring to FIG. 36, the SNS management server may analyze an image in the post the user posted and obtain an image analysis result. The SNS management server may generate an output message using the image analysis result and additional information, e.g., information indicating that another user posted a comment. For example, as illustrated in FIG. 36, the SNS management server may analyze the image 3610 and obtain the image analysis result indicating "a self-camera photo for a high building". Here, the self-camera photo may include, but not limited to, a photo captured by the user using a user's camera or mobile device. Meanwhile, the SNS management server may obtain additional information indicating that another user identified as Thor left a comment for the post including the image 3610. The SNS management server may generate the output message 3620 indicating that "Thor posted a "like" on your self-camera photo for a high building" using the image analysis result and additional information. The SNS management server may transmit the generated output message 3620 to the electronic device 101, and the electronic device 101 may display the output message 3620. Thus, the user of the electronic device 101 may easily identify for which post the other user left a comment.

Figure 37:
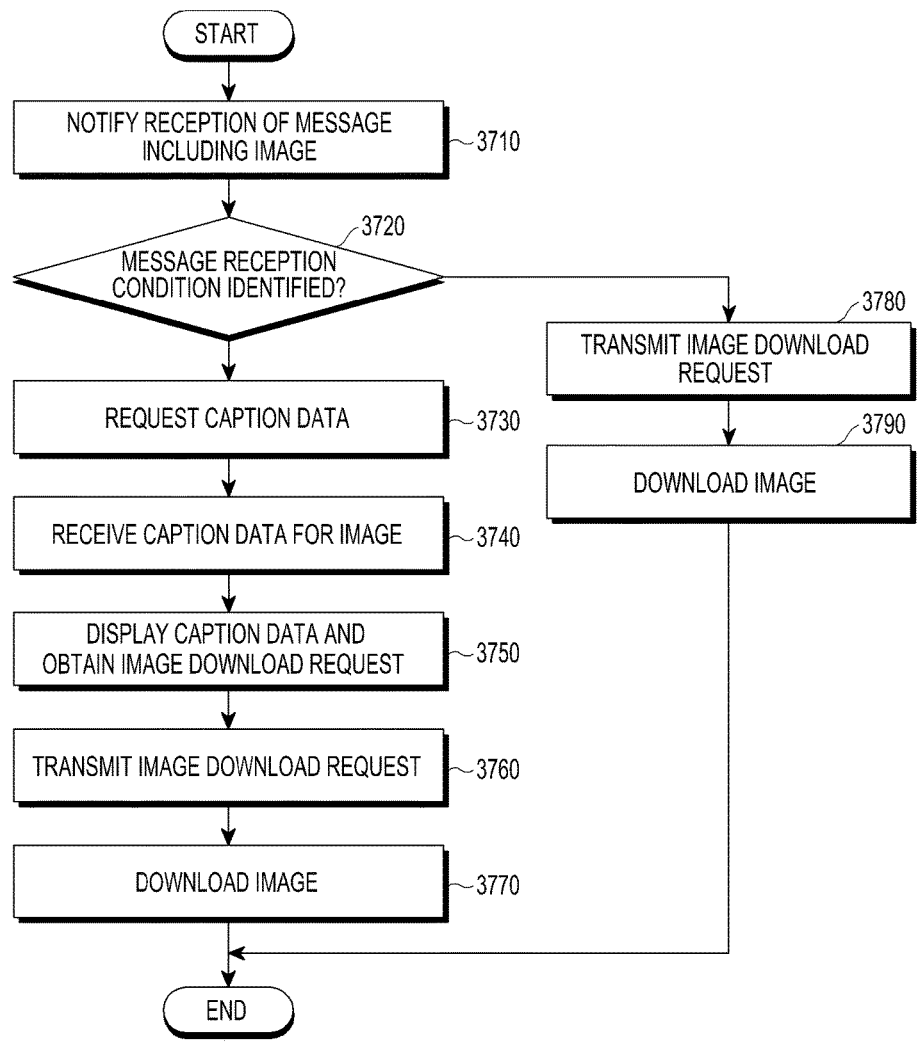
FIG. 37 is a flowchart illustrating a method for controlling an electronic device according to an embodiment of the present disclosure.

FIG. 37 is a flowchart illustrating a method for controlling an electronic device according to an embodiment of the present disclosure.

Referring to FIG. 37, in operation 3710, the electronic device 101 may be notified that a message including an image is scheduled to be received. According to an embodiment of the present disclosure, when an image is included in the message transmitted to the electronic device 101, a message server may notify that the message is scheduled to be received before transmitting the message.

In operation 3720, the electronic device 101 may identify a condition for receiving the message. Upon identifying that the condition for receiving the message is a first condition, in operation 3730, the electronic device 101 may request caption data. For example, the electronic device 101 may request the caption data in circumstances when data communication is charged, an electric field is a weak environment, or a size of the image exceeds a predetermined threshold value.

In operation 3740, the electronic device 101 may receive the caption data for an image. According to an embodiment of the present disclosure, the message server may apply a recognition algorithm to the image and obtain an image analysis result. The message server may transmit the caption data including the image analysis result to the electronic device 101. According to an embodiment of the present disclosure, the message server may generate the caption data based on the image analysis result and additional information.

In operation 3750, the electronic device 101 may display the caption data and obtain a request for downloading an image from a user. In operation 3760, the electronic device 101 may transmit the request for downloading an image to the message server. In operation 3770, the electronic device 101 may download an image from the message server.

Meanwhile, upon identifying that the condition for receiving the message is a second condition in operation 3720, the electronic device 101 may transmit the request for downloading an image to the message server in operation 3780. For example, the electronic device 101 may transmit the request for downloading an image in circumstances when data communication is free, an electric field is a strong environment, or a size of the image is equal to or greater than a predetermined threshold value. In operation 3790, the electronic device 101 may download an image from the message server.

As described above, the electronic device 101 may directly download the image or may request the caption data for the image depending on various conditions for receiving the message.

Figure 38:
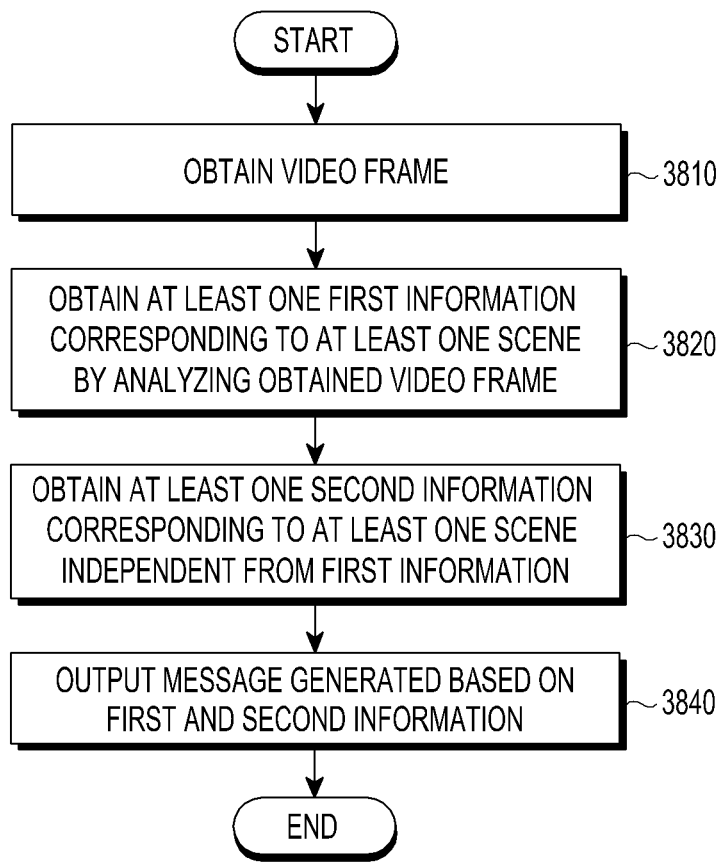
FIG. 38 is a flowchart illustrating a method for controlling an electronic device according to an embodiment of the present disclosure.

FIG. 38 is a flowchart illustrating a method for controlling an electronic device according to an embodiment of the present disclosure. The embodiment shown in FIG. 38 is described in greater detail with reference to FIG. 39.

Figure 39:
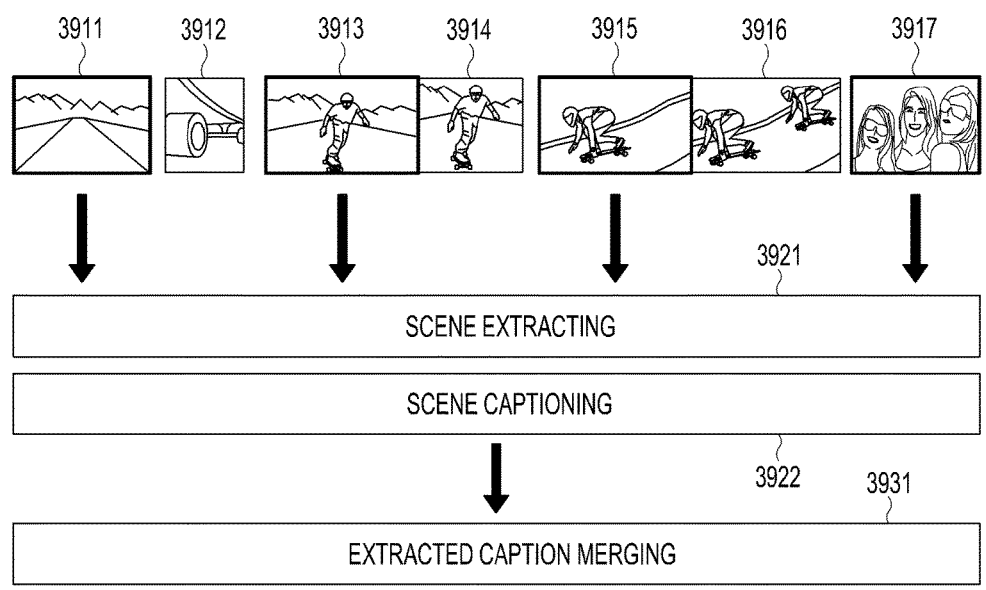
FIG. 39 is a concept view illustrating video processing according to an embodiment of the present disclosure.

FIG. 39 is a concept view illustrating video processing according to an embodiment of the present disclosure.

Referring to FIGS. 38 and 39, in operation 3810, the electronic device 101 may obtain video frames 3911 to 3917. The video frames 3911 to 3917 may refer to a plurality of images constituting a video. In operation 3820, the electronic device 101 may analyze the obtained video frames 3911 to 3917 and obtain at least one first information corresponding to at least one scene. Here, the scene may be a group of similar video frames. For example, the video frame 3911 and video frame 3912 may have a similarity equal to or greater than a predetermined threshold value, and may be classified into one scene because the video frames 3911 and 3912 are classified as similar video frames. The video frame 3913 may have a similarity exceeding a predetermined threshold value in comparison to a previous video frame 3912, and the video frame 3913 may be classified as a different scene from a scene including the video frame 3912. The electronic device 101 may classify at least one scene 3912.

In operation 3830, the electronic device 101 may obtain at least one second information corresponding to the at least one scene. Here, the second information as additional information may include external information independent from the result of analyzing the scene or information related with at least a portion of the result of analyzing the scene.

In operation 3840, the electronic device 101 may output the generated output message based on the first information and the second information. The electronic device 101 may obtain scene caption data for each scene, and may generate the output message 3931 corresponding to the whole video by merging the scene caption data and output the generated output message. The electronic device 101 may also generate an output message 3921 corresponding to the scene extracting and an output message 3922 corresponding to the scene captioning.

According to an embodiment of the present disclosure, a method for controlling an electronic device may include obtaining an image and outputting a message generated based on additional information and an image analysis result obtained by analyzing the obtained image.

According to an embodiment of the present disclosure, the additional information may include information independent from the image analysis result.

According to an embodiment of the present disclosure, the additional information may include at least one of a relationship between a sender of the image and a recipient of the image, a relationship between the sender of the image and the electronic device, or a relationship between the recipient of the image and the electronic device.

According to an embodiment of the present disclosure, the additional information may include metadata of the image.

According to an embodiment of the present disclosure, the additional information may include information from an application different from an application outputting the message.

According to an embodiment of the present disclosure, the method for controlling the electronic device may further include identifying metadata of the image and obtaining information from the different application corresponding to the identified metadata.

According to an embodiment of the present disclosure, the additional information may include information related to at least a portion of the image analysis result.

According to an embodiment of the present disclosure, the method for controlling the electronic device may further include obtaining a result of identifying a first object of the image, obtaining information related to the first object corresponding to the result of identifying the first object as the additional information, and generating an output message based on the first object-related information and the image analysis result.

According to an embodiment of the present disclosure, the method for controlling the electronic device may further include identifying a shape of the first object, comparing a pre-stored object template with the shape of the first object, and obtaining object-related information corresponding to the object template having a similarity equal to or greater than a predetermined threshold value, in comparison with the shape of the first object, as the first object-related information.

According to an embodiment of the present disclosure, the method for controlling the electronic device may further include obtaining a different image from the image, identifying the object template from the different image and storing the identified object template, and storing information related to the object template as the object-related information.

According to an embodiment of the present disclosure, the method for controlling the electronic device may include capturing an image of a user, where outputting a message generated based on the additional information and the image analysis result obtained by analyzing the obtained image comprises identifying the user and outputting a message generated based on the additional information corresponding to a result of identifying the user.

According to an embodiment of the present disclosure, the method for controlling the electronic device may include obtaining an image, generating a message by analyzing the obtained image, obtaining an additional information, and converting the message using the obtained additional information and outputting the converted message.

According to an embodiment of the present disclosure, the method for controlling the electronic device may include receiving data explaining an image received by the electronic device, displaying the data explaining the image, obtaining a command for downloading the image, and transmitting a request for downloading the image in response to the obtained command for downloading the image.

According to an embodiment of the present disclosure, a method for controlling a server relaying an image may include receiving a request for transmitting an image including the image from a first electronic device, obtaining an image analysis result by analyzing the image, transmitting the image analysis result to a second electronic device, receiving a request for downloading the image from the second electronic device, and transmitting the image to the second electronic device in response to the request for downloading.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The term 'module' may refer to a unit including one of H/W, software, and firmware, or a combination thereof. For example, the term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific IC (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include an H/W device, such as hard discs, floppy discs, and magnetic tapes (e.g., a magnetic tape), optical media such as compact disc ROMs (CD-ROMs) and DVDs, magneto-optical media such as floptical disks, ROMs, RAMs, flash memories, and/or the like. Examples of the program instructions may include not only machine language codes but also high-level language codes which are executable by various computing means using an interpreter. The aforementioned H/W devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically.

Furthermore, some of the operations may be performed in a different order, or omitted, or include other additional operation(s).

According to an embodiment of the present disclosure, there is provided a storage medium storing instructions executed by at least one processor to enable the processor to perform at least one operation that may include obtaining an image and outputting a message generated based on additional information and an image analysis result obtained by analyzing the obtained image.

As is apparent from the foregoing description, embodiments of the present disclosure may provide an electronic device and a method for controlling the electronic device, in which the electronic device outputs a message generated based on an image analysis result and additional information.

Embodiments of the present disclosure may also provide an electronic device and a method for controlling the electronic device, in which the electronic device receives and displays data describing an image, which will be received by the electronic device, and transmits a request of downloading the image, upon receiving a command of downloading the image, thereby receiving the image.

Further, embodiments of the present disclosure may provide a server and a method for controlling the server, in which when the server receives a request for transmitting an image by a first electronic device to a second electronic device, the server transmits an image analysis result to the second electronic device, instead of sending an image thereto, and when the server receives a request for downloading an image, the server transmits the image to the second electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   at least one processor; and
   a memory storing instructions which, when executed by the at least one processor, causes the electronic device to:
      obtain an image,
      identify at least one person of the obtained image by analyzing at least one face object in the obtained image,
      identify at least one recipient of the obtained image,
      identify a relationship between the identified at least one person and the identified at least one recipient, the relationship comprising at least one of a family relationship or a friend relationship,
      generate a message associated with the obtained image based on the identified relationship, and
      output the message.

2. The electronic device of claim 1, wherein the identified relationship includes information independent from the analysis of the obtained image.

3. The electronic device of claim 2, wherein the identified relationship includes at least one of a relationship between a sender of the obtained image and a recipient of the obtained image, a relationship between the sender of the obtained image and the subject, or a relationship between the recipient of the obtained image and the subject.

4. The electronic device of claim 2, wherein the identified relationship includes information from a first application that is different from a second application outputting the message.

5. The electronic device of claim 4, wherein the instructions further causes the electronic device to:
   identify metadata of the obtained image, and
   obtain the information from the second application based on the metadata.

6. The electronic device of claim 1,
   wherein the identified relationship includes information related to at least a portion of the analysis, and
   wherein the message is generated based on additional information.

7. The electronic device of claim 6, wherein the instructions further causes the electronic device to:
   obtain a result of identifying a first object of the obtained image,
   wherein the additional information corresponds to the result of the identifying of the first object.

8. The electronic device of claim 7, wherein the instructions further causes the electronic device to:
   identify a shape of the first object, and
   compare an object template with the shape of the first object,
   wherein, when a similarity of the object template is equal to or greater than a predetermined threshold value, the additional information corresponds to object-related information of the shape of the first object.

9. The electronic device of claim 8, wherein the instructions further causes the electronic device to:
   obtain a different image from the obtained image,
   identify the object template from the different image,
   store the object template, and
   store information related to the object template as the object-related information.

10. The electronic device of claim 1, further comprising a camera configured to capture an image of the user,
    wherein the instructions further causes the electronic device to identify the user based on data from the camera, and
    wherein the message is further generated based on additional information corresponding to a result of the identifying of the user.

11. A method for controlling an electronic device, the method comprising:
    obtaining an image;
    identifying at least one person of the obtained image by analyzing at least one face object in the obtained image;
    identifying at least one recipient of the obtained image;
    identifying a relationship between the identified at least one person and the identified at least one recipient, the identified relationship comprising at least one of a family relationship or a friend relationship;
    generating a message associated with the obtained image based on the identified relationship; and
    outputting the message.

12. The method of claim 11, wherein the identified relationship includes information independent from the analysis of the obtained image.

13. The method of claim 12, wherein the identified relationship includes at least one of a relationship between a sender of the obtained image and a recipient of the obtained image, a relationship between the sender of the obtained image and the subject, or a relationship between the recipient of the obtained image and the subject.

14. The method of claim 12, wherein the identified relationship includes information from a first application that is different from a second application outputting the message.

15. The method of claim 14, further comprising:
identifying metadata of the obtained image; and
obtaining information from the second application based on the metadata.

16. The method of claim 11,
wherein the identified relationship includes information related to at least a portion of the analysis, and
wherein the message is generated based on additional information.

17. The method of claim 16, further comprising:
obtaining a result of identifying a first object of the obtained image,
wherein the additional information corresponds to the result of the identifying of the first object.

18. The method of claim 17, further comprising:
identifying a shape of the first object; and
comparing an object template with the shape of the first object,
wherein, when a similarity of the object template is equal to or greater than a predetermined threshold value, the additional information corresponds to object-related information of the shape of the first object.

* * * * *